(12) United States Patent
Takashima

(10) Patent No.: US 8,203,730 B2
(45) Date of Patent: Jun. 19, 2012

(54) INFORMATION PROCESSING DEVICE, INFORMATION RECORDING MEDIUM MANUFACTURING DEVICE, INFORMATION RECORDING MEDIUM, METHODS THEREFORE, AND COMPUTER PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/196,505

(22) Filed: Aug. 2, 2011

(65) Prior Publication Data

US 2011/0289595 A1 Nov. 24, 2011

Related U.S. Application Data

(63) Continuation of application No. 11/519,920, filed on Sep. 13, 2006, now Pat. No. 8,018,609.

(60) Provisional application No. 60/724,803, filed on Oct. 11, 2005.

(30) Foreign Application Priority Data

Sep. 13, 2005 (JP) ................................ P2005-265476

(51) Int. Cl.
*G06K 15/00* (2006.01)

(52) U.S. Cl. ....... 358/1.14; 358/1.9; 358/1.18; 709/201; 709/202; 709/203

(58) Field of Classification Search .................. 711/205, 711/206, 221; 715/267–273; 726/1–35
See application file for complete search history.

(56) References Cited

U.S. PATENT DOCUMENTS 6,064,794 A * 5/2000 McLaren et al. .............. 386/343
6,959,383 B1 10/2005 Terada et al.
(Continued)

FOREIGN PATENT DOCUMENTS

JP 07-288643 10/1995
(Continued)

OTHER PUBLICATIONS

English Machine Translation of JP Pub No. 11-045508, Feb. 16, 1999, Sako Yoichiro, Device and Method for Recording Data, Device and Method for Reproducing Data, and Transmission Medium.*

(Continued)

*Primary Examiner* — Benny Q Tieu
*Assistant Examiner* — Marcellus Augustin
(74) *Attorney, Agent, or Firm* — Oblon, Spivak, McClelland, Maier & Neustadt, L.L.P.

(57) ABSTRACT

An information processing device for executing content reproduction processing includes: a content reproduction processing unit for executing data transformation processing for replacing a part of configuration data of input content to be reproduced with transformation data, and executing processing for reproducing the reproduction content; and a parameter generating unit for providing the content reproduction processing unit with a parameter to be applied in the data transformation processing; wherein the content reproduction processing unit has a configuration for obtaining a parameter identifier that is different for each segment set as a sectioning region of reproduction content, and outputting a parameter calculation request accompanied by the parameter identifier to the parameter generating unit; and wherein the parameter generating unit has a configuration for providing the content reproducing unit with a parameter corresponding to a segment, in response to the parameter calculation request from the content reproducing unit.

2 Claims, 31 Drawing Sheets

U.S. PATENT DOCUMENTS

| | | | |
|---|---|---|---|
| 2004/0213552 A1* | 10/2004 | Kato | ................................ 386/69 |
| 2005/0076392 A1 | 4/2005 | Jung et al. | |
| 2006/0020932 A1 | 1/2006 | Bentz et al. | |
| 2007/0159648 A1 | 7/2007 | Takashima | |

FOREIGN PATENT DOCUMENTS

| | | |
|---|---|---|
| JP | 11-045508 | 2/1999 |
| JP | 2001-356952 | 12/2001 |
| JP | 2003-078515 | 3/2003 |
| JP | 2003-101529 | 4/2003 |
| JP | 2003-143131 | 5/2003 |
| JP | 2003-258932 | 9/2003 |
| JP | 2004-095114 | 3/2004 |
| JP | 2005-216027 | 8/2005 |
| JP | 2005-242972 | 9/2005 |
| JP | 2010-152907 | 7/2010 |

OTHER PUBLICATIONS

Office Action issued May 10, 2011, in Japanese Patent Application No. 2005-265476, filed Sep. 13, 2005.

Japanese English Translation of JP-Pub No. 11-045508—Sako Yoichiro et al., filing date Feb. 23, 1999.

Office Action issued Feb. 7, 2012 in Japanese Application No. 2012-005967 with English translation.

Ohta, et al., "Trusted Device Framework for Secure Handset Functionality Extension", Multimedia Laboratories, NTT DoCoMo, Inc., IPSJ SIG Technical Report, Feb. 23, 2005, pp. 7.

* cited by examiner

FIG. 7

| FixUpEntry() { | BITS | DESCRIPTION |
|---|---|---|
| type_indicator | 2 | TYPE IDENTIFIER [00: NO TRANSFORMATION; 01b: PROCESSING WITH TRANSFORMATION DATA, 10b, 11b: PROCESSING WITH TRANSFORMATION DATA INCLUDING IDENTIFICATION MARK] 00b: NO TRANSFORM, 01b: TRANSFORM, 10b AND 11b: FORENSIC |
| FM_ID_bit_position | 6 | IDENTIFICATION BIT POSITION OF PLAY ID CORRESPONDING TO TRANSFORMATION DATA WITH IDENTIFICATION MARK INDICATE BIT POSITION OF PLAYER ID FOR FORENSIC (MSB IS SECOND BIT OF type_indicator) |
| relative_SPN | 12 | POSITION OF PACKET WHERE TRANSFORMATION DATA IS APPLIED (NUMBER OF PACKETS FROM PMT PACKET) RELATIVE PACKET NUMBER FROM PMT TO TRANSFORMED PACKET |
| byte_position | 8 | POSITION WHERE TRANSFORMATION DATA IS RECORDED IN THE PACKET START BYTE POSITION OF TRANSFORMED DATA IN THE PACKET (MORE THAN 5) |
| overwrite_value | 5×8 | TRANSFORMATION DATA VALUE TO BE OVERWRITTEN |
| relative_SPN_2 | 12 | POSITION OF PACKET WHERE SECOND TRANSFORMATION DATA IS APPLIED (NUMBER OF PACKETS FROM PMT PACKET) RELATIVE PACKED NUMBER FROM PMT TO SECOND TRANSFORMED PACKET |
| byte_position_2 | 8 | POSITION WHERE TRANSFORMATION DATA IS RECORDED IN THE PACKET (CORRESPONDING TO SECOND TRANSFORMATION DATA) START BYTE POSITION OF TRANSFORMED DATA IN THE SECOND PACKET |
| overwrite_value_2 | 5×8 | SECOND TRANSFORMATION DATA SECOND VALUE TO BE OVERWRITTEN |
| } | | |

FIG. 19

| SYNTAX | NO. OF BITS | DEFINITION |
|---|---|---|
| FixUpTable(){ | | |
| Number of Clips (=Nclip) | 16 | NUMBER OF CLIPS TO BE USED IN TITLE |
| FixUpTableBody_StartAddress | 32 | START ADDRESS OF FixUpTableBody() WITHIN FixUpTable() |
| SPChangePositionTable() | | |
| FixUpTableBody() | | |
| } | | |

| SYNTAX | NO. OF BITS | DEFINITION |
|---|---|---|
| SPChangePositionTable (){ | | |
| For(I=0; I<Nclip; I++){ | | |
| Clip_ID | 32 | |
| Number of SP (=NSP) | 16 | |
| For(SP_ID=0; SP_ID<NSP; SP_ID++){ | | |
| SP_segment_start_SPN | 32 | HEAD SPN OF SP_segment CORRESPONDING TO SP_ID, THE SP_ID CORRESPONDING TO AN SPN TO BE REPRODUCED CAN BE OBTAINED USING THIS VALUE |
| } | | |
| } | | |

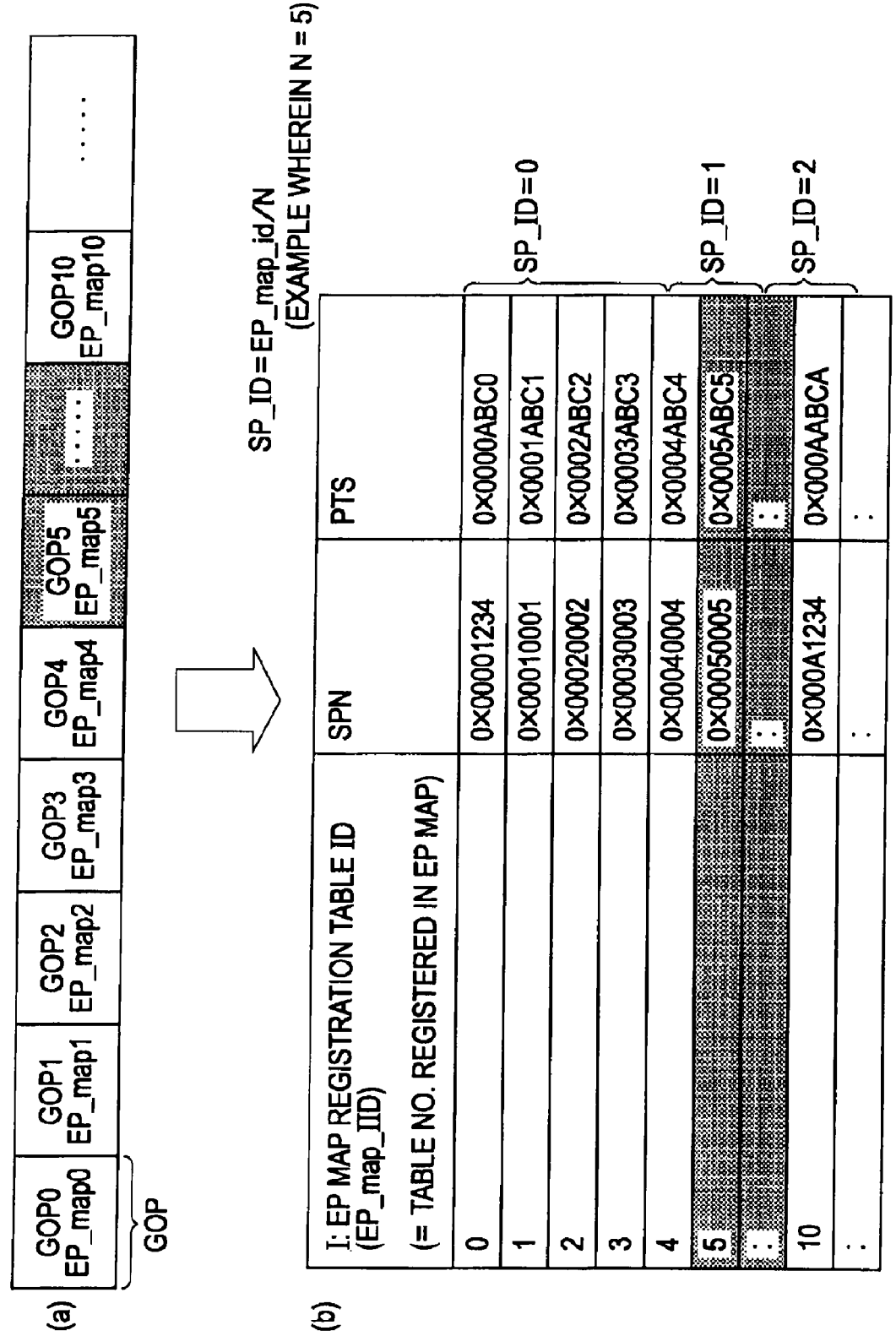

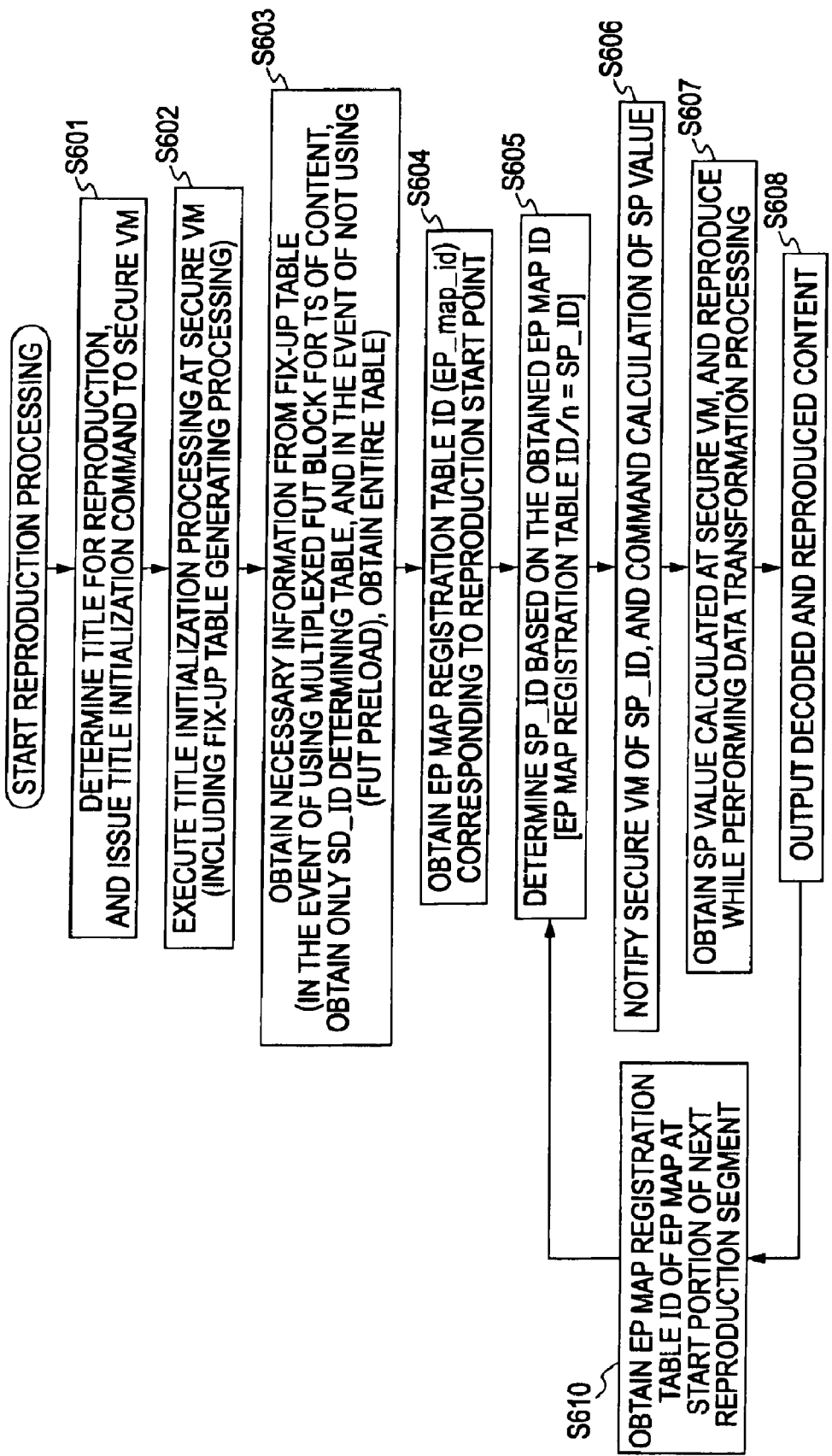

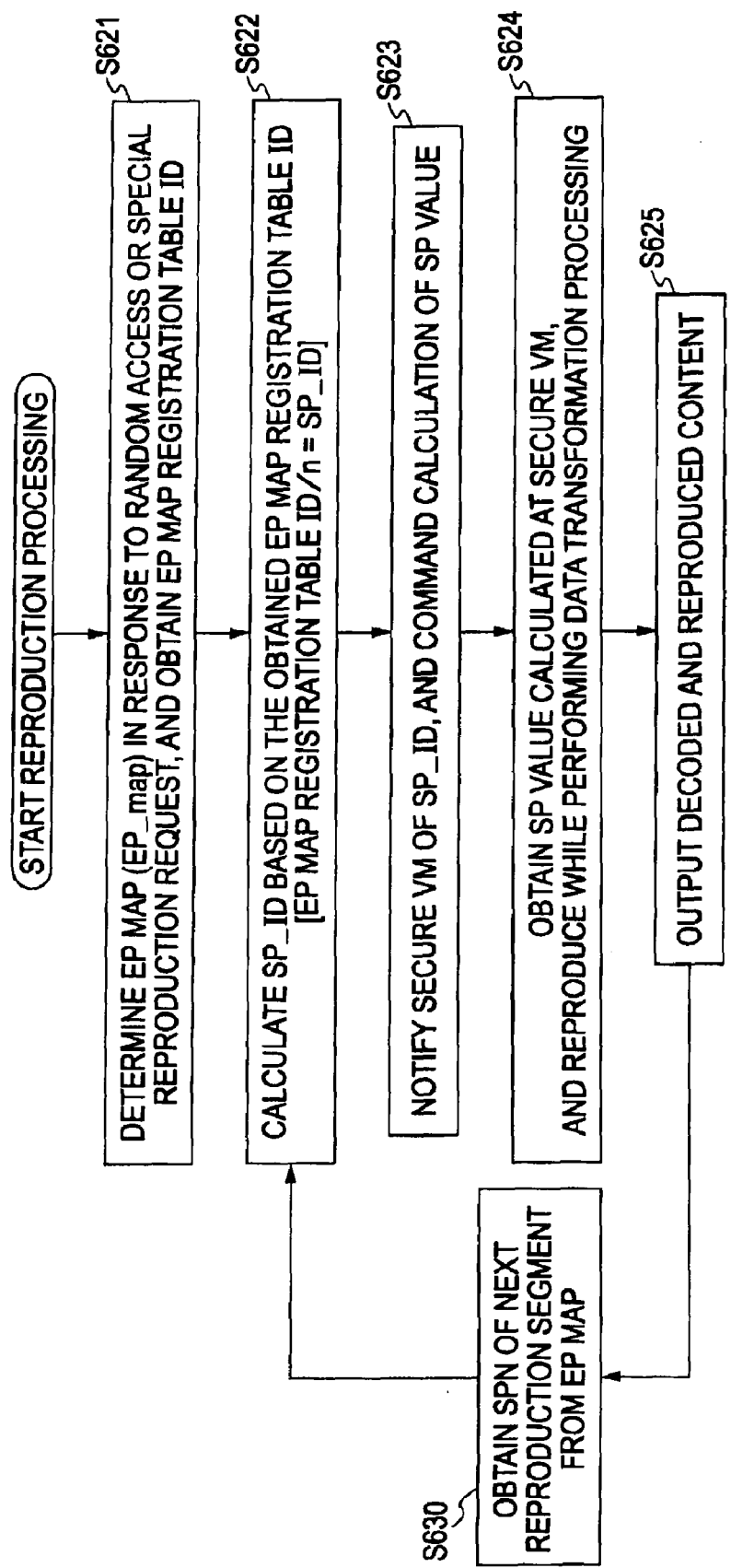

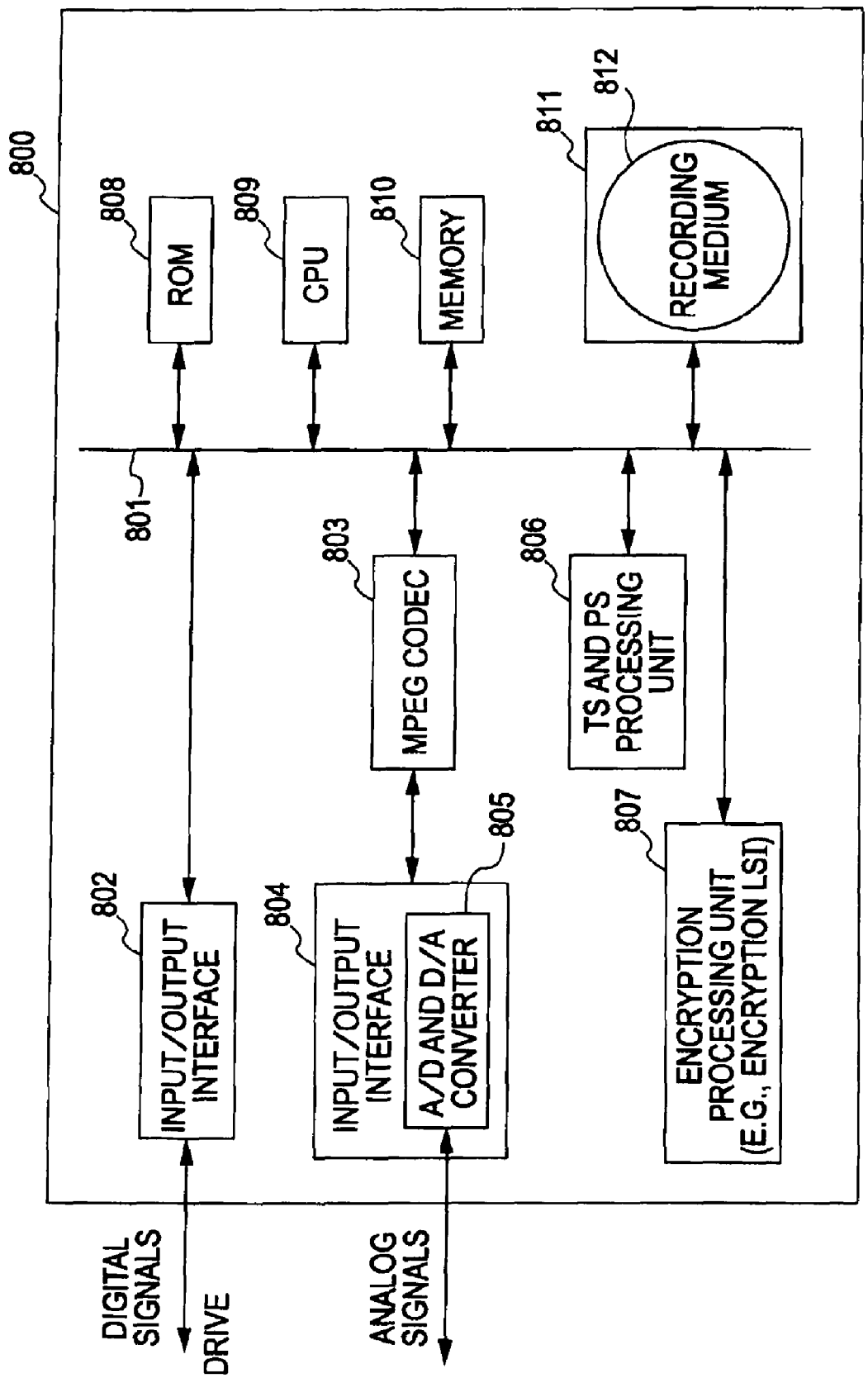

INFORMATION PROCESSING DEVICE, INFORMATION RECORDING MEDIUM MANUFACTURING DEVICE, INFORMATION RECORDING MEDIUM, METHODS THEREFORE, AND COMPUTER PROGRAM

CROSS REFERENCES TO RELATED APPLICATIONS

This application is a Continuation of and is based upon and claims the benefit of priority under 35 U.S.C. §120 for U.S. Ser. No. 11/519,920 filed Sep. 13, 2006, and claims the benefit to U.S. Provisional Patent Application 60/724,803 filed Oct. 11, 2005.

The present invention contains subject matter related to Japanese Patent Application JP 2005-265476 filed in the Japanese Patent Office on Sep. 13, 2005, the entire contents of which are incorporated herein by reference.

BACKGROUND OF THE INVENTION

1. Field of the Invention

The present invention relates to an information processing device, an information recording medium manufacturing device, an information recording medium, methods thereof, and a computer program~ More specifically, the present invention relates to an information processing device, an information recording medium manufacturing device, an information recording medium, methods thereof, and a computer program, wherein unauthorized content usage is eliminated by data transformation processing performed on various contents regarding which content usage management is requested, thereby realizing strict content usage management.

2. Description of the Related Art

Various types of software data, such as audio data like music and so forth, image data like movies and so forth, game programs, various types of application programs and so forth (hereafter referred to as "content") can be stored as digital data in recording media, for example, Blu-ray disks which employ blue laser, or DVD (Digital Versatile Disc), MD (Mini Disc), and CD (Compact Disc). In particular, Blu-ray disks which employ blue laser are high-density recording-capable disks, and can record massive amounts of picture contents and the like as high-image-quality data.

Digital content is stored in such various types of information recording mediums (recording media) so as to be provided to users. Users reproduce and use the content on a reproduction device such as a PC (Personal Computer), disk player, etc., owned by the user.

Generally, the distribution right and so forth of many contents such as music data, image data, and so forth, is held by the creator or vendor thereof. Accordingly, at the time of distribution of content, an arrangement is normally implemented wherein certain restrictions on usage are laid down, i.e., usage of content is permitted only for authorized users, and unauthorized reproduction and the like is prevented.

With digital recording devices and recording media, recording and reproduction can be repeated without deterioration in image or audio for example, and problems are occurring such as distribution of illegally copied contents over the Internet, distribution of so-called bootleg edition disks of contents copied onto CD-Rs or the like, usage of copied contents stored on hard disks of PCs and the like, in proliferation.

Large-capacity recording media such as DVDs, recording media using blue laser which have been developed in recent years, and so forth, are capable of recording great amounts of data, e.g., one to several movies, as digital information on a single disk. The ability to record picture information and the like as digital information makes preventing unauthorized copies to protect copyright holders an even more important issue. Various techniques have been implemented as of recent for preventing unauthorized copying to digital recording devices and recording media, in order to prevent such unauthorized copying of digital data.

SUMMARY OF THE INVENTION

One technique to prevent unauthorized copying of content and protect the copyright holder is encryption processing of the content. However, even with encrypted content, there is the problem that if the secret key is leaked, unauthorized decrypted content leaks out. The arrangement described in Japanese Unexamined Patent Application Publication No. 11-45508 is a related art wherein an arrangement is disclosed of solving such problems. Japanese Unexamined Patent Application Publication No. 11-45508 discloses an arrangement wherein unauthorized reproduction of content is prevented by rewriting a part of the content with dummy data.

At the time of reproduction processing of content wherein content has been replaced with dummy data, processing for replacing the dummy data with the original content data again is necessary. This data transformation processing must be performed without external leakage of the original content, and also, it is preferable that leakage of processing information such as the position of the dummy data and the transformation method is prevented. The current state of the art is that there are still many issues to study regarding such an arrangement for performing such processing at the time of reproduction in a safe manner with information leakage prevented.

The present invention has been made in light of the above-described current state, and accordingly, it is desirable to provide an information processing device, an information recording medium manufacturing device, an information recording medium, methods thereof, and a computer program, wherein prevention of unauthorized content usage is effectively realized by destroying contents by partial replacement of content configuration data, and realizing secure data processing which prevents leakage of information in the reproduction processing.

An information processing device for executing content reproduction processing, according to an embodiment of the present invention, includes: a content reproduction processing unit for executing data transformation processing for replacing a part of configuration data of input content to be reproduced with transformation data, and executing processing for reproducing the reproduction content; and a parameter generating unit for providing the content reproduction processing unit with a parameter to be applied in the data transformation processing; wherein the content reproduction processing unit has a configuration for obtaining a parameter identifier that is different for each segment set as a sectioning region of reproduction content, and outputting a parameter calculation request accompanied by the parameter identifier to the parameter generating unit; and wherein the parameter generating unit has a configuration for providing the content reproducing unit with a parameter corresponding to a segment, in response to the parameter calculation request from the content reproducing unit.

Further, the content reproduction processing unit may have a configuration for subjecting fix-up table data including the transformation data to execution of computation processing or encryption processing applying the parameter corresponding to the segment obtained from the parameter generating unit, and for executing restoration processing of data including the transformation data applied as replacement data as to the configuration data of the segment.

Further, the content reproduction processing unit may have a configuration for executing processing for obtaining a packet number of a configuration packet of a segment included in a reproduction section, from an EP map included in clip information which is content reproduction section information; and referencing a parameter identifier determining table correlating the parameter identifier with a packet number serving as content configuration data, and obtaining a parameter identifier corresponding to a packet number of a configuration packet of the segment.

Further, the parameter identifier determining table may be a table wherein the parameter identifier and the packet number of a packet at the head position of a segment which is content configuration data are correlated.

Further, the packet number may be a source packet number (SPN) corresponding to an I-picture included in an EP map.

Further, the content reproduction processing unit may have a configuration for executing processing for obtaining an EP map registration table ID which is a registration table identifier of an EP map included in clip information which is content reproduction section information; and referencing a parameter identifier determining table correlating the parameter identifier with the EP map registration table ID, to obtain a parameter identifier corresponding to the packet number of a configuration packet of the segment.

Further, the parameter identifier determining table may be a table wherein the parameter identifier, and the EP map registration table ID which is a registration table identifier of an EP map including information of a packet at the head position of a segment which is content configuration data, are correlated.

Further, the content reproduction processing unit may have a configuration for executing processing for obtaining an EP map registration table ID which is a registration table identifier of an EP map included in clip information which is content reproduction section information; and calculating a parameter identifier corresponding to the segment, based on the EP map registration table ID.

Further, the content reproduction processing unit may have a configuration for executing processing for calculating a parameter identifier corresponding to the segment based on the EP map registration table ID, following the following expression:

$$(SP\_ID)=(EP\_map\_ID)/N$$

wherein SP_ID: parameter identifier;
EP_map_ID: EP map registration table ID; and
N: the number of EP map registration tables set corresponding to one segment.

Further, the content reproduction processing unit may have a configuration for executing processing for counting the number of times of usage of an EP map registration table included in clip information which is content reproduction section information, and calculating a parameter identifier corresponding to the segment based on the count for the EP map registration table.

Further, the content reproduction processing unit may have a configuration for executing processing for obtaining fix-up table data including the transformation data from packets contained in the content, executing computation processing or encryption processing applying a parameter corresponding to a segment obtained from the parameter generating unit, and executing restoration processing of data including transformation data applied as replacement data as to configuration data of the segment.

Further, the content reproduction processing unit may have a configuration for executing processing for obtaining fix-up table data including the transformation data from a fix-up table data different and independent from the content, executing computation processing or encryption processing applying a parameter corresponding to a segment obtained from the parameter generating unit, and executing restoration processing of data including transformation data applied as replacement data as to configuration data of the segment.

Further, the parameter calculating unit may have a configuration for being executed by a virtual machine set within the information processing device.

Further, the information processing device may have a configuration for a parameter calculation request from the content reproduction processing unit to the parameter calculating unit being executed as an interruption request, and parameter provision from the parameter calculating unit to the content reproduction processing unit being executed as a response to the interruption request.

An information recording medium manufacturing device according to another embodiment of the present invention includes: a data processing unit for generating content including broken data different from proper content configuration data, and a fix-up table including a parameter identifier determining table storing fix-up table body data stored by subjecting transformation data for replacement with the broken data to computation or encryption processing with a parameter set corresponding to a segment which is a sectioned region of content, and a parameter identifier which is identification information of the parameter; and a data recording unit for recording content including the broken data, and the fix-up table, in an information recording medium.

Further, the parameter identifier determining table may be a table wherein the parameter identifier and the packet number of a packet at the head position of a segment which is content configuration data are correlated.

Further, the parameter identifier determining table may be a table wherein the parameter identifier and an EP map registration table ID which is a registration table identifier of an EP map including information of a packet at the head position of a segment which is content configuration data are correlated.

An information recording medium according to another embodiment of the present invention has stored: content of which a part of content configuration data is replaced and reproduced; a fix-up table having corresponded and registered a parameter identifier set corresponding to a segment wherein the content configuration data is sectioned into multiple segments and set, and transformation data which is an object to be replaced by a part of the content configuration data to be replaced; where the transformation data is data having performed computation or coding processing based on the parameter corresponding to the parameter identifier.

Further, the information recording medium may further have a presentation timestamp (PTS) of the entry point and an EP map to which a packet number which is an address is correlated and registered; wherein the segment is sectioned based on the multiple entry points registered to the EP map.

Further, the segment may be sectioned based on a fixed number of entry points.

An information processing method for executing content reproduction processing, according to another embodiment of the present invention, includes the steps of: content reproduction processing executed in a content reproduction processing unit for data transformation processing for replacing a part of configuration data of input content to be reproduced with transformation data, and processing for reproducing the reproduction content; and parameter generating executed in a parameter generating unit, for providing the content reproduction processing with a parameter to be applied in the data transformation processing; wherein the content reproduction processing has a step for obtaining a parameter identifier that is different for each segment set as a sectioning region of reproduction content and outputting a parameter calculation request accompanied by the parameter identifier to the parameter generating unit; and wherein the parameter generating has a step for providing the content reproducing unit with a parameter corresponding to a segment, in response to the parameter calculation request from the content reproducing unit.

Further, the content reproduction processing may have a step for subjecting fix-up table data including the transformation data to execution of computation processing or encryption processing applying the parameter corresponding to the segment obtained from the parameter generating unit, and for executing restoration processing of data including the transformation data applied as replacement data as to the configuration data of the segment.

Further, the content reproduction processing may have a step for executing processing for obtaining a packet number of a configuration packet of a segment included in a reproduction section, from an EP map included in clip information which is content reproduction section information; and referencing a parameter identifier determining table correlating the parameter identifier with a packet number serving as content configuration data, and obtaining a parameter identifier corresponding to a packet number of a configuration packet of the segment.

Further, the parameter identifier determining table may be a table wherein the parameter identifier and the packet number of a packet at the head position of a segment which is content configuration data are correlated.

Further, the packet number may be a source packet number (SPN) corresponding to an I-picture included in an EP map.

Further, the content reproduction processing may have a step for executing processing for obtaining an EP map registration table ID which is a registration table identifier of an EP map included in clip information which is content reproduction section information; and referencing a parameter identifier determining table correlating the parameter identifier with the EP map registration table ID, to obtain a parameter identifier corresponding to the packet number of a configuration packet of the segment.

Further, the parameter identifier determining table may be a table wherein the parameter identifier, and the EP map registration table ID which is a registration table identifier of an EP map including information of a packet at the head position of a segment which is content configuration data, are correlated.

Further, the content reproduction processing may have a step for executing processing for obtaining an EP map registration table ID which is a registration table identifier of an EP map included in clip information which is content reproduction section information; and calculating a parameter identifier corresponding to the segment, based on the EP map registration table ID.

Further, the content reproduction processing may have a step for executing processing for calculating a parameter identifier corresponding to the segment based on the EP map registration table ID, following the following expression:

$$(SP\_ID)=(EP\_map\_ID)/N$$

wherein SP_ID: parameter identifier;
EP_map_ID: EP map registration table ID; and
N: the number of EP map registration tables set corresponding to one segment.

Further, the content reproduction processing may have a step for executing processing for counting the number of times of usage of an EP map registration table included in clip information which is content reproduction section information, and calculating a parameter identifier corresponding to the segment based on the count for the EP map registration table.

Further, the content reproduction processing may have a step for executing processing for obtaining fix-up table data including the transformation data from packets contained in the content, executing computation processing or encryption processing applying a parameter corresponding to a segment obtained from the parameter generating unit, and executing restoration processing of data including transformation data applied as replacement data as to configuration data of the segment.

Further, the content reproduction processing may have a step for executing processing for obtaining fix-up table data including the transformation data from a fix-up table data different and independent from the content, executing computation processing or encryption processing applying a parameter corresponding to a segment obtained from the parameter generating unit, and executing restoration processing of data including transformation data applied as replacement data as to configuration data of the segment.

An information recording medium manufacturing method according to another embodiment of the present invention includes the steps of: data processing, for generating content of which a part of content configuration data is replaced and reproduced, and a fix-up table having corresponded and registered a parameter identifier set corresponding to a segment wherein the content configuration data is sectioned into multiple segments and set, and transformation data which is an object to be replaced by a part of the content configuration data to be replaced; and data recording, for recording content including the broken data, and the fix-up table, in an information recording medium.

A computer program for executing content reproduction processing on an information processing device according to another embodiment of the present invention includes the steps of: content reproduction processing executed in a content reproduction processing unit for data transformation processing for rewriting a part of configuration data of input content to be reproduced, and processing for reproducing the reproduction content; and parameter generating executed in a parameter generating unit, for providing the content reproduction processing unit with a parameter to be applied in the data transformation processing; wherein the content reproduction processing has a step for obtaining a parameter identifier that is different for each segment set as a sectioning region of reproduction content and outputting a parameter calculation request accompanied by the parameter identifier to the parameter generating unit; and wherein the parameter generating has a step for providing the content reproducing unit with a parameter corresponding to a segment, in response to the parameter calculation request from the content reproducing unit.

Note that the computer program according to the present invention may be, for example, a computer program capable of providing a computer system capable of executing various types of program codes, through storage media or communication media capable of providing in a computer-readable format, e.g., recording mediums such as CDs, FDs, MOs, and so forth, or communication mediums such as a network or the like. Providing such a program in a computer-readable format realizes processing corresponding to the program on the computer system.

Other objects, features, and advantages of the present invention will become apparent from further detailed description by way of later-described embodiments of the present invention and attached drawings. Note that the term "system" as used in the present specification refers to a logical assembly arrangement of multiple devices, and is not restricted to an arrangement wherein all of the component devices are in the same housing.

According to an embodiment of the present invention, with a configuration for restoring and obtaining data transformed by parameter computation or encryption processing different for each segment set as sectioning region of content, and executing reproduction of the content while replacing a part of the data of the content with the obtained transformation data, a configuration may be realized wherein a parameter ID corresponding to a segment is obtained based on a table correlating an SPN (source packet number) included in the content to be reproduced and a parameter ID (SP_ID), or based on a table correlating a registration table identifier of an EP map (EP map registration table ID) storing information of a packet included in a segment of the content to be reproduced and a parameter ID, the obtained parameter ID (SP_ID) is notified to a secure VM, and a secret parameter calculation request (INTRP) is carried out, so content reproduction can be performed while performing proper data transformation by sequentially receiving secret parameters (SP) corresponding to each segment from the secure VM in a proper manner.

Also, according to an embodiment of the present invention, a configuration may be implemented wherein a reproduction (player) application of executing content reproduction first determines an EP map corresponding to the content data to be reproduced from an EP map registered in clip information which is content reproduction section information, and obtains a parameter ID (SP_ID) either by applying a calculation formula of by a count of EP map registration tables, based on the registration table identifier of the EP map (EP map registration table ID), the obtained parameter ID (SP_ID) is notified to a secure VM, and a secret parameter calculation request (INTRP) is carried out, so the parameter ID (SP_ID) can be obtained without applying a special parameter ID determining table, and content reproduction can be performed while performing proper data transformation by sequentially receiving secret parameters (SP) corresponding to each segment from the secure VM in a proper manner.

BRIEF DESCRIPTION OF THE DRAWINGS

FIG. 7 is a diagram illustrating the data configuration of fix-up entries included in a fix-up table;

FIG. 19 is a diagram illustrating the entire data configuration of a fix-up table;

FIG. 28 is a diagram describing the overview of a processing example 3 for obtaining an SP identifier (SP_ID) corresponding to a segment;

FIG. 29 is a diagram illustrating a flowchart describing a content reproducing sequence in a case of applying the processing example 3 for obtaining an SP identifier (SP_ID) corresponding to a segment;

FIG. 30 is a diagram illustrating a flowchart describing a content reproducing sequence for special reproduction in a case of applying the processing example 3 for obtaining an SP identifier (SP_ID) corresponding to a segment; and FIG. 31 is a diagram describing a hardware configuration example of an information processing device for executing applications as a host.

DESCRIPTION OF THE PREFERRED EMBODIMENTS

The information processing device, information recording medium manufacturing device, information recording medium, methods thereof, and computer program, according to the present invention, will be described in detail with reference to the drawings. Note that the description will be made according to the following items.

Figure 1:
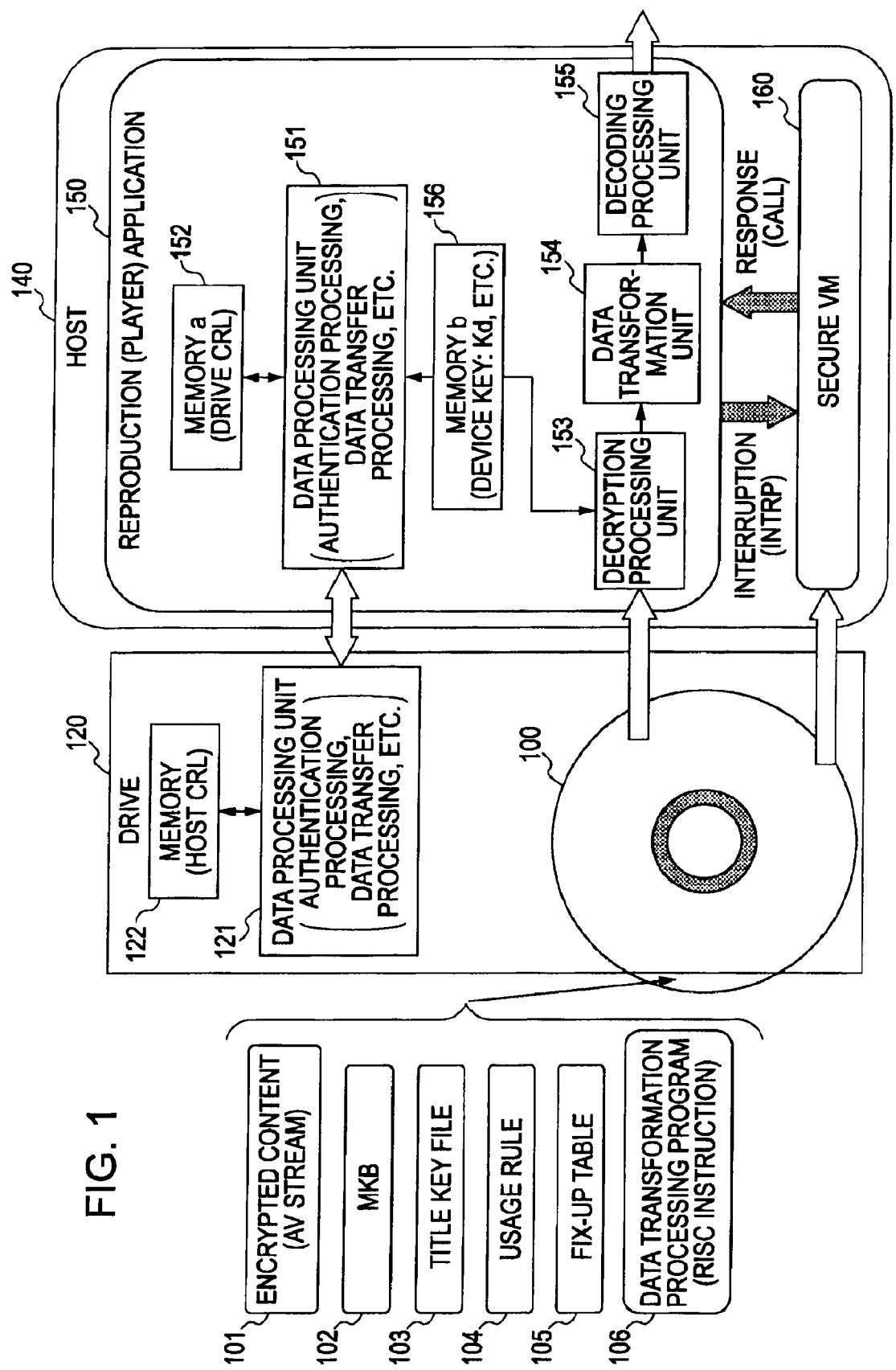
FIG. 1 is a diagram describing the configuration and processing of stored data in an information recording medium, and a drive device and information processing device.

1. Overview of Stored Data in an Information Recording Medium, and Processing at a Drive and a Host
2. About the Content Managing Unit (CPS unit)
3. Overview of Data Configuration of Content Including Modified Data, and Data Transformation Processing
4. Processing of Reproduction (Player) Application and Secure VM
5. Content Reproduction Processing
6. Processing for Obtaining SP Identifier (SP_ID) Corresponding to Segment]
  (6.1) Processing Example 1 for Obtaining SP Identifier (SP_ID) Corresponding to Segment
  (6.2) Processing Example 2 for Obtaining SP Identifier (SP_ID) Corresponding to Segment
  (6.3) Processing Example 3 for Obtaining SP Identifier (SP_ID) Corresponding to Segment
7. Configuration of Information Processing Device
8. Information Recording Media Manufacturing Device and Information Recording Medium 1. Overview of Stored Data in an Information Recording Medium, and Processing at a Drive and a Host First, description will be made regarding the overview of stored data in an information recording medium, and processing at a drive and a host. FIG. 1 illustrates the configuration of an information recording medium 100 with content stored therein, a drive 120, and a host 140. The host 140 is a data reproduction (or recording) application which is executed on an information processing device such as a PC or the like, for example, and performs processing using the hardware of the information processing device such as a PC or the like, following a predetermined data processing sequence.

The information recording medium 100 is an information recording medium such as, for example, a Blu-ray disk, DVD, or the like, and is an information recording medium storing authorized content (ROM disc or the like), manufactured at the disc manufacturing plant under the permission of the so-called content right holder, having proper content rights or distribution rights, or an information recording medium capable of recording data (RE disk or the like). Note that with the following embodiment, a disk-type medium will be used as an example for describing the information recording medium, the present invention is capable of being applied to configurations using various types of information recording media.

As shown in FIG. 1, the information recording medium 100 stores in encrypted content 101 which has been subjected to encryption processing and partial replacement of data, MKB (Medium Key Block) 102 which is the encryption key block generated based on a tree structure key distribution method known as a type of broadcast encryption method, a title key file 103 configured of data wherein a title key to be applied for content decryption processing is encrypted (Encrypted CPS Unit Key) and so forth, usage rule 104 including CCI (Copy Control Information) and the like serving as copying/reproduction control information of content, a Fix-Up Table 105 wherein is registered transformation data corresponding to replacement data at a predetermined region within the content, and a data transformation processing program 106 including processing commands for executing the data transformation processing and Fix-Up Table 105. Note that the data example shown in the diagram is but an example, and the stored data differs more or less depending on the type of disk. The overview of each of these types of information will be described.

(1) Encrypted Contents 101

Various types of contents are stored in the information recording medium 100. Examples of the contents include AV (Audio Visual) streams of moving picture contents such as HD (High-Definition) movie content which is high-definition moving picture data, game programs of a format stipulated under a particular standard, image files, audio data, text data, and so forth. These contents are data stipulated under a particular AV format, and are stored according to the particular AV data format. Specifically, this is stored according to the Blu-ray disk ROM standard format, as Blu-ray disk ROM standard data, for example.

Further, there are cases wherein game programs, image files, audio data, text data, and so forth, are stored as service data, for example. There are cases wherein these contents are stored as data having a data format not following the particular AV data format.

Types of contents include various contents such as music data, moving picture, still images, and like image data, as well as game programs, Web contents, and so forth, and information of various forms is included in these contents, such as content information usable only by the data from the information recording medium 100, content information usable by combining data from the information recording medium 100 and data provided from the server connected to a network, and so forth. Contents stored in the information recording medium are stored encrypted, with a different key appropriated for each section content (CPS unit key or unit key (or also may be called a title key)), to realize different usage control for each section content. Each unit to which one unit key is appropriated is called a content managing unit (CPS unit). Further, the configuration data of the content is set as broken data wherein a part thereof that is replaced with data different from the correct content data, so decryption processing alone does not reproduce the correct content, and processing for replacing the broken data with data registered in a fix-up table is necessary to perform reproduction. This processing will be described later in detail.

(2) MKB

The MKB (media key block) 102 is an encryption key block generated based on a tree structure key distribution method known as a type of broadcast encryption method. The MKB 102 is a key information block enabling acquiring of a media key [Km] necessary for decrypting contents, only for processing (decryption) based on a device key [Kd] stored on the information processing device of the user having a valid license. This is an application and then information distribution method following a so-called hierarchical tree structure, enabling the acquiring of the media key [Km] only in the event that the user device (information processing device) has a valid license, and user devices which are invalidated (revoking processing) are incapable of acquiring a media key [Km].

An administration center serving as a license entity can generate an MKB having a structure which cannot be decrypted with the device key stored in a certain user device, i.e., wherein the media key necessary for content decryption cannot be acquired, by changing the device key used for decryption of key information stored in the MKB. Accordingly, unauthorized devices can be an revoked at an arbitrary timing, thereby providing encrypted contents capable of decryption only to devices having valid licenses. Content decryption processing will be described later.

(3) Title Key File

As described above, each content or group of multiple contents are subjected to encryption applying a individual encryption keys for each (title key (CPS unit key)) for managing usage of contents, and stored in the information recording medium 100. That is to say, AV (audio visual) streams, music data, moving pictures, still images, and like image data, game programs, Web content, and so forth, making up the contents, need to be sectioned into units of management of contents usage, with a different title key generated for each section unit, thereby carrying out decryption processing. Information for generating these title keys is title key data, and a title key is obtained by decrypting an encrypted title key with a key generated by a media key or the like, for example. Title keys corresponding to each unit are generated following a predetermined encryption key generating sequence using title key data, and decryption of contents is carried out.

(4) Usage Rule

Usage rule includes, for example, copy/reproduction control information (CCI). This is copy restriction information and reproduction restriction information for usage control corresponding to the encrypted contents 101 stored in the information recording medium 100. There are various settings for the copy/reproduction control information (CCI), such as cases as information for individual CPS units set as content managing units, cases for being set corresponding to multiple CPS units, and so forth.

(5) Fix-Up Table

As described above, the encrypted content 101 stored in the information recording medium 100 has been subjected to predetermined encryption, and also, a part of the contents configuration data is configured of broken data which is different from the proper data. In order to reproduce the content, data overwriting processing is necessary, wherein the broken data is replaced with the transformation data which is the proper content data. The table in which the transformation data is registered is a fix-up table 105. A great number of broken data is set scattered throughout the content, and at the time of reproducing the content, processing is necessary for replacing (overwriting) the multiple pieces of broken data with the transformation data registered in the fix-up table. Applying this transformation data means that even in the event that unauthorized content decryption is performed due to an encryption key leaking, for example, reproduction of proper content is impossible by content decryption alone, due to the presence of the replaced data, thereby enabling unauthorized contact usage to be prevented.

In addition to normal transformation data, the fix-up table 105 includes transformation data enabling analyzing data identification information configuration bits for identifying the contents reproducing device or content reducing application. Specifically, for example, this includes a player ID which is identification data of a player (a device for executing a host application), or "transformation data including identification marks" wherein is recorded identification information generated based on the player ID. Transformation data including the identification marks is data where in the bid values of the proper content data has been slightly changed, at the level which does not affect the reproduction of content. Details of processing using such transformation data will be described later.

While FIG. 1 illustrates an example wherein the fix-up table 105 is set as an independent data file, a configuration may be made wherein the fix-up table is not an independent file, but scattered throughout the configuration packets of the encrypted contents 101. The configuration and processing of these will be described later.

(6) Data Transformation Processing Program

The data transformation processing program 106 is a program including processing commands for executing the data transformation processing by registered data in the fix-up table 105, and is used by a host which reproduces the content. This is executed at a data transformation processing unit 154 of the host 100 shown in FIG. 1. Note that the above-described fix-up table 105 may be set as data included in the data transformation processing program 106.

At the host, a virtual machine (VM) for executing the data transformation processing is set, the data transformation processing program 106 read out of the information recording medium 100 is executed at the virtual machine (VM), a registration entry in the fix-up table 105 is applied, and data transformation processing of the partial configuration data is executed with regard to the decrypted content. Details of this processing will be described later.

Next, the configuration of the host 140 and drive 120, and overview of processing, will be described with reference to FIG. 1. Reproduction processing of the content stored in the information recording medium 100 is executed upon data being transferred to the host 140 via the drive 120.

The host 140 has a reproduction (player) application 150 and a secure VM 160 set. The reproduction (player) application 150 is a content reproduction processing unit, and executes processing such as authentication processing carried out with the drive at the time of content reproduction processing, content decryption, decoding processing, and so forth. The secure VM 160 functions as a parameter generating unit for providing parameters to be applied to the data transformation processing carried out in the content reproduction processing executed by the reproduction (player) application 150 which is the content reproduction processing unit, for example, the secure VM 160 is set as the virtual machine within the host 140. The virtual machine (VM) is a virtual computer which directly interprets and executes an intermediate language, and reads out, interprets, and executes, command code information in an intermediate language not dependent on a platform, from the information recording medium 100.

Transfer of information or processing requests between the reproduction (player) application 150 and the secure VM 160 is carried out by sequences of interruption (INTRP) from the reproduction (player) application 150 to the secure VM 160, and a response (Call) processing from the secure VM 160 to the reproduction (player) application 150. The sequences of interruption (INTRP) from the application 150 to the secure VM 160, and response (Call) processing from the secure VM 160 to the reproduction (player) application 150 perform parameter calculating requests and providing of parameters applied to the data transformation processing executed in the content reproduction processing. These processing sequences will be described in detail later.

The primary processing which the host 140 executes will be described. Before usage of the content, mutual authentication processing is executed between the drive 120 and host 140, and following confirmation of the validity of both parties by this authentication processing being established, encrypted content is transferred from the drive to the host, content decryption processing is performed at the host side, and further, the above-described data transformation processing by the fix-up table is executed, whereby content reproduction is performed.

For the mutual authentication executed between the host 140 and the drive 120, processing for determining the validity is executed by referencing a revocation (invalidation) list issued by an Administration Center whether or not each of the devices or applications are registered as an unauthorized device or application.

The drive 120 has memory 122 for storing a host CRL (Certificate Revocation List) storing revocation (invalidation) information of the host certificate (public key certificate). On the other hand, the host 140 has memory 152 for storing a drive CRL (Certificate Revocation List) storing revocation (invalidation) information of the drive certificate (public key certificate). The memory is nonvolatile memory (NVRAM), and in the event that the CRL read out from the information recording medium 100 is a newer version, for example, their respective data processing units 121 and 151 performer updating processing for storing the host CRL or the drive CRL of the new version in the memory 122 and 152.

A CRL, such as the host CRL or drive CRL is constantly updated by the administration center. That is to say, in the event that an unauthorized device has been newly discovered, an updated CRL where in the certificate ID issued to the unauthorized device or the device ID or the like is added at as a new entry, is issued. Each CRL is provided with the version number, and has a configuration wherein the newness can be compared. For example, in the event that a CRL read out from an information recording medium mounted to the drive is newer than the CRL stored in the memory 122 within the drive, the drive performs CRL updating processing. The host 140 also performs drive CRL updating in the same way.

Besides this CRL updating processing, the data processing unit 121 of the drive 120 performs authentication processing with a host that is executed at the time of using content, and further performs processing for reading data from the information recording medium and transferring the data to the host.

The reproduction (player) application 150 of the host 140 is a data reproduction (or recording) application executed on an information processing device such as the PC for example, and performs processing using the hardware of the information processing device such as a PC or the like, following a predetermined data processing sequence.

The host 140 has a data processing unit 151 for performing mutual authentication processing with the drive 120, data transfer control, and so forth, a decryption processing unit 153 for performing decryption processing of encrypted content, a data transformation processing unit 154 for performing data transformation processing based on registered data in the aforementioned fix-up table 105 and a decoding processing unit 155 for performing decoding (e.g., MPEG decoding) processing.

The data processing unit 151 executes authentication processing between the host and drive, and within the authentication processing, references the drive CRL stored in memory a152 which is nonvolatile memory (NVRAM), to confirm that the drive is not a drive which has been revoked.

The host also performs updating processing to store the drive CRL of a new version in the memory a152.

The decryption processing unit 153 generates the key to be applied to content decryption, using various types of information stored in the memory b156 and data read from the information recording medium 100, executing decryption processing of the encrypted content 101. The data transformation processing unit 154 performs replacement processing (overwriting) of contents configuration data applying the transformation data registered in the fix-up table obtained from the information recording medium 100, following the data transformation processing program obtained from the information recording medium 100. The decoding processing unit 155 performs decoding (e.g., MPEG decoding) processing.

The memory b156 of the information processing device 150 stores a device key: Kd, key information to be applied to mutual authentication processing, key information to be applied to decryption, and so forth. Details of content decryption processing will be described later. The device key: Kd is a key to be applied to the above-described MKB processing. MKB is a key information block which enables obtaining of a media key [Km], which is a key necessary for deciphering content, to be obtainable only by processing (decrypting) based on a device key [Kd] stored in the information processing device of the user which has a valid license, and at the time of decrypting encrypted content, the information processing device 150 applies the device key: Kd stored in the memory b156 to execute the MKB processing. Details of content decryption processing will be described later.

2. About the Content Managing Unit (CPS Unit)

As described above, the content stored in the information recording medium is subjected to decryption processing and is stored with different keys appropriated for each unit, in order to realize different usage control for each unit. That is to say, the content is sectioned into content managing unit (CPS units), individual decryption processing is performed, and individual usage management is made.

At the time of using contents, first, there is the need to obtain a CPS unit Key (also called a title key) appropriated to each unit, and further, reproduction is performed by executing data processing based on decryption processing sequences determined beforehand, applying other necessary keys, key generating information, and so forth. The settings of a content management unit (CPS unit) will be described with reference to FIG. 2.

Figure 2:
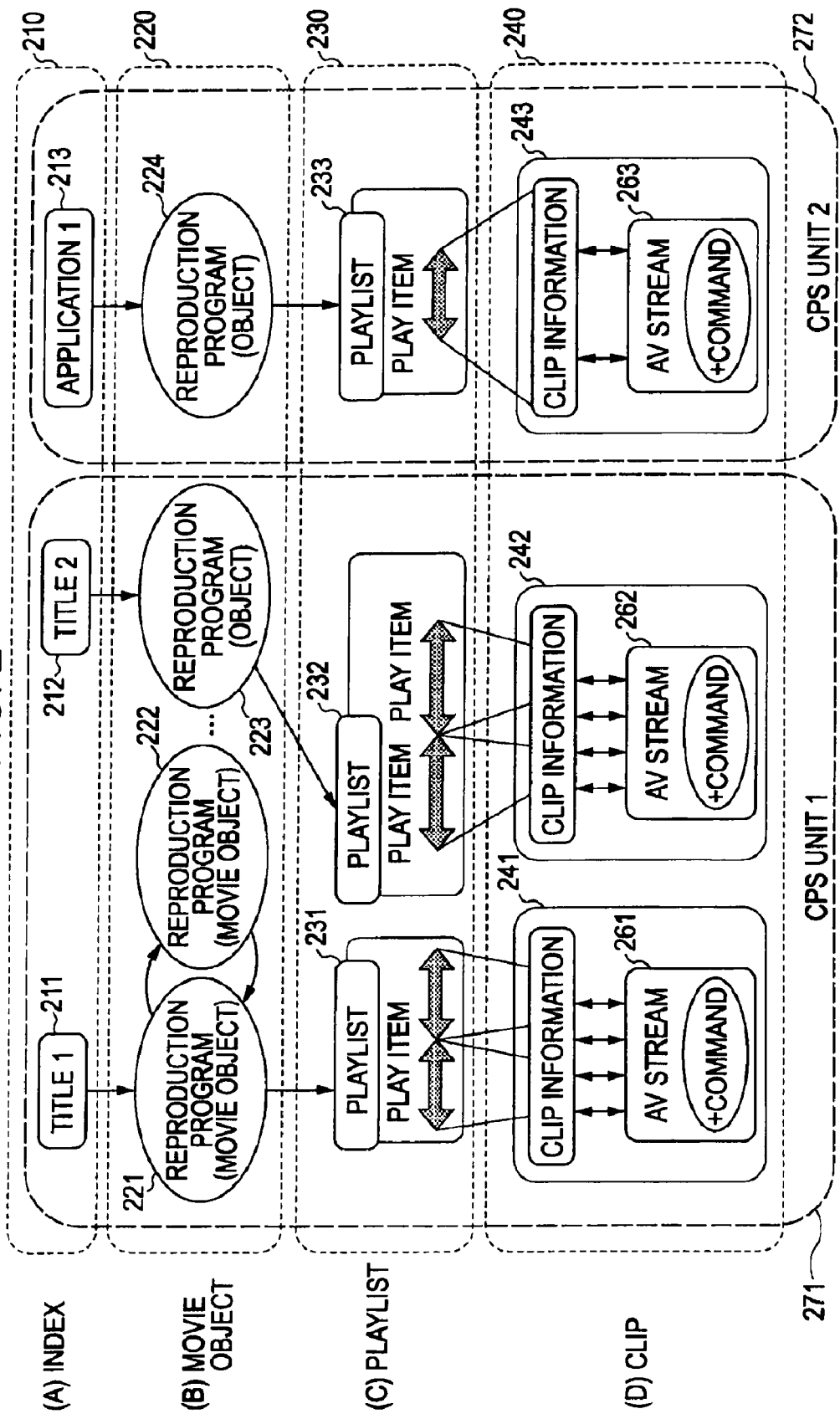
FIG. 2 is a diagram describing a setting example of a content managing unit for settings made regarding stored data in the information recording medium.

As shown in FIG. 2, the content has a hierarchical configuration of (A) index 210, (B) movie object 220, (C) playlist 230, and (D) clip 240. Specifying an index such as a title to be accessed by the reproduction application specifies a reproduction program correlated with the title, for example, and the play list stipulating the order of reproducing the content is selected according to the program information of the reproduction program that has been specified.

Play items are included in the play list as information of the data to be reproduced. An AV stream which is actual data of the content, or commands, are selectively read out by clip information for reproduction sections stipulated by play items included in the play list, and reproduction of the AV stream and execution processing of the commands are performed. Note that a great number of playlists and play items exist, and each has a corresponding playlist ID and play item ID, as identification information.

FIG. 2 illustrates two CPS units. These make up a part of the content stored in the information recording medium. Each of the CPS unit 1 271, and the CPS unit 2 272 are CPS units which have been set as units including a title serving as an index, a movie object which is a reproduction program file, a play list, and a clip including an AV stream file which is the actual contents data.

A content managing unit (CPS unit) 1 271 includes a title 1 211 and title 2 212, reproduction programs 221 and 222, play lists 231 and 232, a clip 241 and a clip 242, and AV stream data files 261 and 262 which are the actual data of the content contained in the two clips 241 and 242 are at least the object data of encryption, and accordingly is set as data encrypted applying a title key (Kt1) which is an encryption key set corresponding to the content managing unit (CPS unit) 1 271 as a rule (also called a CPS unit key).

A content managing unit (CPS unit) 2 271 includes an application 1 213 as an index, a reproduction program 224, playlist 233, and a clip 243, and an AV stream data file 263 which is the actual data of the content contained in the clip 243 is encrypted applying a title key (Kt2) which is an encryption key set corresponding to the content managing unit (CPS unit) 2 272.

For example, in order for the user to execute an application file or content reproducing processing corresponding to the content managing unit 1 271, a title key: Kt1 serving as an encryption key which is set so as to be correlated with the content managing unit (CPS unit) 1 271, needs to be obtained and subjected to decryption processing. In order for the user to execute an application file or content reproducing processing corresponding to the content managing unit 2 272, a title key: Kt2 as an encryption which is set so as to be correlated with the content managing unit (CPS unit) 2 272, needs to be obtained and subjected to decryption processing.

Figure 3:
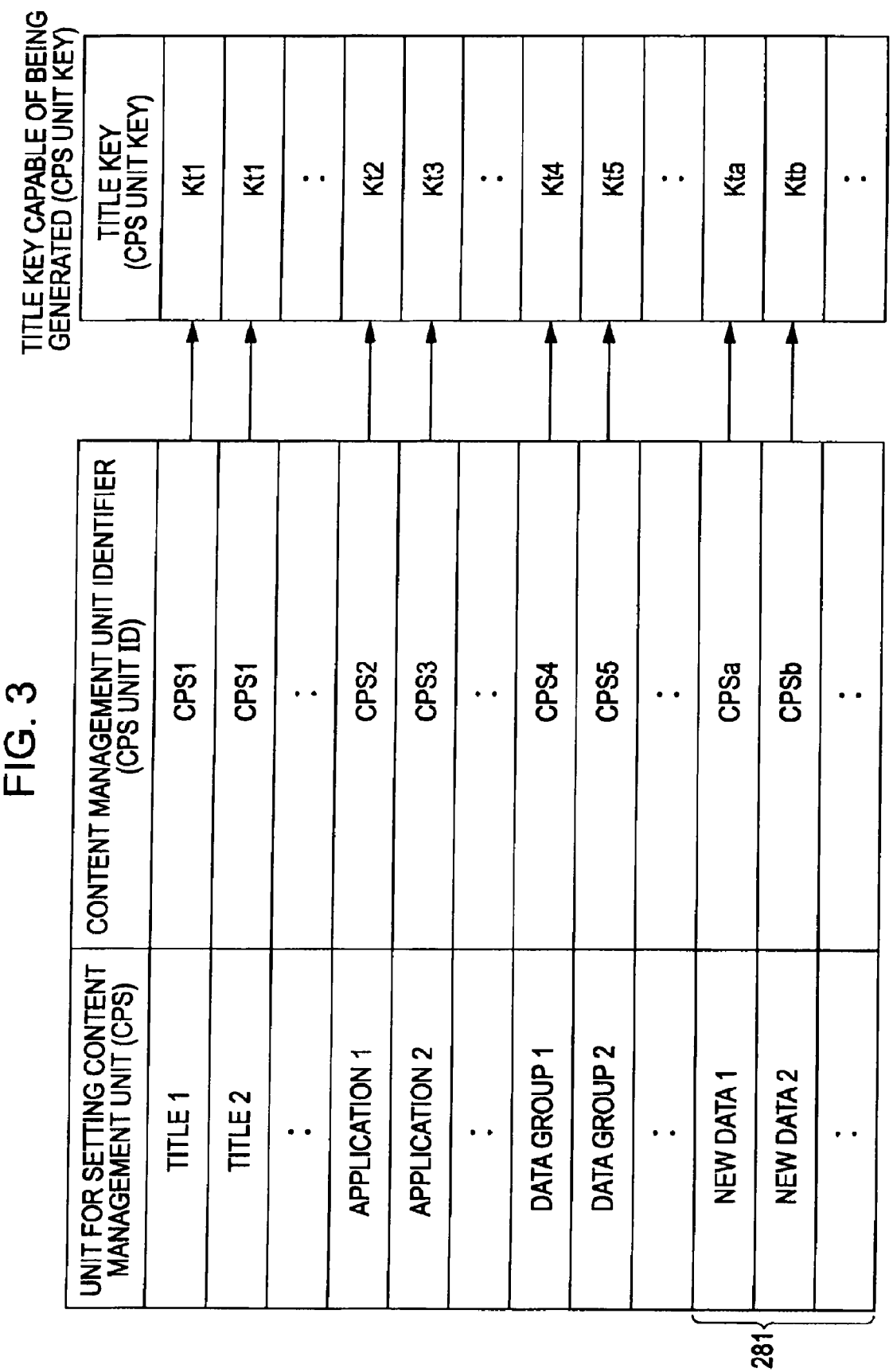
FIG. 3 is a diagram describing the correlation between the content managing unit for settings made regarding stored data in the information recording medium and a unit key.

FIG. 3 shows the CPS unit setting configuration, and example of corresponding title keys. FIG. 3 shows correlation between CPS unit setting units which are units for managing usage of the encrypted content stored in the information recording medium, and title keys (the CPS unit keys) applicable to each CPS unit. Note that a CPS unit and title key for data to come later may be stored and set beforehand. For example, the data unit 281 is entries for data to come later.

CPS unit setting units come in a wide variety, such as content titles, applications, data groups, and so forth, and each CPS unit managing table has set therein CPS unit IDs serving as identifiers corresponding to each of the CPS units.

In FIG. 3, title 1 for example is the CPS unit 1, and at the time of decrypting encrypted content belonging to the CPS unit 1, generating the title key Kt1 and performing decryption processing based on the generated title key Kt1 is necessary.

In this way, the content stored in the information recording medium 100 is stored in a manner having been subjected to encryption processing with different encryption keys appropriated to each of the units, in order to realize usage control different for each of the units. UR (usage rules) for each of the content managing unit (CPS unit) are set for individual usage management with regard to each content managing units (CPS unit). Usage rules are information including, e.g., copy/reproduction control information (CCI) of content, as described above, and is copy restriction information or reproduction restriction information of the encrypted content contained in each of the content managing units (CPS units).

Data processing applying various types of information stored in the information recording medium is necessary for generating a title key. Specific examples of such processing will be described later in detail.

3. Overview of Data Configuration of Content Including Modified Data, and Data Transformation Processing Next, description will be made regarding the overview of data configuration of content including modified data, and data transformation processing. As described above, encrypted content 101 included in the information recording medium 100 is set as broken data wherein part of the configuration data is replaced with data different from the proper content data, so that decryption processing alone does not perform content reproduction at the time of reproduction, and processing for replacing the broken data with the transformation data registered in the fix-up table is necessary.

The configuration of content stored in the information recording medium, and the overview of reproduction processing, will be described with reference to FIG. 4. For example, AV (Audio Visual) content such as a movie is stored in the information recording medium 100. These contents are subjected to encryption, and content reproduction is possible following decryption by processing applying an encryption key obtainable only by a reproduction and device having a certain license. Specific content reproduction processing will be described later. The content stored in the information recording medium 100 is not only encrypted, but also has a configuration wherein the content configuration data has been replaced with modified data.

Figure 4:
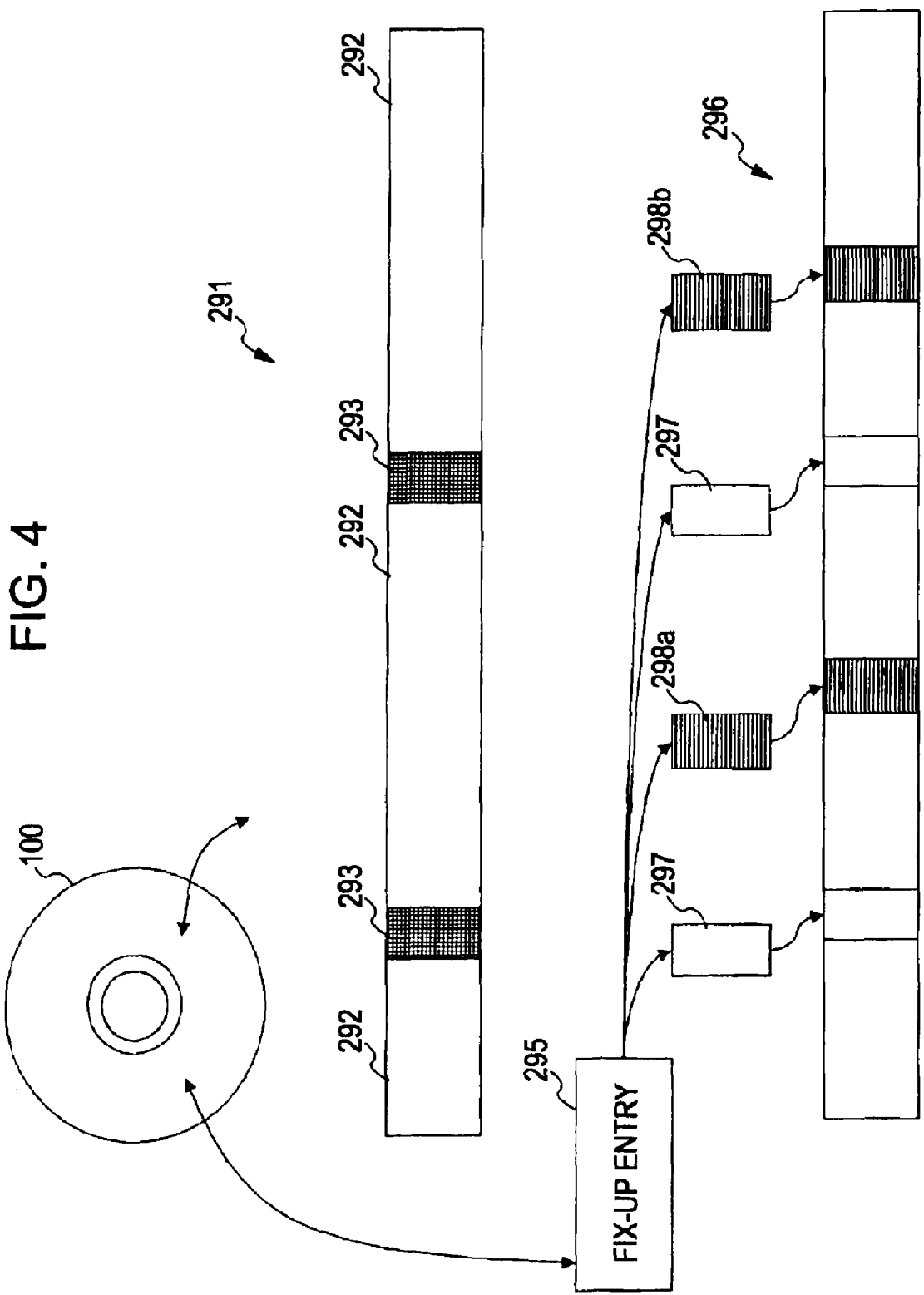
FIG. 4 is a diagram describing content recorded in the information recording medium, and data transformation processing necessary for reproducing the content.

FIG. 4 illustrates the configuration example of a recorded content 291 stored in the information recording medium 100. The recorded content 291 is configured of normal content data 292 which has not been modified, and broken data 293 which is content that has been destroyed by being modified. The broken data 293 is data which has been destroyed by the original content having been subjected to data processing. Accordingly, proper content reproduction cannot be performed with this content 291 including the broken data.

In order to perform content reproduction, processing for replacing the broken data 293 included in the recorded content 291 with a proper content data, to generate reproduction content 296, is necessary. Data for transforming (transformation data) which is the normal content data corresponding to each of the broken data regions is obtained by obtaining the transformation data 295 [Fix-up Entry 295] registered in the fix-up table (FUT) 105 (see FIG. 1) recorded in the information recording medium 100, executing processing for replacing with the data of the broken data region, thereby generating and reproducing the reproduction content 296. Specific examples of a fix-up table, and details of reproduction processing using a fix-up table, will be described later.

Now, at the time of generating reproduction content 296, in addition to the processing for replacing the broken data 293 with transformation data 297 which is normal content data, processing is performed for replacing a partial region of the recorded content 291 with identifier-set transformation data 298 including data enabling analysis of the configuration bits of identification information making a content reproduction device or content reproduction application identifiable (e.g., a player ID). For example, in a case of unauthorized copied content leaking out, analyzing the identifier-set transformation data 298 within the leaked content can enable the source of leakage of the unauthorized content to be determined.

Note that the fix-up table storing the transformation data is recorded in the information recording medium, set as a file separate from the content. Further, a part of the data in the fix-up table including the transformation data is recorded in a manner scattered throughout certain packets in the configuration data of the content. That is to say, the transformation data is stored in the fix-up table 105 shown in FIG. 1, and is also scattered and recorded in the encrypted content 101, so as to be recorded in duplicate. An information processing device for executing content reproduction either obtains transformation data stored in the fix-up table 105 to execute data replacement, or obtains a transformation entry recorded in a scattered manner through the content, to execute data replacement.

Figure 5:
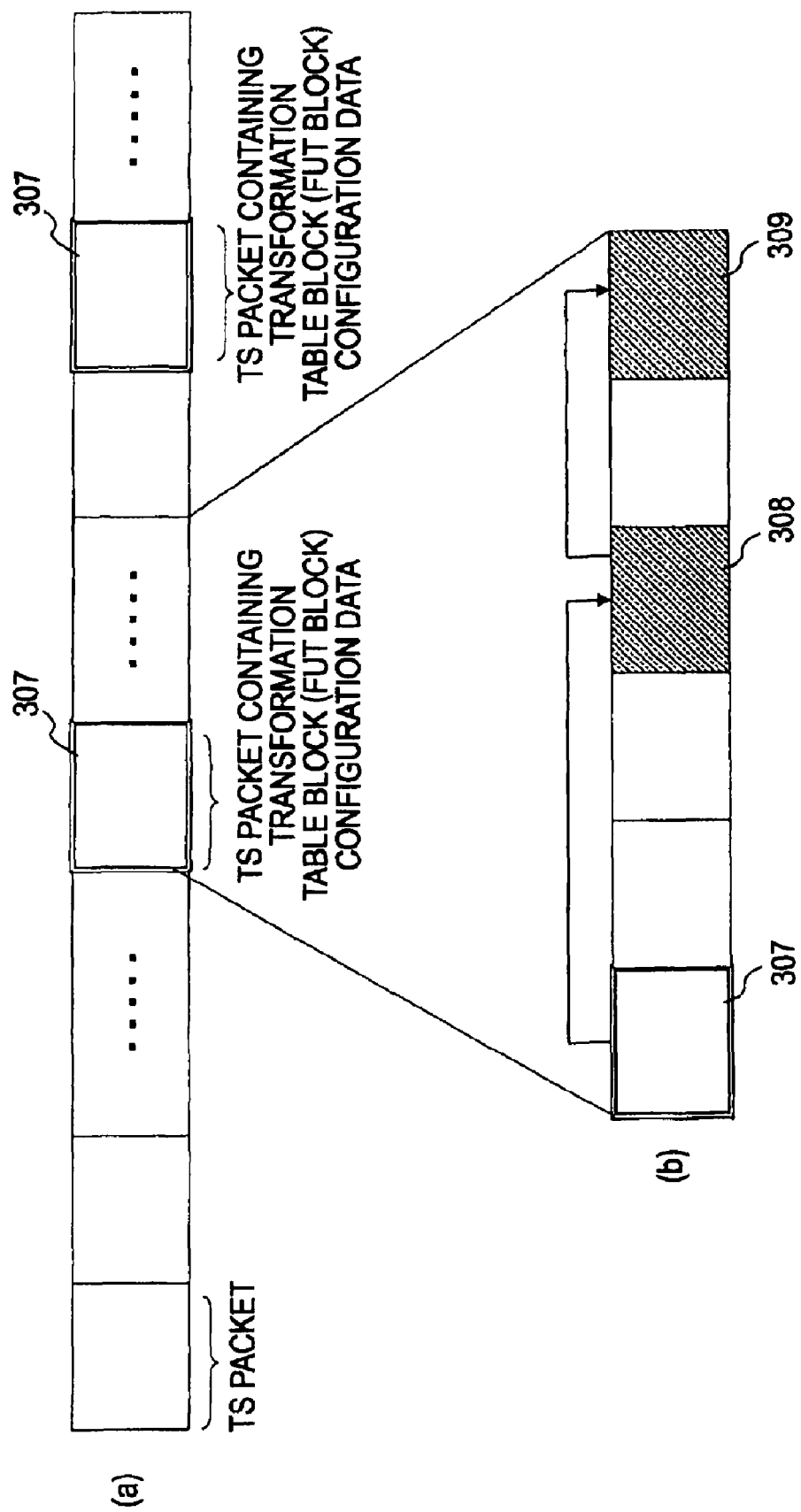
FIG. 5 is a diagram describing data configuration in the case of a fix-up table being stored in packets of a transport stream including content.

In the event of a configuration of recording in a fix-up table block, which is fix-up table configuration data including transformation data scattered throughout certain packets within the content configuration data, the fix-up table block configuration data is stored in transport stream packets including content, with a setting such as shown in FIG. 5, for example. In FIG. 5, (a) illustrates the configuration of content data. This content configuration illustrates content data made up of decrypted transport stream (TS) packets. The transport stream is configured from TS (Transport Stream) packets having a predetermined number of bytes. Configuration data of the fix-up table block including the transformation data is recorded in a part of the multiple packets of these TS packets, in a divided matter. For example, recording is made in the TS packet 307 shown in the drawing. An example of TS packets used for storing fix-up table blocks include TS packets including PMT (program map table) set in a scattered matter throughout the content, and so forth.

Recorded in a fix-up table block is transformation data for performing a replacement processing with regard to the decrypted content (or identifier-set transformation data), and the recorded position of the transformation data. As for recording position information, in the event that there are multiple recording positions such as shown in (b) in FIG. 5, for example, the offset from the TS packet 307 including the fix-up entry which is the configuration data of the fix-up table block, is recorded for the first modified packet position, and the offset position indicates the relative packet position from the first modified packet 308 to the subsequent modified packet 309 is recorded for the modified packet position of the second packet.

The transformation data recorded in each of the fix-up table blocks has the recorded position set nearby a TS packet including a fix-up entry serving as configuration data of each of the fix-up table blocks, as shown in (b) in FIG. 5, for example.

In the example shown in (b) in FIG. 5, for example, the packets 308 and 309 having transformation data recording regions are set nearby the packet 307 having a fix-up entry which is configuration data of the fix-up table block. Such setting enables data replacement processing using transformation data as continuous processing following decryption in the case of decrypting and reproducing a content in real-time, and detection and analysis processing of TS packets recording the fix-up table allows processing for obtaining the transformation data and writing the transformation data to the position recorded in the table (overwriting) to be carried out effectively.

Figure 6:
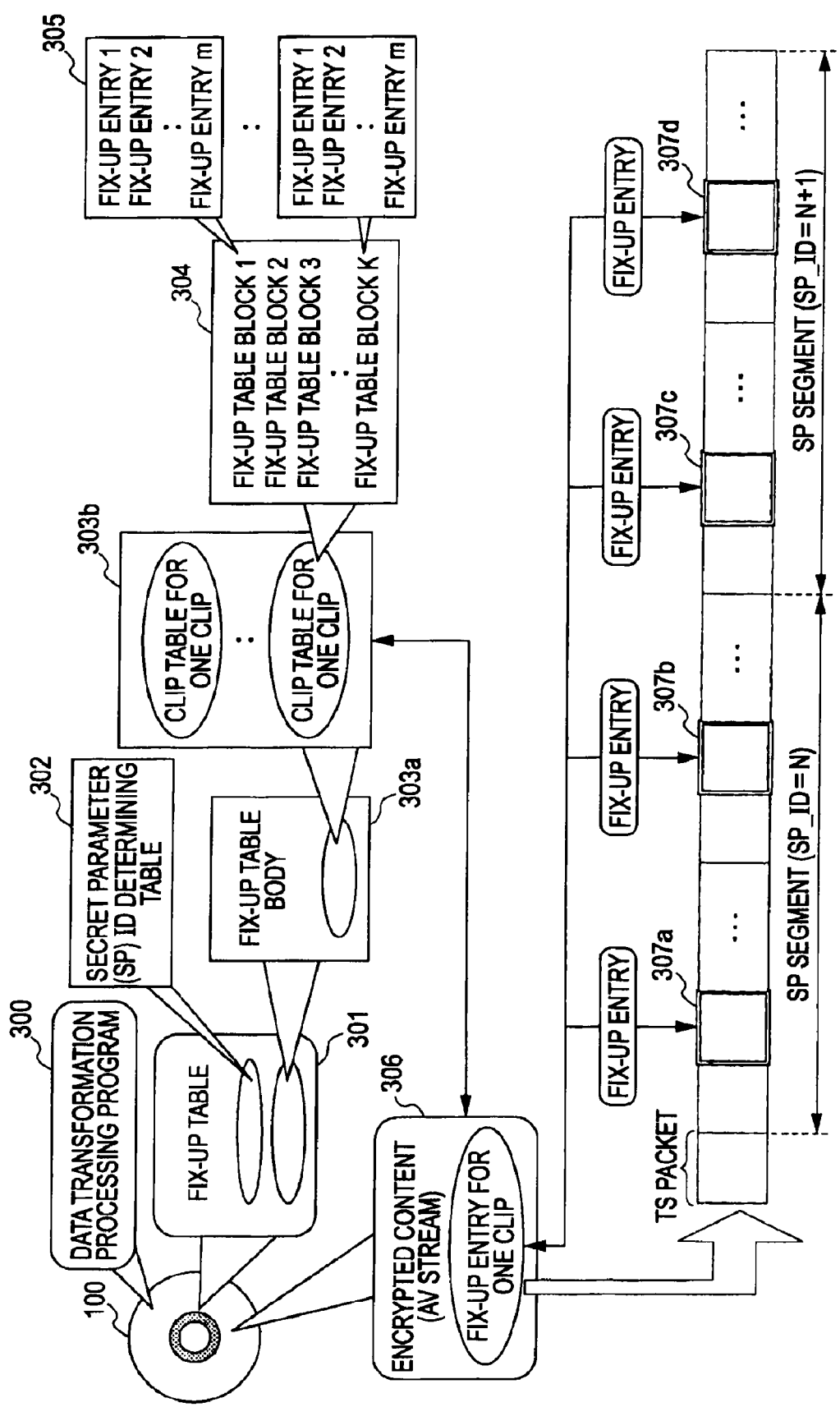
FIG. 6 is a diagram describing the details of the content and the fix-up table stored in the information recording medium.

A configuration example of the data transformation processing program 300 stored in the information recording medium 100, a fix-up table (FUT) 301, and encrypted content 306, will be described with reference to FIG. 6. The fix-up table 301 recorded in the information recording medium 100 has a configuration including a secret parameter ID determining table 302, and a fix-up table body 303a, as shown in FIG. 6.

The fix-up table body 303a is set as a fix-up table group 303b for each clip, fix-up tables in units of each clip are configured of multiple fix-up table blocks 1 through K304, and further, each of the fix-up table blocks have a configuration including multiple fix-up entries 305. Each of these fix-up entries include transformation data to be applied as replacement data, and recorded position information of the transformation data.

FIG. 7 illustrates a data configuration example of one fix-up entry (FixUpEntry) included in a fix-up table block. As shown in FIG. 7, a fix-up entry (FixUpEntry) contains the following data.

type_indicator: Type identifier [00: no transformation, 01b: processing with transformed data, 10b, 11b: processing with transformed data including identification mark]

FM_ID_bit position: Identification bit position of player ID corresponding to identifier-set transformation data relative_SPN: Position of packet where transformation data is to be applied (number of packets from PMT packet)

byte_position: position where transformation data is recorded in the packet overwrite_value: Transformation data (also including identifier-set transformation data)

relative_SPN_2: Position of packet where second transformation data is applied (number of packets from PMT packet)

byte_position_2: Position where transformed data is recorded in the packet (corresponding to second transformation data)

overwrite_value_2: Second transformation data (also including identifier-set transformation data)

Configuration is made of this data.

A fix-up table is set as a fix-up table recording transformation data for replacing with a part of the content data, and setting position information of the transformation data as to the content, with this fix-up table being applied to execute a data transformation processing program including content configuration data replacement processing execution commands, thereby performing data transformation.

The information [type_indicator] included in the fix-up entry (FixUpEntry) information contained in the fix-up table block shown in FIG. 7 is a type identifier for identifying whether registration information of the fix-up table is (a) or is (b) as follows, i.e.,:

(a) whether registration information relating to transformation data for transforming broken data into proper content data, or (b) registration information relating to identifier-set transformation data for embedding identification information of the reproduction device or content reproduction application.

In the event that the registration information range of the fix-up table is a registration information range relating to identifier-set transformation data for embedding identification information of the reproduction device or content reproduction application, transformation data to be selectively used based on the identification information of the content reproduction device or content reproduction application is registered as table registration information, i.e., identifier-set transformation data is registered.

The registration information [FM_ID_bit_position] is position information of a bit to be referred to from the identification information of the reproduction device or reproduction application made up of multiple bits, in order to determine the manner of processing. The manner of processing is determined for data transformation such that, for example, in the event that the bit value is 1 for the bit to be referred to from the identification information of the reproduction device or reproduction application made up of multiple bits, replacement of content configuration data is executed by the identifier-set transformation data registered in the fix-up table, and in the event that a bit value is 0 for the bit to be referred to, replacement is not executed.

Note that an arrangement may be made wherein transformation is executed in the event that the reference is 0 and transformation is not executed in the event that this is 1. Or, a configuration may be made wherein the transformation data in the case that the reference bit is 0 and the transformation data indicates that this is 1, are set as separate transformation data, and the transformation data is selected and set as suitable according to the bit value of the reference bit.

As shown in FIG. 6, the encrypted content 306 is set as a TS packet stream, and packets with fix-up entries stored scattered throughout a part thereof, i.e., fix-up entry storage packets 307a through 307d are set. The AV stream is sectioned in units of clips, and fix-up entries in units of clips are recorded scattered throughout the content.

Nearby transformation data is recorded in each of the fix-up entries set as such scattered recording data, as described with reference to FIG. 5. The fix-up entries recorded scattered throughout the encrypted content 306 and fix-up entries included in the fix-up table 301 are the same thing, and the information processing device which executes content reproduction performs one or the other of obtaining transformation data from a fix-up entries recorded scattered through the content and replacing the data, or obtaining transformation data from fix-up entries in the fix-up table 301 and replacing the data, depending on the specifications of the reproduction (player) application.

As shown in FIG. 6, the content is sectioned into segments of predetermined units of data. Fix-up entries that include each transformation data are subjected to computation or encryption processing applying parameters (SP: secret parameters) which differ for each predetermined unit of content (segment units).

An information processing device which executes the data transformation processing, which is the data replacing processing executed at the time of reproducing the content, sequentially obtains the secret parameters (SP1, SP2, SP3 . . . ), performs computation or encryption processing applying the obtained parameters (SPn) for the fix-up table block including the transformation data corresponding to each segment position, thereby performing processing of obtaining the transformation data.

The secret parameter (SP) ID determining table 302 shown in FIG. 6 is a table recording guide information regarding which secret parameters should be applied to which content data position. The details of this table and examples of usage will be described later.

A specific example of data replacement based on transformation data will be described with reference to FIGS. 8 and 9. First, a processing example of executing data replacement by obtaining fix-up table block configuration data including transformation data that has been recorded scattered through the content, will be described with reference to FIG. 8.

Figure 8:
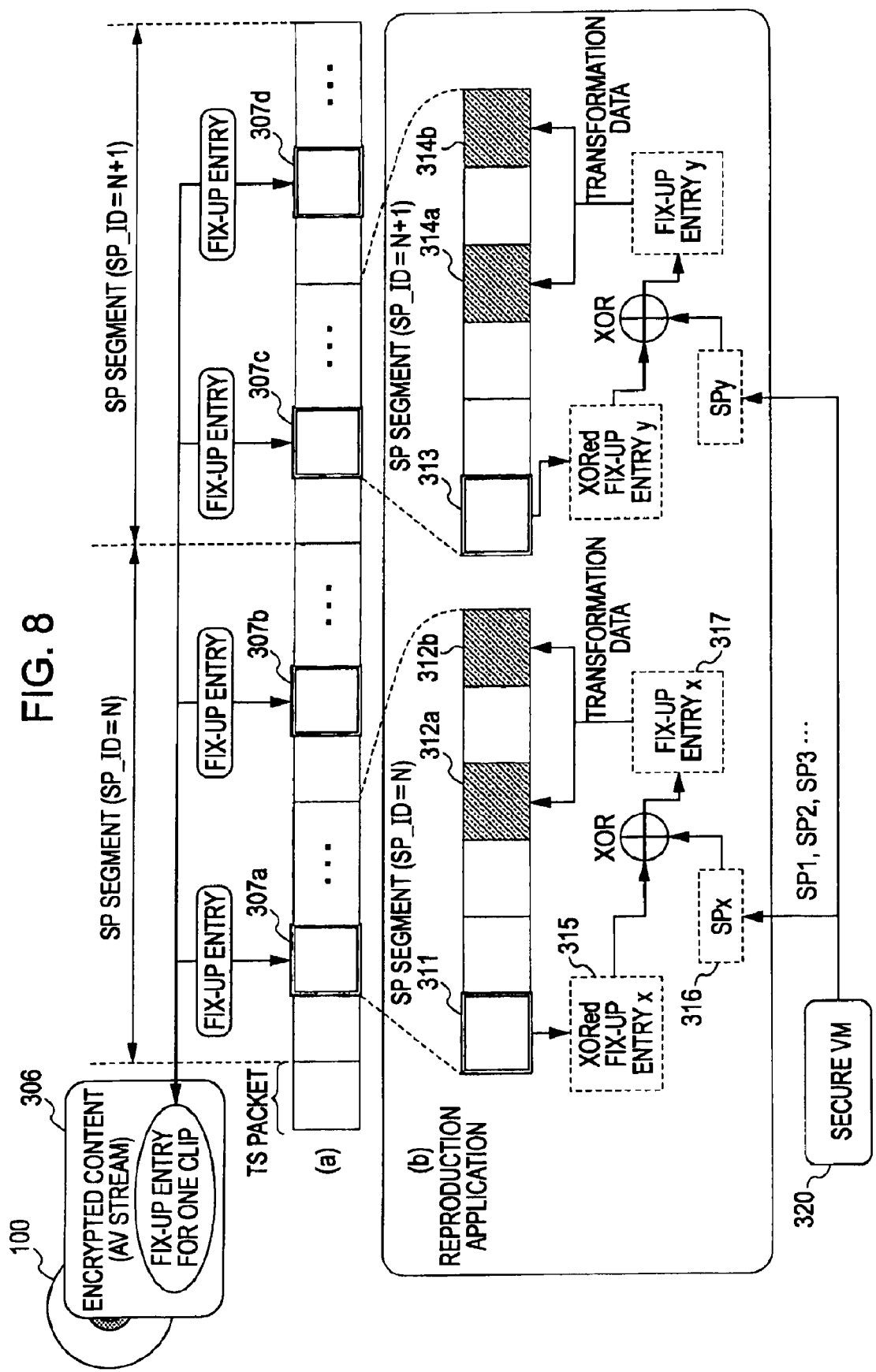
FIG. 8 is a diagram describing data transformation processing applying fix-up entries within TS packets making up the content.

In FIG. 8, (a) illustrates the configuration of the content recorded in the information recording medium 100. The configuration data of the fix-up table block including fix-up entries is recorded scattered through the TS packets 307a through d shown in the drawing.

The data replacement processing sequence will be described with reference to (b) in FIG. 8. The processing shown in (b) in FIG. 8 is processing for executing a reproduction (player) application of the host. (b) in FIG. 8 illustrates a part of the TS packet stream of the content belonging to segment ID=N, N+1, in the content configuration data.

For example, the packet 311 including the fix-up entry recorded in segment ID=N stores an XORed fix-up entry 315 which is the result data of exclusive-OR computation with the secret parameter (SPx). The host reproduction (player) application which executes the data replacement processing performs exclusive-OR computation with the secret parameter (SPx) 316 with regard to the XORed fix-up entry 315, thereby obtaining the fix-up entry 317, and obtains the transformation data and recording position information from the fix-up entry 317, to execute the replacement processing for the packets 312a and b at the data replacement position.

The parameter (SPx) applied for the computation to obtain the fix-up entry 317 is supplied from the secure VM 320. For example, the reproduction (player) application obtains a secret parameter ID (SP_ID) serving as secret parameter specification information corresponding to each segment, and outputs a secret parameter calculation request including notification of the secret parameter ID as an interruption (INTRP) request to the secure VM, in order to obtain the secret parameter (SPn) necessary for each segment of the content. The secure VM calculates the secret parameter (SPx) corresponding to the (SP_ID) in response to the secret parameter calculation request from the reproduction (player) application, and provides this to the reproduction (player) application as a response (Call).

As shown in FIG. 8, different segments have different parameters for the parameters (SPx) to be applied to the computation for obtaining the fix-up entries. For example, each segment is set to around 10 seconds of content reproduction time, and the reproduction (player) application receives parameters which differs for each segment every 10 seconds from the secure VM, restores the fix-up entry, obtains the transformation data from the restored fix-up entry, and executes the data replacing processing.

Figure 9:
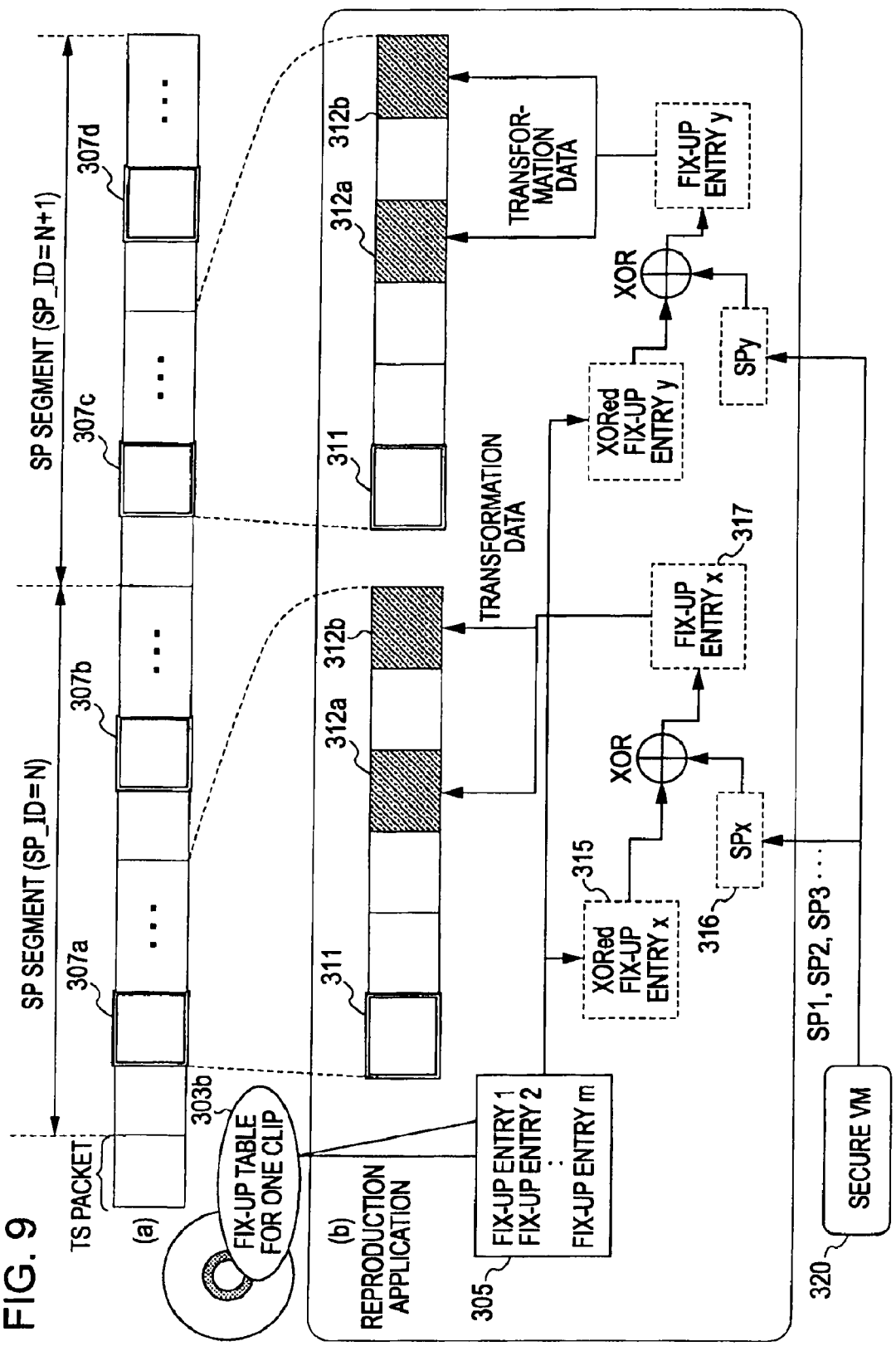
FIG. 9 is a diagram describing data transformation processing applying fix-up entries included in a fix-up table.

FIG. 9 illustrates the processing example where in XORed fix-up entries are obtained from one clip worth of fix-up table 303b serving as an independent fix-up table block file, rather than from a fix-up table block recorded scattered throughout the content, from which the computation or encryption processing is executed, the fix-up entries are restored, and transformation data is extracted from the restored fix-up entries to perform data replacement.

In FIG. 9, (a) illustrates the configuration of content recorded in the information recording medium 100. Fix-up entries containing transformation data are recorded scattered through the TS packets 307a through d shown in the drawing, but with this example, this data is not used, rather, one clip worth of fix-up table 303b which is configuration data of a fix-up table independently recorded in the information recording medium is used, and the data replacement is executed applying the fix-up entry stored in this one clip worth of fix-up table 303b.

The data replacement sequence will be described with reference to (b) in FIG. 9. The processing shown in (b) in FIG. 9 is processing which is executed at the host reproduction (player) application. (b) in FIG. 9 illustrates a part of the content TS packet stream belonging to segment ID=N, N+1, in the content configuration data. For example, in the case of executing data replacement with regard to the segment ID=N, the fix-up entry corresponding to the segment ID=N contained in the one clip worth of fix-up table 303b is obtained. However, the fix-up entry x315 is an XORed fix-up entry 315 as the result data of exclusive-OR computation with the secret parameter (SPx), in the same way as the fix-up table block recorded scattered throughout the content. The reproduction (player) application of the host to execute the data replacement processing obtains the fix-up entry 317 by executing exclusive-OR computation with the secret parameter (SPx) 316 with regard to the XORed fix-up entry 315, obtains the transformation data and recorded position information from the fix-up entry 317, and performs the replacement processing with the packets 312a and b of the data replacement positions.

The parameter (SPx) to be applied for the computation for obtaining the fix-up entries 317 is supplied from the security of the VM 320 in the same way as the processing example described above. For example, the reproduction (player) application obtains the secret parameter ID (SP_ID) which is secret parameter specification information corresponding to each segment, and outputs a secret parameter calculation request including notification of the secret parameter ID as an interruption (INTRP) request to the secure VM, in order to obtain the secret parameters (SPn) necessary for each segment of the content. The secure VM calculates the secret parameter (SPx) corresponding to the SP_ID in response to this secret parameter calculation request from the reproduction (player) application, and provides this to the reproduction (player) application as a response (Call).

As shown in FIG. 9, different segments have different parameters for the parameters (SPx) to be applied to the computation for obtaining the fix-up entries. For example, each segment is set to around 10 seconds of content reproduction time, and the reproduction (player) application receives parameters which differs for each segment every 10 seconds from the secure VM, restores the fix-up entry, obtains the transformation data from the restored fix-up entry, and executes the data replacing processing.

Thus, the reproduction (player) application for executing content reproduction receives secret parameters from the secure VM and in units of each segment, executes computation, executes restoration of fix-up entries which are the configuration data of the fix-up table block, and obtains the restored fix-up entries and performs data replacement. Note that while the above-described processing example has been made illustrating a case of using exclusive-OR (XOR) as the computation applying the secret parameters, other competition processing may be applied as well. Also, an arrangement may be made wherein encryption processing or the like is executed applying secret parameters.

4. Processing of Reproduction (Player) Application and Secure VM

In the case of executing the above-described processing, the reproduction (player) application sequentially obtains different secret parameters (SP1, SP2, SP3 . . . ) in certain segment units, while carrying out content reproduction, meaning that secret parameters are obtained with regard to the secure VM and data replacement is performed before reproducing the switchover point of segments. In this case, the reproduction (player) application notifies the secure VM of the secret parameter ID (SP_I) as secret parameter specification information, thereby determining the necessary SP. The secret parameter ID (SP_I) is recorded in the secret parameter (SP) ID determining table 302 described with reference to FIG. 6 earlier.

The reproduction (player) application needs to perform processing for setting this secret parameter (SP) ID determining table 302 into a referable state. The series of processing sequences carried out by the reproduction application and secure VM will be described with reference to FIG. 10.

As described earlier with reference to FIG. 1, transfer of information or processing requests between the reproduction (player) application 150 and secure VM 160 is carried out by a sequence of interruptions (INTRP) from the reproduction (player) application 150 to the secure VM 160, and response (Call) processing thereto from the secure VM 160 to the reproduction (player) application 150.

Figure 10:
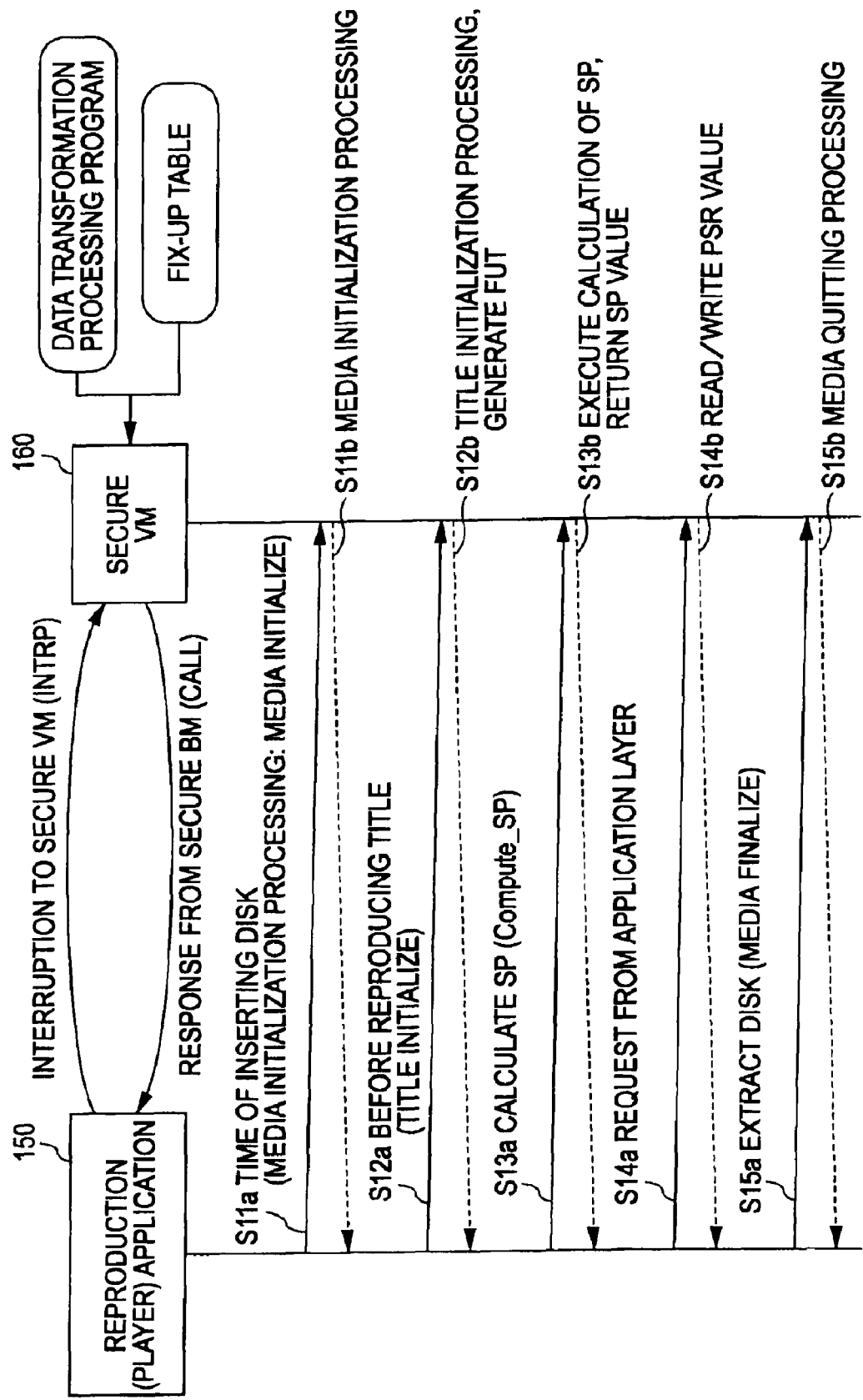
FIG. 10 is a diagram describing the processing sequence carried out between a reproduction (player) application and a secure VM.

The processing sequence shown in FIG. 10 is a diagram illustrating the types of processing executed between the reproduction (player) application 150 and the secure VM 160 from the point of inserting the information recording medium storing content, to ejecting thereof.

For example, step S11 is processing for media initialization (Media Initialize) which is executed as processing at the time of inserting an information recording medium (Disc), wherein the reproduction (player) application 150 loads a content code file (Content Code File) storing code information necessary for the initial reproduction processing into its memory, and starts execution. The content code file (Content Code File) determines the manufacturer, model, and so forth of the reproduction (player) application.

For example, the secure VM 160 determines whether or not the obtained model is a model regarding which a security problem has occurred in the past, and in the event that this is a model regarding which a security problem has occurred in the past, a check is made by executing the content code (Content Code) regarding whether or not a similar security problem has occurred. For example, certain values in the RAM of the information processing device, or operations of a certain device are checked, inspecting whether or not in a correct state. Note that a check program for each model may not be included in that initially-loaded content code file, and in this case another necessary content code file is accessed. Upon completion of the initialization processing by the secure VM 160, a response (Call) is notified to the reproduction (player) application 150, and the flow proceeds to the next step S12.

In step S12, title initialization processing (Title Initialize; is executed. The title is applied it as specified information of the content to be reproduced, a title corresponding to certain content to be reproduced is selected based on user specifications or the like, and a title initialization processing request is output from the reproduction (player) application 150 to the secure VM 160, along with title information.

The secure VM 160 generates a fix-up table on the memory of the secure VM 160 by collecting transformation data information corresponding to all clips necessary for reproducing the title, and notifies the reproduction (player) application 150 of the position in the memory where the table has been stored, such that the reproduction (player) application 150 can obtain the table. Note also that a security check the same as that for the media initialization in step S11 can be performed during title initialization.

Figure 11:
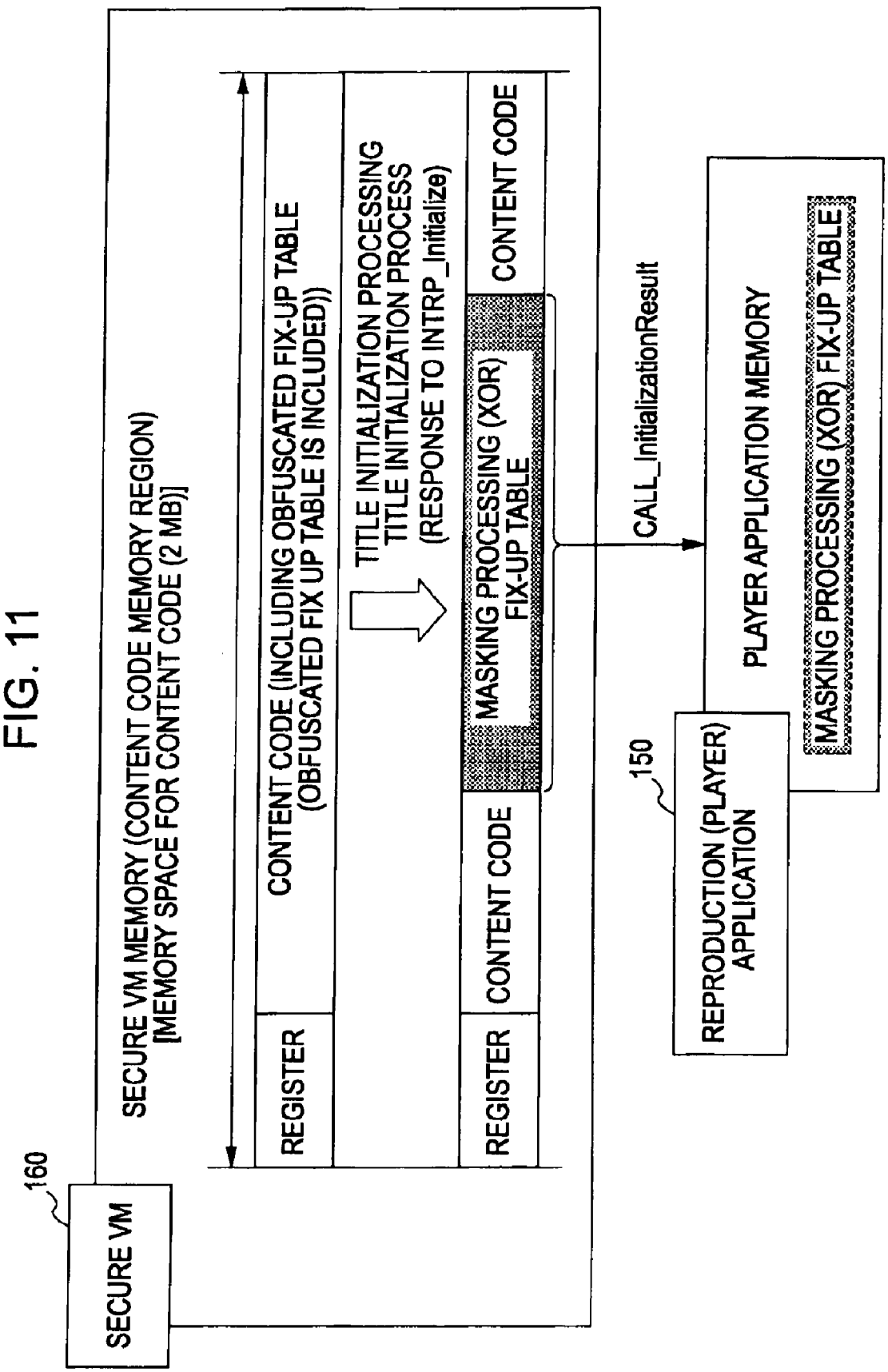
FIG. 11 is a diagram describing processing for copying a fix-up table, carried out in the title initialization processing within the processing sequence between the reproduction (player) application and the secure VM.

An example of processing for generating a fix-up table on the memory of the secure VM 160 by collecting transformation data corresponding to all clips necessary for reproducing the title, which is executed during the title initialization processing, will be described with reference to FIG. 11. FIG. 11 illustrates a memory region (e.g., 2 MB) which the secure VM 160 can use. The content code which is code information included in the data transformation processing program which the secure VM 160 has obtained from the information recording medium is stored here. Note that this content code includes a fix-up table subjected to obfuscation processing such as encryption or the like.

Upon input of the title initialization request from the reproduction (player) application 150, the secure VM 160 performs decryption processing of the fix-up table collecting transformation data information corresponding to all clips necessary for reproducing the title, from the content code as necessary, stores this in memory in a state subjected to processing such as the above-described XORed state (masked state), and notifies this memory storage position to the reproduction (player) application 150. This notification processing is executed as a response (Call) to the title initialization request (INTRP) from the reproduction (player) application 150.

Upon receiving a response (Call) from the secure VM 160 regarding the title initialization request (INTRP), the reproduction (player) application 150 copies and stores a necessary data portion from the fix-up table storing region in the memory region which the secure VM 160 uses, to a memory region which the reproduction (player) application 150 can use. For example, a secret parameter ID (SP_ID) determining table for obtaining a secret parameter ID (SP_ID) corresponding to a segment of the content, described earlier with reference to FIGS. 6 through 9, is extracted and copied and stored in the memory region which the reproduction (player) application 150 can use.

In the event that the reproduction (player) application executes processing for obtaining the transformation data from the fix-up table block recorded scattered through the content, as described earlier with reference to FIG. 8, obtaining a secret parameter ID (SP_ID) determining table is sufficient, however, in the event that the player is such as that described with reference to FIG. 9, i.e., a player which does not use the fix-up table block recorded scattered through the content, processing is executed in this copy processing for copying and storing the secret parameter ID (SP_ID) determining table, and also a fix-up table block storing fix-up entries, in the memory region usable by the player. The XORed fix-up table block described with reference to FIG. 9 is a fix-up table block copied to the memory region usable by the reproduction (player) application 150 in this processing.

Returning to FIG. 10, description will be continued regarding the processing sequences between the reproduction (player) application 150 and secure VM 160. Step S13 is processing corresponding to the secret parameter (SP) calculation (Compute_SP) wherein the reproduction (player) application 150 outputs a SP calculation request (INTRP) to the secure VM 160, and the secure VM 160 returns the calculation results (SP) to the reproduction (player) application 150 as a response (Call). In the event of outputting an SP calculation request (INTRP) to the secure VM 160, the reproduction (player) application 150 obtains the SP_ID serving as SP specifying information from a secret parameter ID (SP_ID) determining table, for example, and gives notification thereof.

Note that in the event of obtaining the SP_ID as SP specifying information and notifying the secure VM 160 of this, the reproduction (player) application 150 needs to accurately select the SP_ID corresponding to the segment of content. A specific example of that SP_ID selecting processing will be described later. The processing in step S13 is repeatedly executed for each segment.

The processing in step S14 is a request processing from the reproduction (player) application 150 to the secure VM 160, for other than the secret parameter calculation. For example, in the event that this is request processing for execution of a security check, the secure VM 160 executes the processing according to the request, and makes notification to the reproduction (player) application 150 regarding the processing results as a response (Call). Note that a register regarding which both the reproduction (player) application 150 and the secure VM 160 is capable of writing to and reading from is used for this information transfer, such as a player status register, register (PSR), for example.

The processing in step S15 is media finalizing (Media Finalize) processing at the time of the ejecting the information recording medium (Disc), with the content code (content code) processing status being recorded in nonvolatile memory. This processing enables past security check information to continue to be used the next time the disk is inserted.

As described above, transfer of information, or processing requests and responses between the reproduction (player) application 150 and the secure VM 160 is carried out by interruption (INTRP) from the reproduction (player) application 150 to the secure VM 160, and response (Call) processing from the secure VM 160 to the reproduction (player) application 150.

Figure 12:
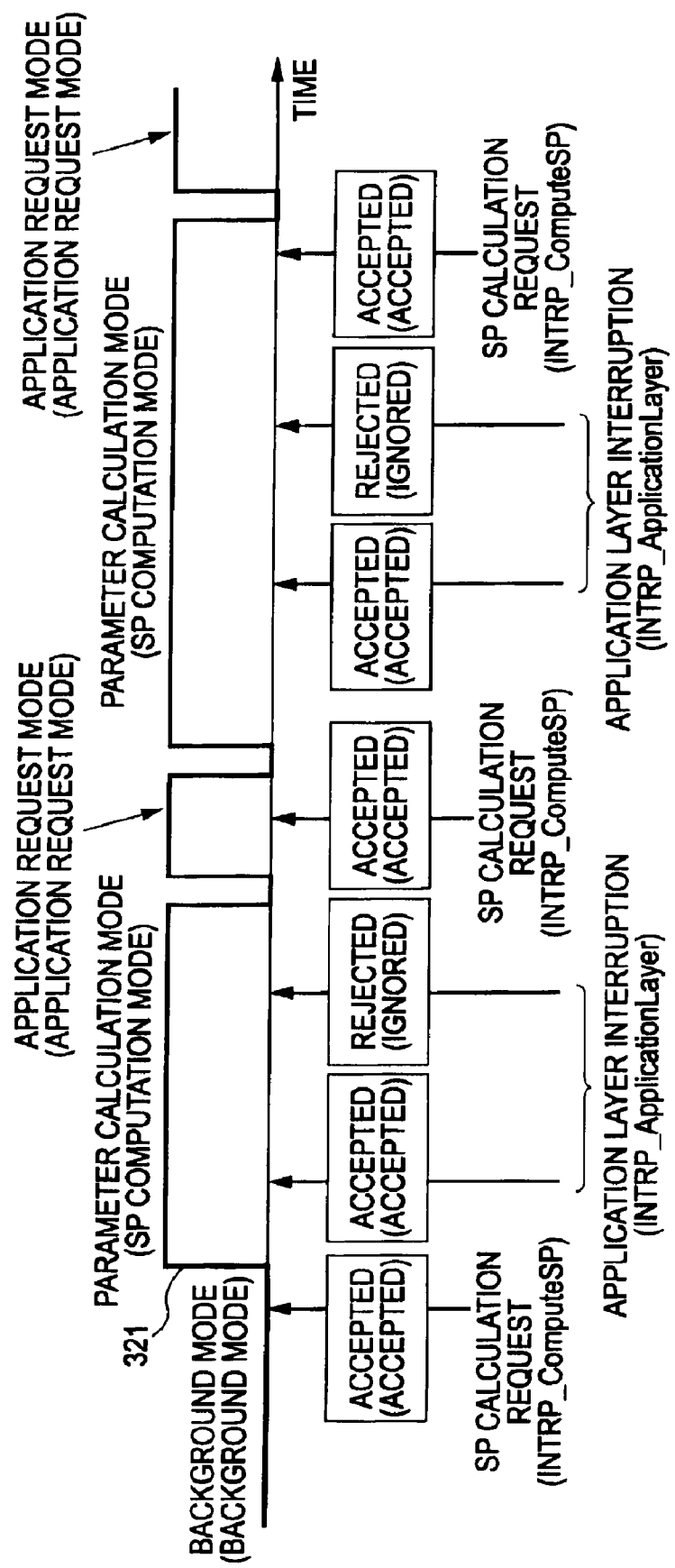
FIG. 12 is a diagram describing a sequence for accepting and rejection processing at the secure VM.

In this case, the secure VM 160 does not perform all processing of interruptions (INTRP) input from the reproduction (player) application 150, but executes some processing based on certain conditions, and rejects some processing. The way in which interruption processing requests (INTRP) are accepted or rejected at the secure VM 160 is described with reference to FIG. 12.

The graph 321 shown in the drawing illustrates mode transition in the secure VM. Time (t) passes from the left to the right. First, in the background mode, a secret parameter (SP) calculation request is input as an interruption request from the reproduction (player) application. At this point, the secure VM is not executing processing, and accordingly accepts (Accept) the secret parameter (SP) calculation request, makes a transition to the parameter calculation mode, and executes the parameter calculation processing.

Further, in the event that an interruption request is received from the reproduction (player) application during this parameter calculation mode period, the first request is accepted, and continuously-received interruption requests are rejected (Ignore).

The processing corresponding to the first interruption request received in the parameter calculation mode period is executed in the application request mode following completion of the parameter calculation mode period. Further, the secret parameter (SP) calculation request received in this period is accepted (Accept), and following completion of Application request mode, transition is made to the proper calculation mode, where the parameter calculation processing is executed in this way, the secure VM has a configuration for holding just one unprocessed interruption, before one type of interruption (INTRP). The second and subsequent interruption requests are rejected (Ignore).

5. Content Reproduction Processing

Figure 13:
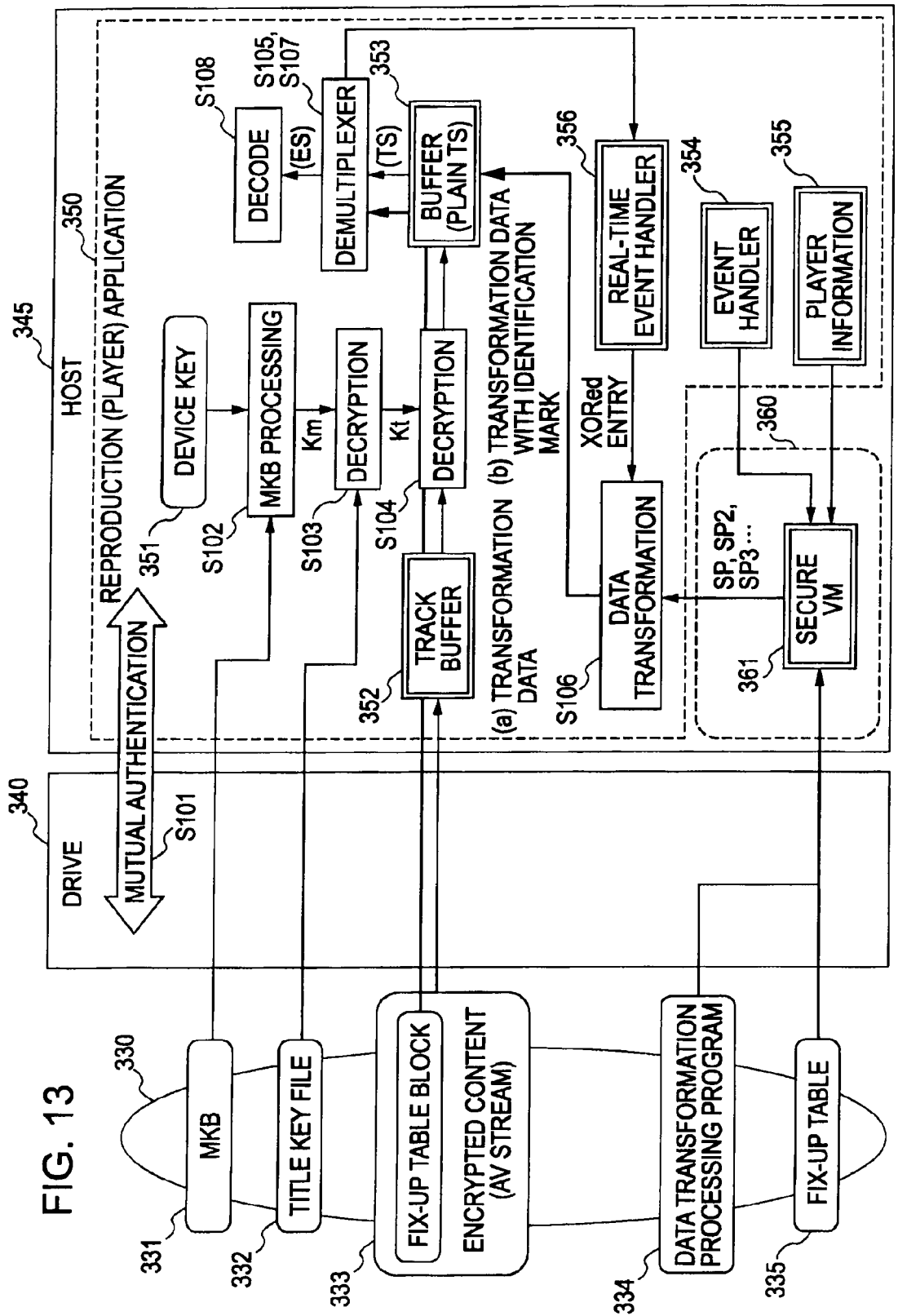
FIG. 13 is a diagram describing a processing example of content reproduction processing.

Next, content reproduction processing which the host executes will be described with reference to FIG. 13. FIG. 13 illustrates, from the left, an information recording medium 330 storing encrypted contents, a drive 340 into which the information recording medium 330 is set so as to execute data reading, and a host 345 which is connected with the drive so as to be capable of data communication, and which obtains the content stored in the information recording medium 330 by the drive 340 and executes a reproduction application which executes reproduction processing thereof.

Note that the host 345 shown in FIG. 13 is shown sectioned into a reproduction (player) application block 350 which executes processing such as content decryption, decoding, data transformation, and so forth, and the secure VM 360 block having a secure VM 360 which executes secret parameter (SP) calculation processing and so forth.

The information recording medium 330 stores an MKB (Media Key Block) 331, title key file 332, encrypted content 333, fix-up tables 335, and data transformation processing program 334. The host 345 holds the device key 351 to be applied to the MKB processing.

The processing sequence wherein the host 345 shown in FIG. 13 obtains and reproduces the stored content within the information recording medium 330 via the drive 340 will be described. First, before reading out the stored content in the information recording medium 330, the host 345 and drive 340 execute mutual authentication in step S101. This mutual authentication is processing for confirming that the host and drive are each authorized devices or application software.

Various types of processing can be applied to this mutual authentication processing sequence. As a result of the mutual authentication processing, the drive 340 and host 345 share a session key (Ks) serving as a shared secret key.

In step S101, following mutual authentication being executed between host and drive, and the session key (Ks) shared, the reproduction (player) application 350 of the host 345 obtains the MKB 331 recorded in the information recording begins 330 by the drive in step S102, executes processing of the MKB 331 applying the device key 351 stored in memory, and obtains the media key (Km) from the MKB.

As described above, the MKB (Media Key Block) 331 is an encryption key block generated based on a tree structure key distribution system known as a type of broadcast encryption method, and is the key information block enabling obtaining of a media key (Km) which is a key necessary for content decryption, only by processing (decryption) based on the device key (Kd) stored in a device which has a valid license.

Next, in step S103, the media key (Km) obtained by the MKB processing in step S102 is applied to execute decryption of the title key file 332 read from the information recording medium 330, thereby obtaining the title key (Kt). The title key file 332 stored in the information recording medium 330 is a file including data encrypted by the media key, and the title key (Kt) used for decryption of content can be obtained by processing applying the media key. Note that the decryption processing in step S103 applies an AES encryption algorithm, for example.

Next, the reproduction (player) application 350 of the host 345 reads out the encrypted content 333 stored in the information recording medium 330 via the drive 340, stores the read out content in the track buffer 352, executes decryption processing applying the title key(Kt) in step S104 for the contents stored in the buffer, and obtains the decrypted content.

The decrypted content is stored in a plaintext TS buffer 353. (Plain TS) refers to a decrypted plaintext transport stream. Now, the decrypted content stored in the plaintext TS buffer 353 is content containing the above-described broken data, which cannot be reproduced as it is, and there is the need to perform predetermined data transformation (data replacement by overwriting).

The processing example shown in FIG. 13 is a processing example where fix-up entries recorded scattered in certain packets within the configuration data of the encrypted content are obtained, transformation data is extracted therefrom, and data replacement is performed. That is to say, this is equivalent to the data transformation processing described with reference to FIG. 8 earlier.

The fix-up entries divided and recorded in the content is data recording the transformation data (or identifier-set transformation data) for performing replacement processing regarding the decrypted content, and the recorded position where the transformation data is recorded.

The secure VM 361 reads out the data transformation processing program 335 including command code information from the information recording medium 330, and intermittently generates and outputs secret parameters (SP1, SP2, SP3 . . . ) necessary for changing the fix-up table recorded in the information recording medium 330 along with the content into a plaintext fix-up table, during contents reproduction or before output processing and during processing, based on control from an event handler 354, and input of player information 355. This processing is performed intermittently.

The secret parameters (SP1, SP2, SP3 . . . ) are, as described above, computation for encryption processing parameters which switch over for segments corresponding to predetermined content data units, and specifically are, for example, exclusive-OR (XOR) operation parameters. The secure VM 361 executes processing for intermittently generating and outputting parameters (SP1, SP2, SP3 . . . ) necessary for restoring the fix-up entries such as the configuration data of the fix-up table block modified by computation processing of encryption processing, based on requests from the reproduction (player) application.

At the reproduction (player) application 350, in step S104, decryption of the encrypted content 333 including fix-up entries is executed, the fix-up entries which are configuration data of the six-up table recorded in the content are separated by processing of a demultiplexer in step S105, and table restoration and data transformation processing is executed in step S106 under control of the real-time event handler 356. Due to the control of the real-time event handler 356, the reproduction (player) application 350 outputs a secret parameter calculation request corresponding to switching over of segments as an interruption (INTRP) to the secure VM 361, receives secure parameters (SP1, SP2, SP3 . . . ) from the secure VM 361, executes decryption or computation of the fix-up table block to obtain the plaintext fix-up table block, and obtains fix-up entries contained in the obtained fix-up table block.

Fix-up entries record transformation data, i.e.,
 (a) transformation data
 (b) identifier-set transformation data
and recording position specifying information in the content of the above transformation data, with the reproduction (player) application 350 executing data transformation processing for writing to the specified position in step S106 as real-time processing in parallel with content reproduction processing or external output processing.

For example, in the event that the parameters (SP1, SP2, SP3 . . . ) are exclusive-OR (XOR) operation parameters with transformation data corresponding to in units of predetermined content portion data, the restoration processing in step S303 is as follows:
[Fix-up table block 1] (XOR) [SP1]
[Fix-up table block 2] (XOR) [SP2]
[Fix-up table block 3] (XOR) [SP3]
 and so on.

Exclusive-OR operation processing thereof is executed, thereby obtaining fix-up entries included in the fix-up table block data. Note that in the above expressions, [A] (XOR) [B] refers to an exclusive-OR operation of A and B.

Thus, the fix-up table block contains in the content 333 recorded in the information recording medium is divided into fix-up entries recording a transformation data and transformation data position information corresponding to each content portion, stored upon exclusive-OR operation with secret parameters (SP1, SP2, SP3 . . . ). These parameters are continuously obtained and output by the secure VM 361.

In the table restoration and data transformation processing in step S106, the transformation data is obtained from fix-up entries restored by obtaining with computation or encryption processing applying the secret parameters (SP1, SP2, SP3 . . . ), the broken data included in the content is replaced with transformation data which is the proper content configuration data, and further, data overwriting processing wherein identifier-set transformation data is replaced with a part of the data of the content is executed, thereby changing the stored data in the plaintext TS buffer 353 into transformed data. The overview of this data transformation processing will be described with reference to FIG. 14.

The encrypted content 333 stored in the information recording medium is temporarily stored in a track buffer 352 at the host side. This is the track buffer stored data 401 shown in FIG. 14(1). Decryption of the encrypted content which is the track buffer stored data 401 is executed by the host-side decryption processing, and the decryption result data is stored in the plaintext TS buffer 353. This is the decryption result data 402 shown in FIG. 14(2).

The decryption result data 402 includes broken data 403 which is not the proper content configuration data. The data transformation processing unit of the host executes processing for replacing this broken data 403 with the transformation data 404 which is the correct content configuration data. This replacing processing is executed as re-writing (overwriting) of a part of data, regarding data written to the plaintext TS buffer 353, for example.

Figure 14:
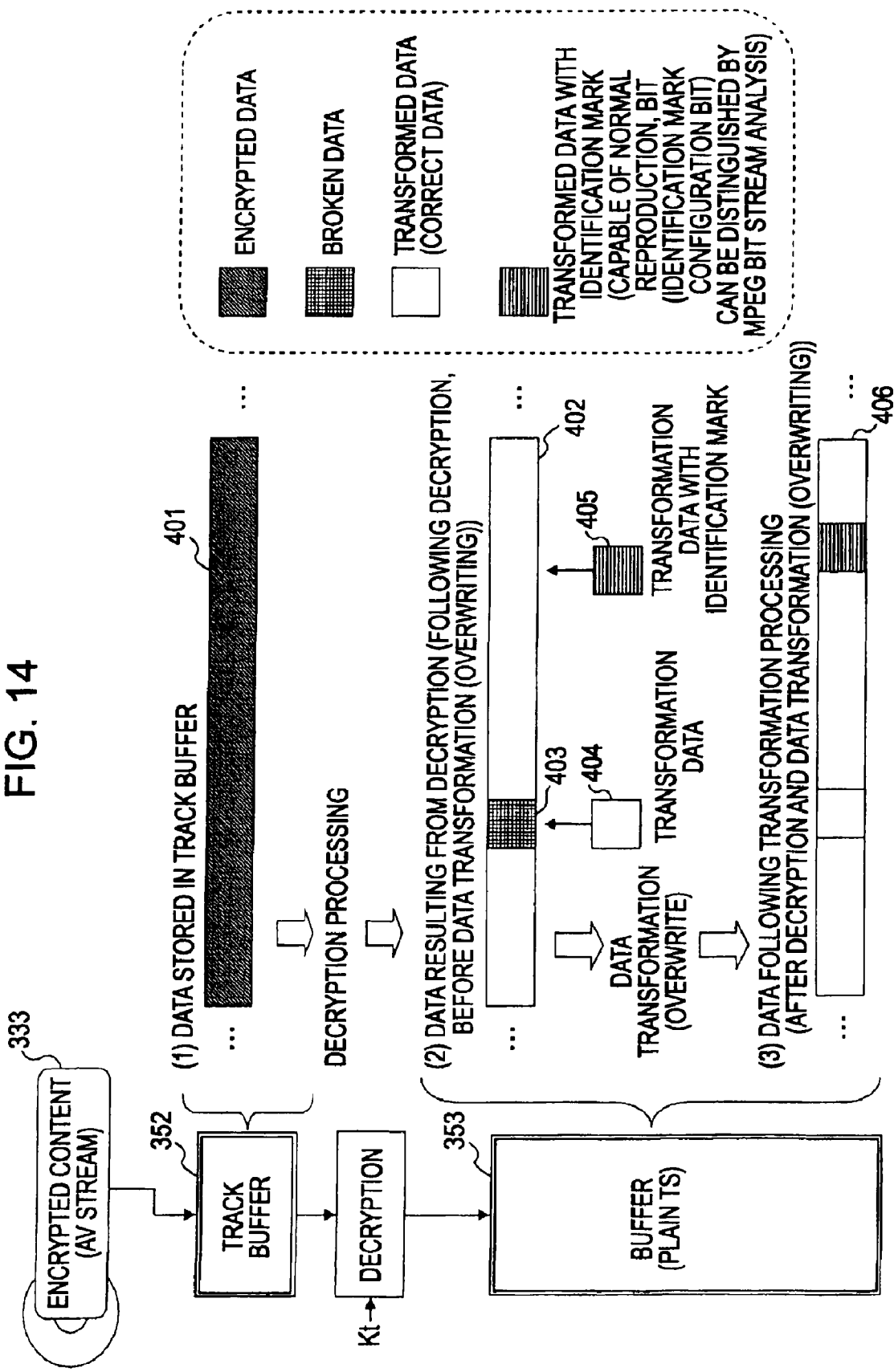
FIG. 14 is a diagram describing data transformation processing executed at the time of content reproduction.

Further, the data transformation processing which the host executes is not only processing for replacing the broken data with transformation data which is the normal content data, but also processing is executed for replacing a part of the configuration data in the decryption result data 402 with identifier-set transformation data 405, as shown in FIG. 14.

An identifier is data which enables configuration bits of identification information making a content reproducing device or content reproducing application identifiable, as described above. A specific example is the configuration data of identification information (player ID) of an information processing device serving as a player for executing a host application, or an identification mark generated based on the player ID. Identifier-set transformation data is data wherein bit values of the correct content data have been slightly changed within a level that does not affect reproduction of the content, as described above.

A great number of identifier-set transformation data 405 are set within the content, and collecting and analyzing the multiple sets of identifier-set transformation data 405 determines the player ID, for example. Identifier-set transformation data 405 is data wherein the configuration bits of the normal content data has been changed within a level wherein normal reproduction can be made as content, and this data wherein bit (identification mark configuration bit) determining is enabled by MPEG bit stream analysis.

A great number of the transformation data 404 and identifier-set transformation data 405 shown in FIG. 14 is registered in the fix-up table stored in the information recording medium, and further, registration is made regarding the write position information of these. Executing data transformation processing based on the fix-up tables stored information replaces the data stored in the plaintext TS buffer 353 with the transformed data 406 shown in FIG. 14(3).

Subsequently, the transformed TS (Transport stream) is externally output via a network or the like, and is reproduced at an external reproducing apparatus. Or, transformation from a transport stream (TS) to an elementary stream (ES) is executed in step S107 by processing by a demultiplexer, and further, following decoding processing (step S108), this is reproduced via a display speaker.

6. Processing for Obtaining SP Identifier (SP_ID) Corresponding to Segment

As described above, content recording in the information recording medium is sectioned into segments, so at the time of performing data transformation processing necessary for each segment, it is necessary to obtain secret parameters (SPn) which differ for each segment from the secure VM, and restore a fix-up table block including fix-up entries, applying the obtained secret parameters.

In order to obtain secret parameters (SPn) which differ for each segment from the secure VM, the reproduction (player) application obtains secret parameter identifiers (SP_ID) corresponding to each segment, and notifies the secure VM of the obtained secret parameter identifier (SP_ID). The following is a description of multiple processing examples 1 through 3 regarding techniques for obtaining the proper secret parameter identifiers (SP_ID) corresponding to each segment.

(6.1) Processing Example 1 for Obtaining SP Identifier (SP_ID) Corresponding to Segment The processing example 1 for obtaining an SP identifier (SP_ID) corresponding to the segment will be described. In the present processing example, SPNs (source packet number) serving as identification information packets (TS packets) configuring the content are registered beforehand in the secret parameter ID determining table described with reference to FIG. 6, correlated with SP identifiers (SP_ID).

The reproduction (player) application which is to execute content reproduction first obtains an SPN (source packet number) corresponding to the content data to be reproduced, from an EP map recorded in clip information which is content reproduction section information. Further, based on the SPN (source packet number) obtained from the EP map, the secret parameter ID determining table is searched, and an SP identifier (SP_ID) set corresponding to be obtained SPN (source packet number) is obtained.

The reproduction (player) application notifies the secure VM of the SP identifier (SP_ID) obtained from the secret parameter ID determining table, and executes a secret parameter calculation request (INTRP).

Figure 15:
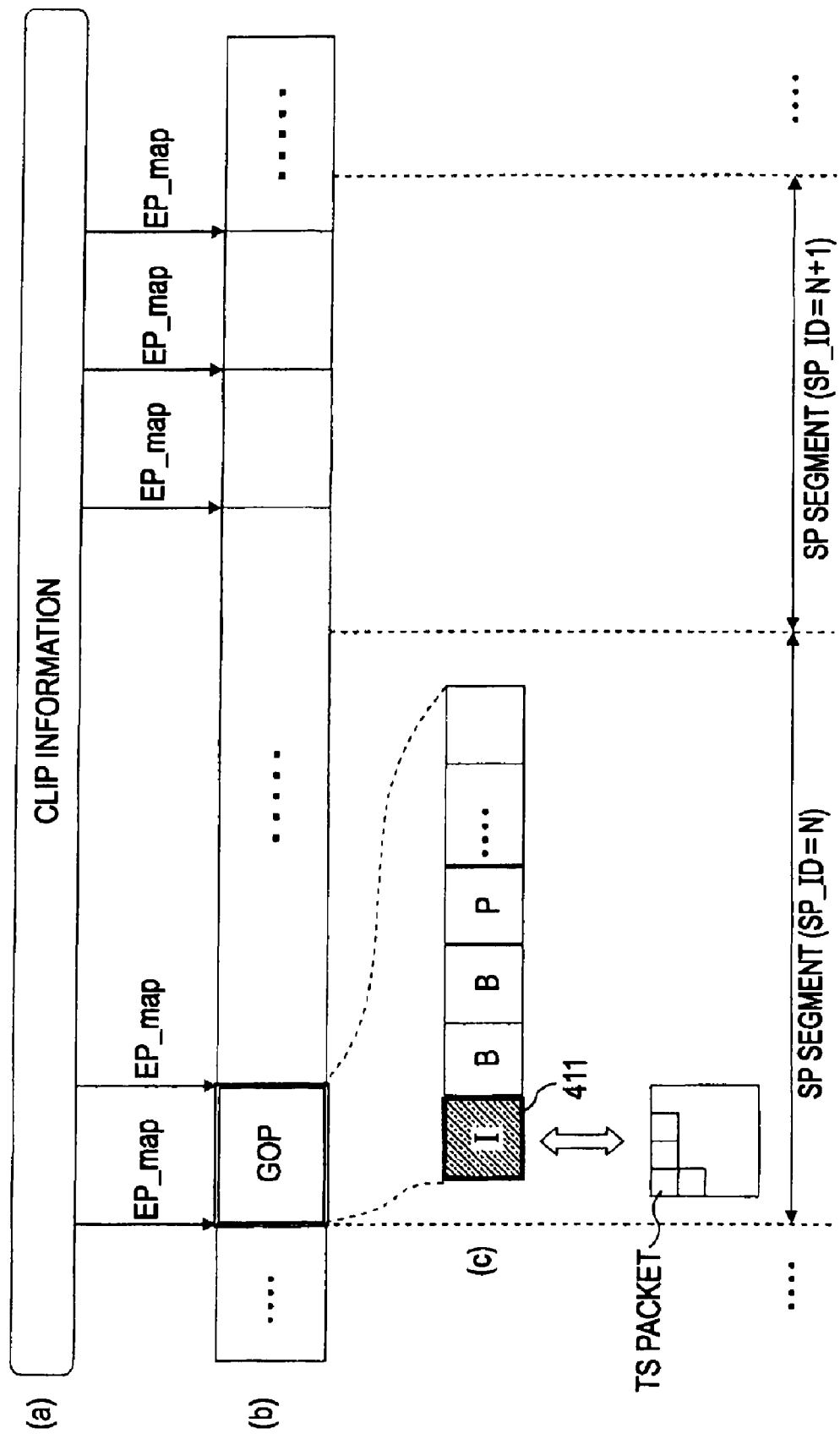
FIG. 15 is a diagram describing the overview of a processing example 1 for obtaining an SP identifier (SP_ID) corresponding to a segment.

The following is a detailed description of the present processing example with reference to Drawings. FIG. 15 is a diagram describing a content reproduction processing by content reproducing unit which executes content reproduction, i.e., a reproduction (player) application. First, at the time of content reproduction, the reproduction (player) application obtains clip information, which is reproduction section information of the content.

For example, the clip information illustrated in FIG. 15A is selected. Clip information is EP maps including packet identifier information of content, set as multiple sets of data. Each EP map includes, for example, packet information relating to an I-picture within a GOP (Group Of Pictures) serving as an encoded data unit of the MPEG data which is encoded data configuring the AV stream which is the reproduction content shown in FIG. 15B.

An SPN (source packet number) is included in the packet information of the I-picture included in the EP map. For example, as shown in FIG. 15C, each GOP (Group Of Pictures) is configured of one I-picture 411 and multiple P and B-pictures. The I-picture 411 is encoded data set as a reference picture within the GOP, and the P and B pictures are picture information which apply the I-picture information as reference information.

Note that the packet to be set as broken data are in units of TS packet, and that TS packets are set this configuration data of the I-picture 411 or P and B pictures, as shown in the drawing. That is to say, each I-picture, or P and B-picture, are stored scattered in a great number of TS packets.

For example, setting one of the TS packets making up the I-picture 411 within this GOP as modified data (broken data) means that the I-picture which is the reference of the MPEG quoted data is broken, so the P-pictures and B-pictures which use the I-picture as reference to information for restoration (MPEG decoding) cannot be restored, and accordingly, effective data destruction can be performed.

The reproduction (player) application for reproducing the content obtains the transformation data recorded in the fix-up table by data transformation, and executes data replacement. Note that, as described above, data replacement is not only for transformation data to be replaced with the broken data, but also regarding identifier-set transformation data as well.

As described above, the transformation data is registered in a fix-up table, but is subjected to computation or encryption applying a different secret parameter (SP) for each segment, and accordingly the reproduction (player) application for reproducing the content must obtain a secret parameter corresponding to each segment from the secure VM.

With the present processing example, the reproduction (player) application obtains an SPN (source packet number) from an EP map registered in the clip information serving as content reproduction section information, searches the secret parameter ID determining table based on the obtained SPN (source packet number), and obtains an SP identifier (SP_ID) corresponding to the SPN (source packet number) regarding which reproduction is to be performed.

Figure 16:
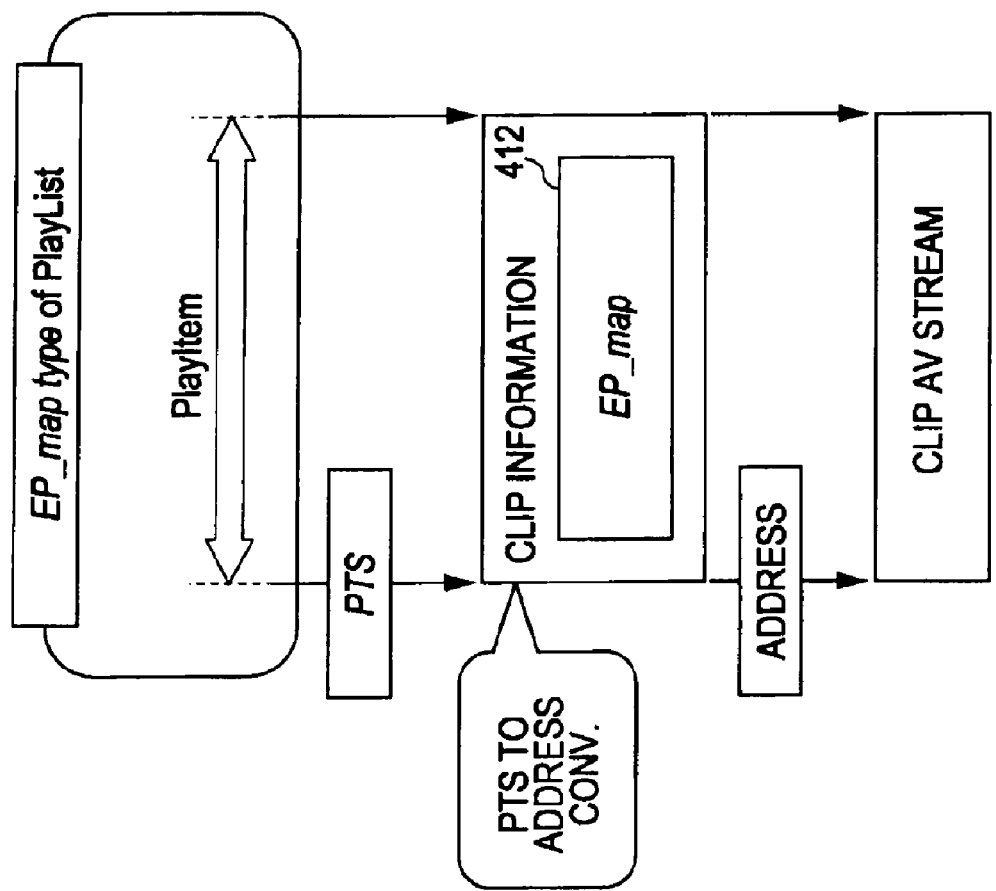
FIG. 16 is a diagram describing an EP map.
Figure 17:
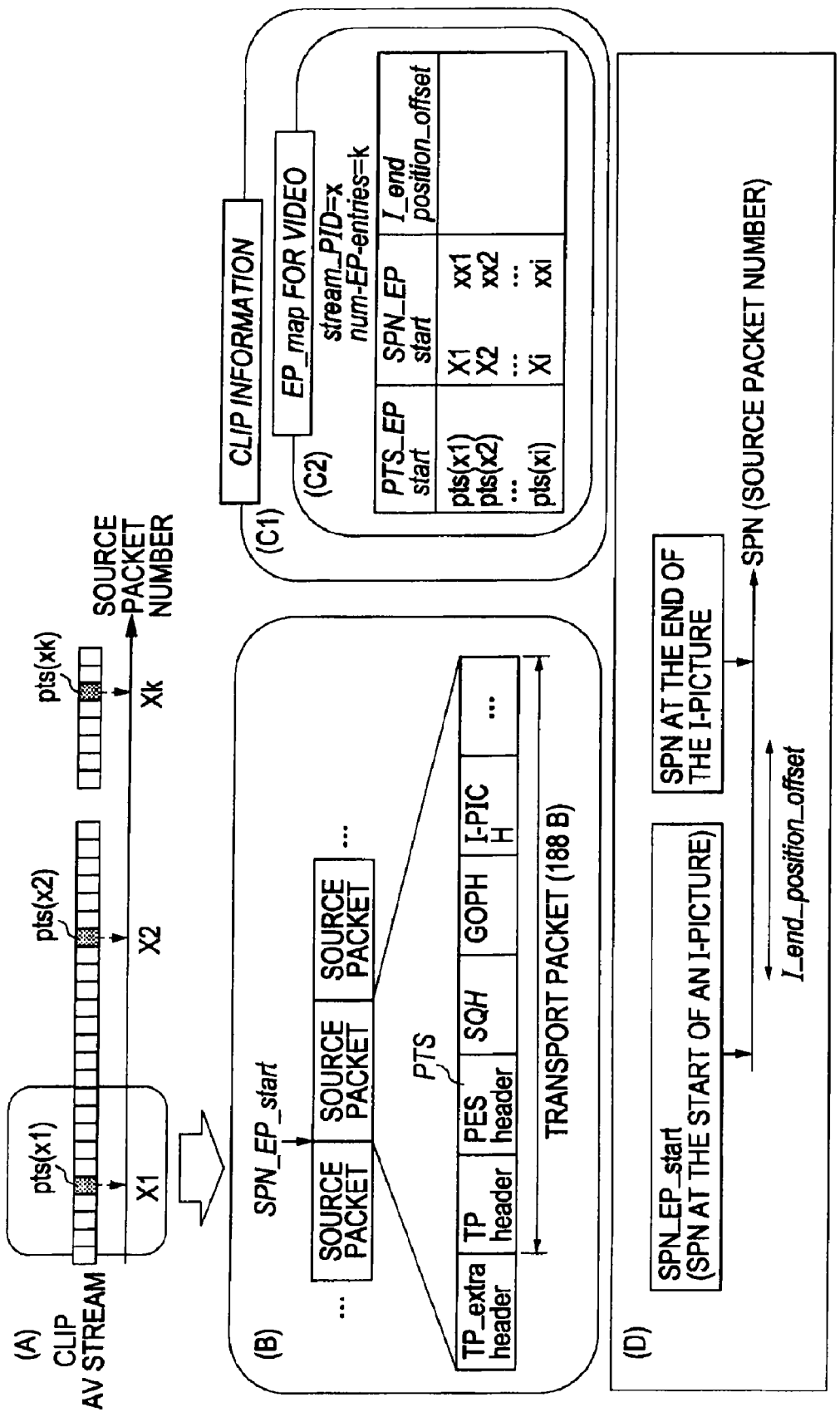
FIG. 17 is a diagram describing an EP map.

First, details of the EP map will be described with reference to FIGS. 16 and 17. As shown in FIG. 16, the EP map (EP_map) 412 is data included in a clip information file (clip information). Detection of the I-picture position based on the EP map will be described with reference to FIG. 17. FIG. 17A shows a clip AV stream, with each rectangle indicating 192-bit source packets. Each source packet is set with a time stamp, and reproduction processing time is stipulated.

FIG. 17B illustrates the detailed configuration of source packet No. (X1). Each source packet is configured of the TP_extra header and transport packet, with the transport packet being configured of various types of header information, and data of I-PIC H and so on serving as MPEG2 entity data.

The clip information shown in FIG. 17C includes an EP map as described above. As shown in the drawing of the EP map includes the various data of [PTS_EP start], [SPN_EP start], and [I_end_position_offset]. The meaning of each data is as follows.

PTS_EP start: a time stamp corresponding to source packet including sequence header (presentation time stamp).

SPN_EP start: head address of source packet including sequence header.

I_end_position offset: offset of source packet including ending of I-picture, from source packet including sequence header.

FIG. 17D illustrates the relation of these data. That is to say, as shown in FIG. 17B, the configuration of data contained in a source packet is stipulated, and by obtaining the data [PTS_EP start], [SPN_EP start], and [I_end_position_offset], shown in FIG. 17C, from the EP map, the I-picture position within the source packet can be obtained based on this data.

With the present processing example, the reproduction (player) application for executing content reproduction obtains the SPN (source packet number) corresponding to the data of the content to be reproduced from the EP map registered in the clip information is content reproduction section information, searches the secret parameter ID by the determining table based on the obtained SPN (source packet number), and obtains an SP identifier (SP_ID) corresponding to the SPN (source packet number) to be reproduced.

Figure 18:
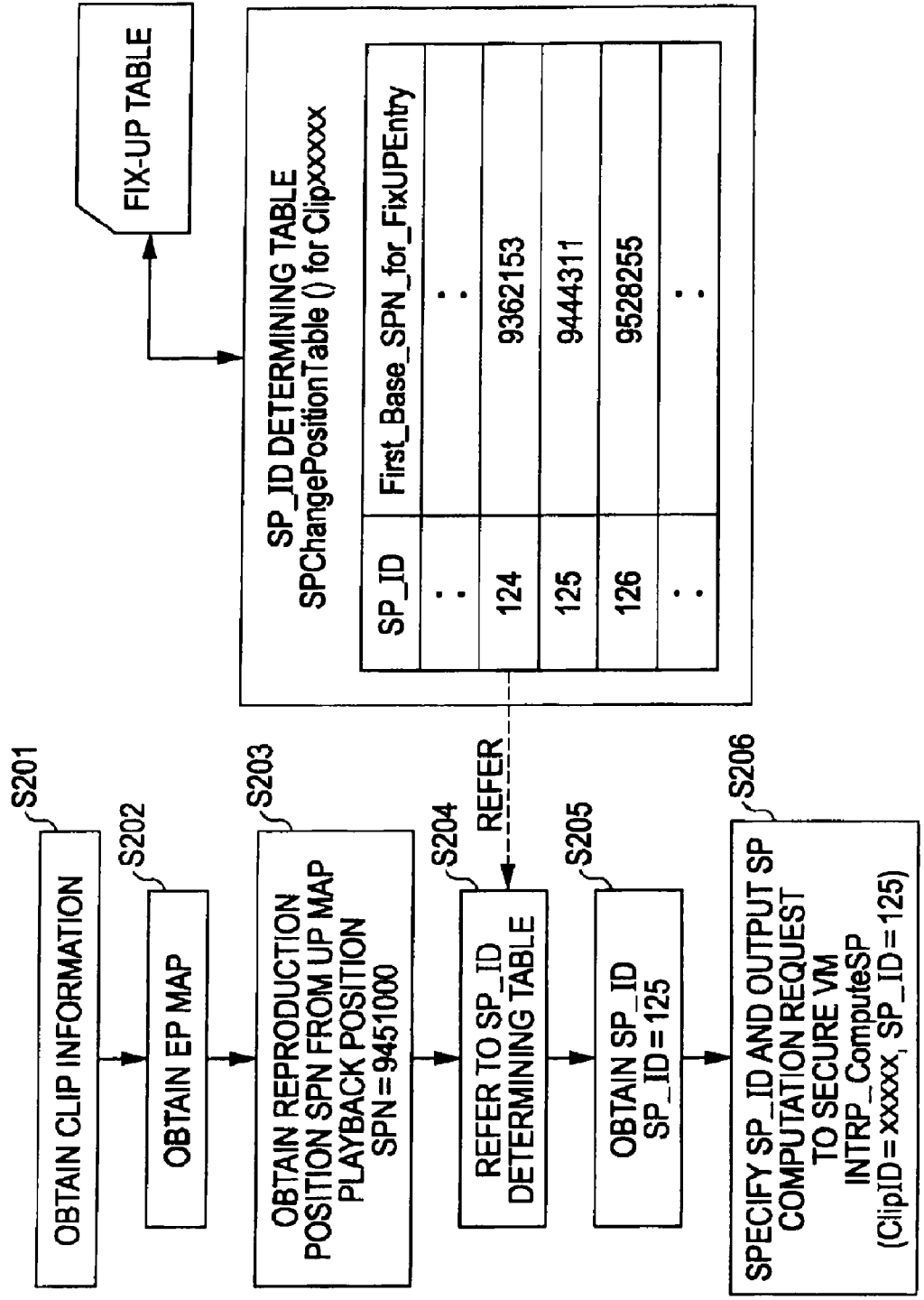
FIG. 18 is a diagram describing the sequence of a processing example 1 for obtaining an SP identifier (SP_ID) corresponding to a segment, and a configuration example of the SP_ID determining table.

FIG. 18 shows a flow chart explaining a data configuration example of a secret parameter (SP) ID determining table, and an SP calculation request processing sequence which the reproduction (player) application executes with regard to the secure VM.

Each step in the flowchart shown in FIG. 18 will be described. First, in step S201 the reproduction (player) application for playing the content obtains clip information which is a reproduction section information of the content to be reproduced, and further, in step S201, obtains an EP map included in the clip information. Further, in step S203, an SPN which is a source packet No. indicating the reproduction position is obtained from that obtained EP map.

For example, let us say the source packet number: SPN=9451000 has been obtained. Next, in step S204 the SP_ID determining table is referenced. Note that this SP_ID determining table is configuration data of the fix-up table stored in the information recording medium as described earlier with reference to FIG. 6, and that, as described earlier with reference to FIGS. 10 and 11, is copied to and stored in a memory region which the reproduction application is capable of using.

As shown in FIG. 18, the SP_ID determining table is recorded as a correlation table between SP_IDs, and source packet numbers (SPN). The SP_ID determining table shown in the drawing is an SP_ID determining table corresponding to a clip. The source packet number (SPN) registered corresponding to each SP_ID is equivalent to the first packet number in each segment making up the content.

In the example of that SP_ID determining table shown in the drawing, the segment of the content to which the SP_ID=124, for example, corresponds to, is packet number (SPN) 9362153 through 9444310, and the segment of the content to which the SP_ID=125 corresponds to is packet number (SPN) 9444311 through 9528254.

Let us say that in step S203, the reproduction application has obtained the source packet number: SPN=9451000 from the EP map in the clip information. In step S204, the reproduction application obtains the SP_ID corresponding to the source packet number: SPN=9451000 from the SP_ID determining table.

With the example of the SP_ID determining table shown in FIG. 18, the source packet number: SPN=9451000 belongs to the packet numbers (SPN)=9444311 through 9528254 corresponding to the SP_ID=125. Accordingly, the secret parameter idea corresponding to the source packet number: SPN=9451000 is SP_ID=125. In step S205, the secret parameter ID [SP_ID=125] corresponding to the source packet number: SPN=9451000 is obtained in this way.

In step S206, the reproduction (player) application notifies the secure VM of the obtained secret parameter ID [SP_ID=125], executes a secret parameters (SP) calculation request (INTRP) corresponding to the segment, and obtains a secret parameter (SP) corresponding to the segment from the secure VM.

A configuration example of a fix-up table and SP_ID determining table applicable with the present processing example, will be described with reference to FIGS. 19 and 20. FIG. 19 is a diagram illustrating the configuration of the fix-up table. The fix-up table includes the following data. Number of Clips (=Nclip): the number of clips used in the title.
FixUpTableBody_StartAddress: the start address for the fix-up table body within the fix-up table.
SPChangePositionTable( ) the SP_ID determining table.
FixUpTableBody( ): the fix-up table body.

With the present processing example, the SP_ID determining table is a table wherein the packet No. regarding which the secret parameter (SP) to be changed is recorded, as shown in FIG. 18. That is to say, the head packet No. of each segment is recorded corresponding to each SP_ID.

Figure 20:
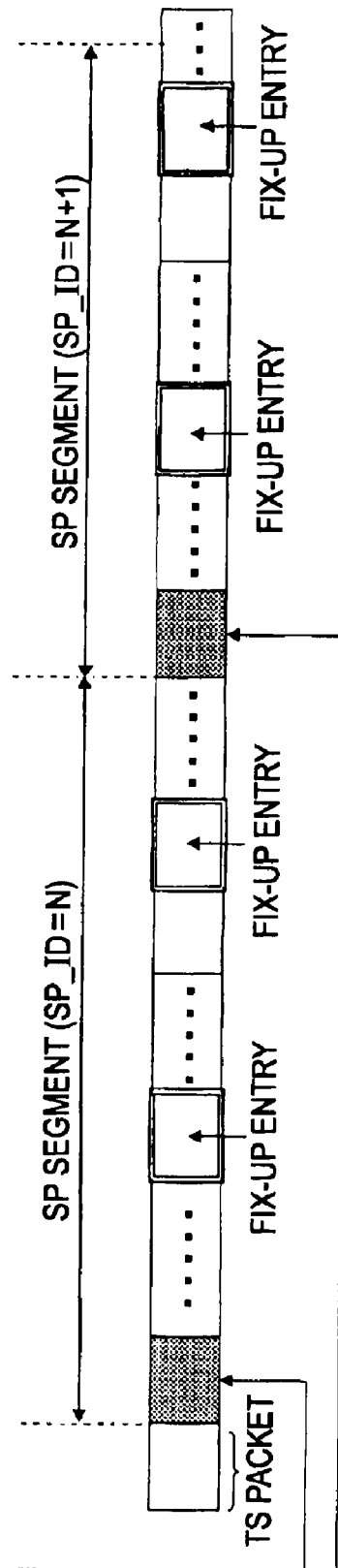
FIG. 20 is a diagram describing a configuration example of an SP_ID determining table.

The data configuration example of the SP_ID determining table [SPChangePositionTable] contained in the fix-up table is shown in FIG. 20. The SP_ID determining table is set as a table wherein is registered source packet numbers (SPN) serving as packet identifiers corresponding to the SP-changed portions included in each clip, for each clip. The SP_ID determining table includes the following data.

Clip_ID: clip ID
Number of SP (=NSP): number of segments (SP_segment)
SP_segment_START_SPN: source packet number (SPN) at head of the segment (SP_segment) corresponding to SP_ID.

The reproduction application can obtain the head source packet number (SPN) of the segment (SP_segment) corresponding to the SP_ID, and obtain the SP_ID corresponding to the SPN to be reproduced.

Figure 21:
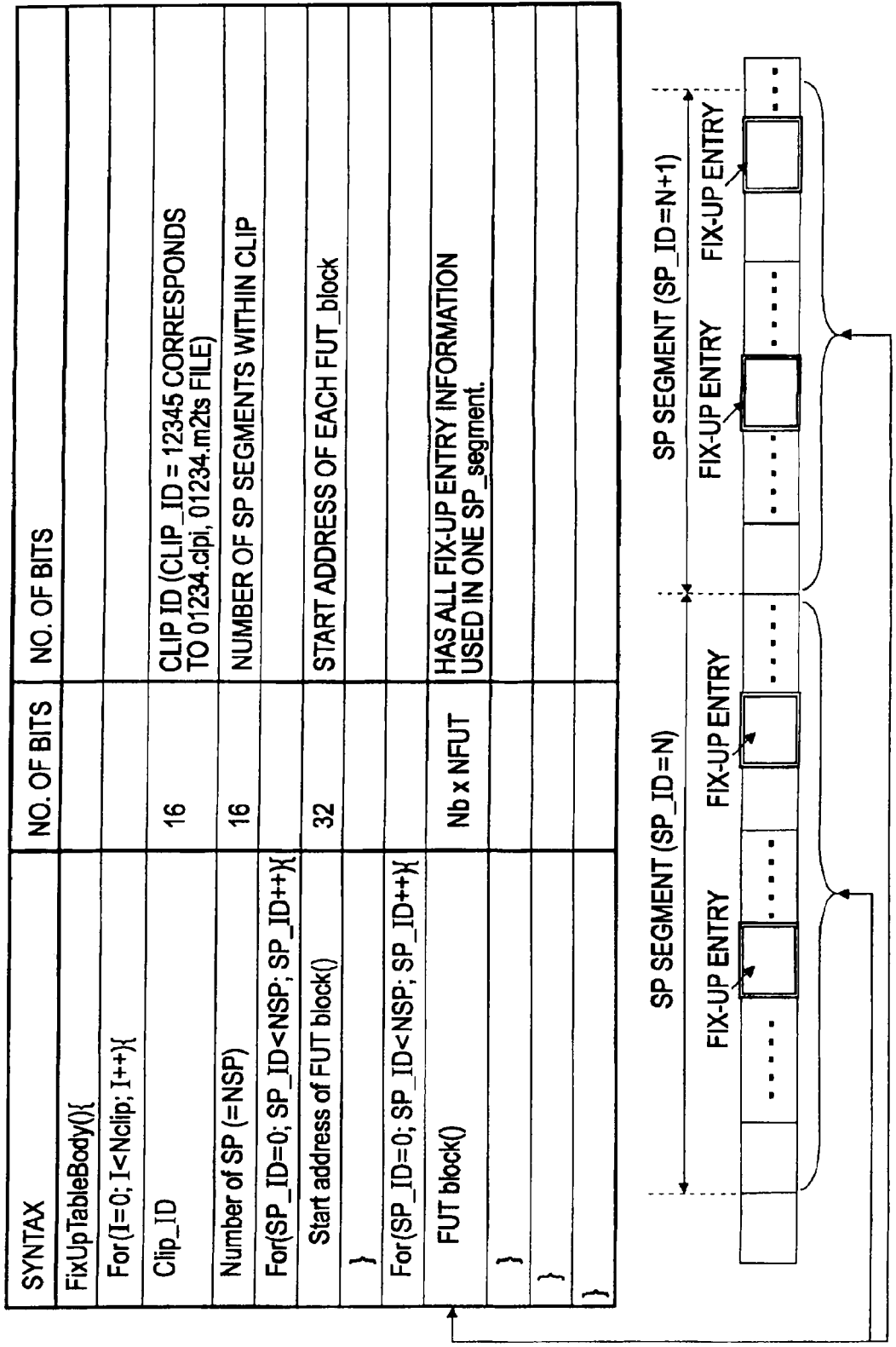
FIG. 21 is a diagram illustrating the data configuration of a fix-up table body contained in a fix-up table.

FIG. 21 illustrates the data configuration example of the fix-up table body [FixUpTableBody] included in the fix-up table. The fix-up table body has the following data for each clip.
Clip_ID: identifier (ID) of clip (in the case that clip_ID=1234, corresponds to 01234.clpi, 01234.m2ts clip file)
Number of SP (=NSP): number of segments (SP_segment) in clip
Further stored are, for each SP_ID, the data of
Start of address of FUT block( ): start address of fix-up table block (FUT block)
FUT block: fix-up table block As shown in the drawing, each fix-up table block is set so as to include all fix-up entries corresponding to one segment (SP_segment).

Figure 22:
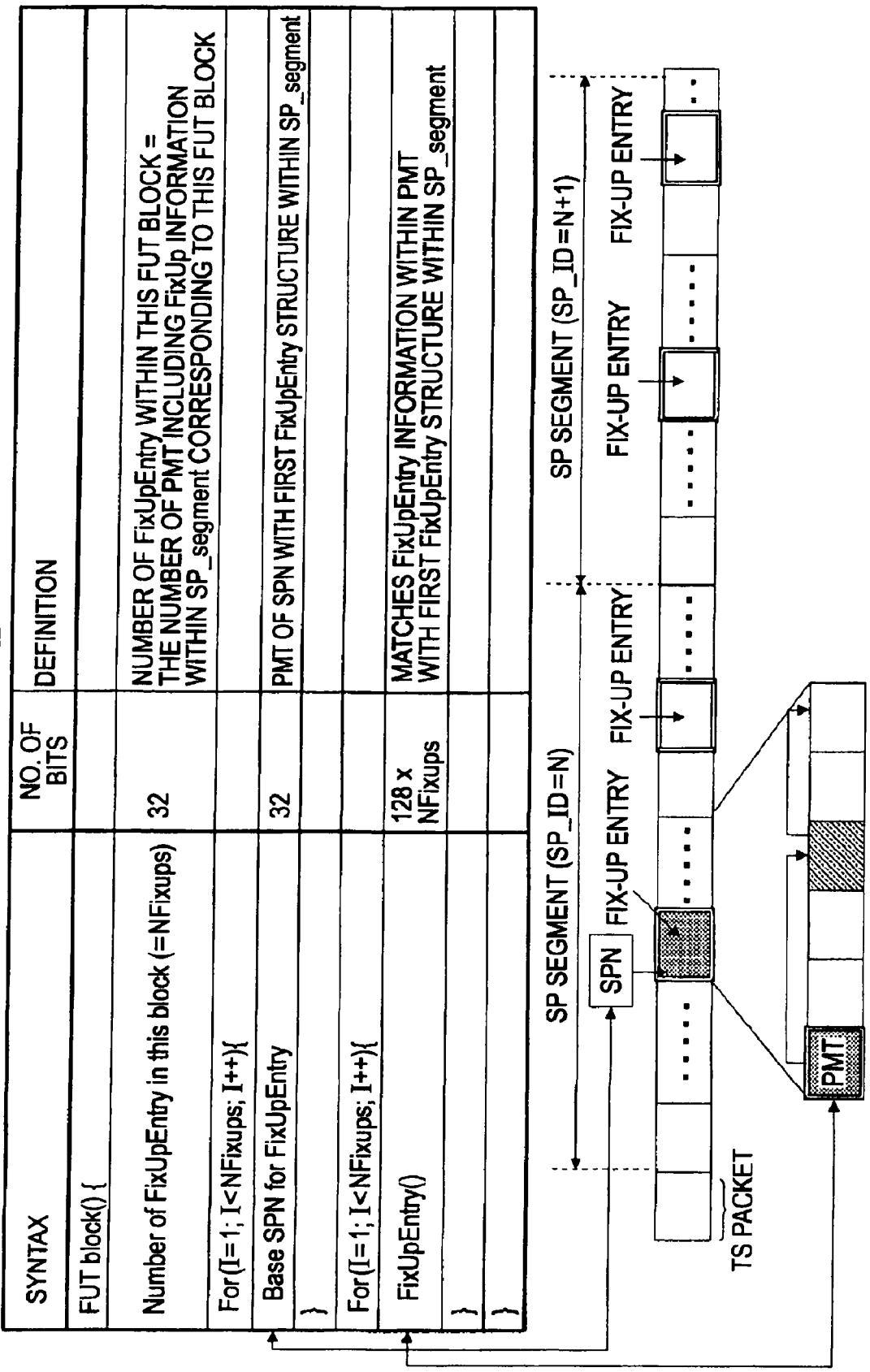
FIG. 22 is a diagram illustrating the data configuration of a fix-up table block (FUT block) contained in a fix-up table body.

Description will be made regarding a data configuration example of one fix-up table block, with reference to FIG. 22. The fix-up table block is a table storing fix-up entries including transformation data serving as the actual replacement data, and write position information, as described earlier. The fix-up table block stores the following data.
Number of FixUpEntry in this block (=NFixups): the number of program maps the tables (PMT) including the fix-up data (FxUp data) within a segment (SP_segment) corresponding this fix-up table block (FUT block).
Further, the following data is included for each of the fix-up entries.
Base SPN for FixUpEntry: source packet number (SPN) for program map table (PMT) having fix-up entry (FixUpEntry) structure, that is the first in the segment (SP segment).
FixUpEntry( ): fix-up entry; matches information of the fix-up entry (FixUpEntry) within the program map table (PMT) having fix-up entry (FixUpEntry) structure, that is the first in the segment (SP_segment).

Note that the fix-up entry (FixUpEntry) is data wherein is registered transformation data which is the object of actual replacement, and the recording position information of that transformation data, as described with reference to FIG. 7 earlier, where the reproduction (player) application extracts the recording position information of the transformation data along with the transformation data from the fix-up entry, overwrites the transformation data at the specified position, thereby executing data transformation.

Figure 23:
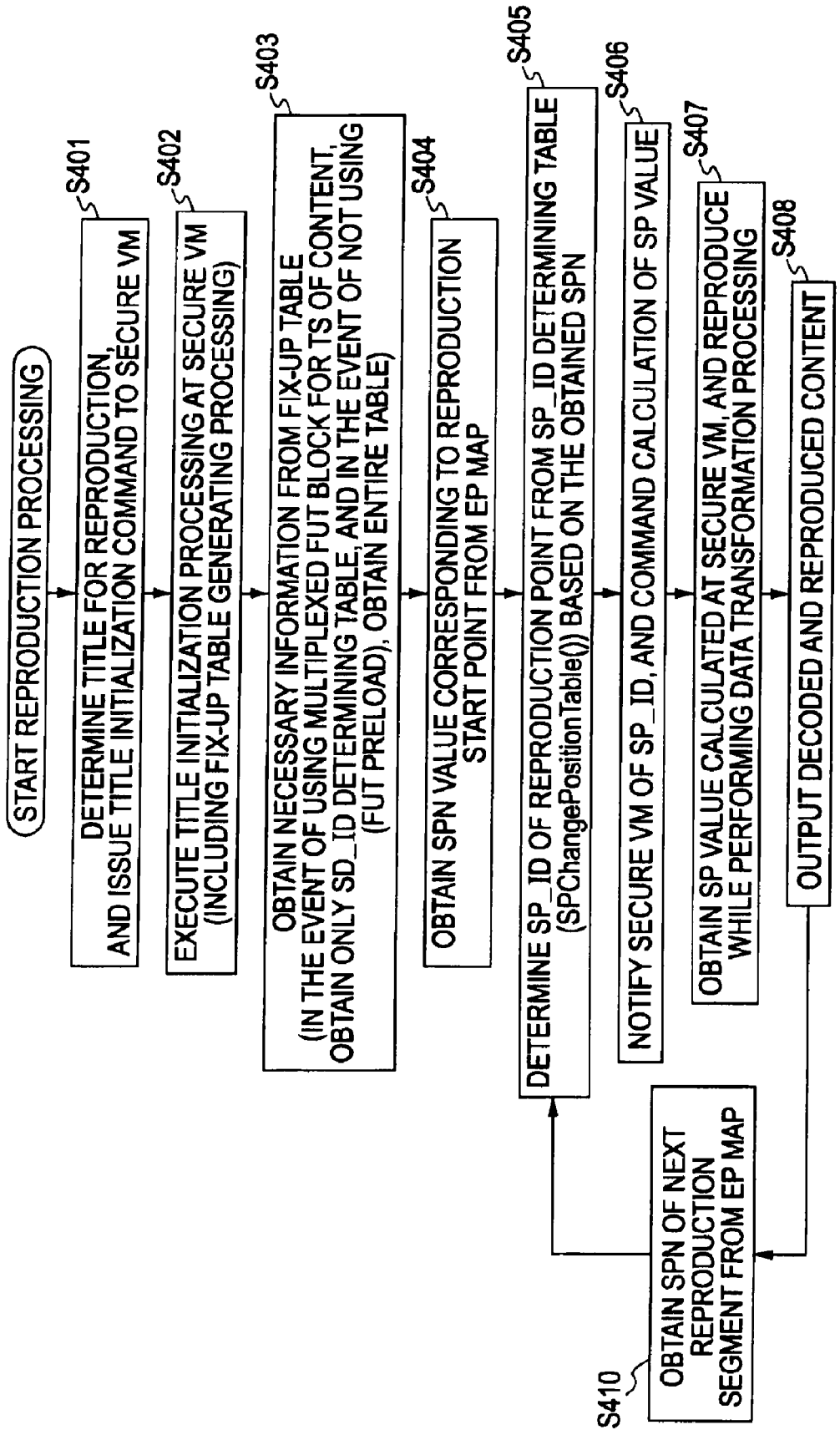
FIG. 23 is a diagram illustrating a flowchart describing a content reproducing sequence in a case of applying the processing example 1 for obtaining an SP identifier (SP_ID) corresponding to a segment.

Next, description will be made regarding the content reproduction processing sequence involving data replacement with transformation data by obtaining a different secret parameter (SP) for each segment with reference to the flowchart in FIG. 23. First, in step S401, the reproduction (player) application determines the title to be reproduced, and issues a title initialization command to the secure VM. In step S402, the secure VM executes the title initialization processing, and executes generation processing of the fix-up table (FixUpTable) corresponding to the title. This is the processing described early with reference to FIGS. 10 and 11, and corresponds to the processing in step S12 in the sequence diagram shown in FIG. 10.

In step S403, the reproduction (player) application obtains information that is necessary from the fix-up table (FixUpTable). This is the processing described earlier with reference to FIG. 11, and is executed as processing for copying necessary information from the fix-up table stored in the memory region of the secure VM to a memory region which the reproduction (player) application can use.

In the case of a reproduction (player) application which performs data transformation by extracting fix-up entries FUT block multiplexed on the TS (transport stream) of the content, i.e., in the case of a reproduction (player) application which executes the processing described earlier with reference to FIG. 8, only the secret parameter (SP) ID determining table is copied to its own memory region. On the other hand, in the case of a reproduction (player) application which does not use the FUT block multiplexed on the content TS (transport stream) but rather uses transformation data recorded in the fix-up table block within the fix-up table file, i.e., a reproduction (player) application (FUT-preload type player) which performs the processing described earlier with reference to FIG. 9, the entire fix-up table is copied to its own memory region.

Next, in step S404, the reproduction (player) application obtains clip information corresponding to the title, and obtains the source packet number (SPN) value corresponding to the reproduction start point from the EP map contained in the clip information.

Next, in step S405, the secret parameter ID (SP_ID) of the starting point is determined from the SP_ID determining table (SPChangePositionTable( )), based on the SPN obtained from the EP map. This processing is the processing described with reference to FIG. 18.

Next, in step S406, the secure VM is notified of the obtained secret parameter ID (SP_ID), and a secret parameter (SP) value calculation request is output. This processing is equivalent to the processing in step S13 described with reference to FIG. 10.

Next, in step S407, the reproduction (player) application obtains the secret parameter (SP) value corresponding to the segment calculated by the secure VM, executes restoration of the fix-up table block based on the secret parameter (SP), obtains fix-up entries stored in the restored fix-up table block, performs data transformation processing for replacing data within the segment of the content with the transformation data, based on the transformation data recorded in the fix-up entry and the recording position thereof, and in step S408, decoding and reproducing processing is executed.

Further, in the case of going to the next segment, in step S410, the SPN of the next reproduction segment is obtained from the EP map, and the processing from step S405 on is executed. That is to say, based on the SPN obtained the EP map, the SP_ID corresponding to the segment is obtained from the SP_ID determining table (SPChangePosition Table( )), and the obtained SP_ID is notified to the secure VM, the SP value corresponding to the segment is obtained, the fix-up table block is restored based on the obtained SP value, fix-up entries are obtained from the restored fix-up table block, transformation data and recording position are extracted from the fix-up entry, and data transformation processing, wherein data in the segment of the content is replaced with transformation data, is performed, for each segment.

According to this processing, processing is performed which applies a different secret parameter (SP) for each segment.

Figure 24:
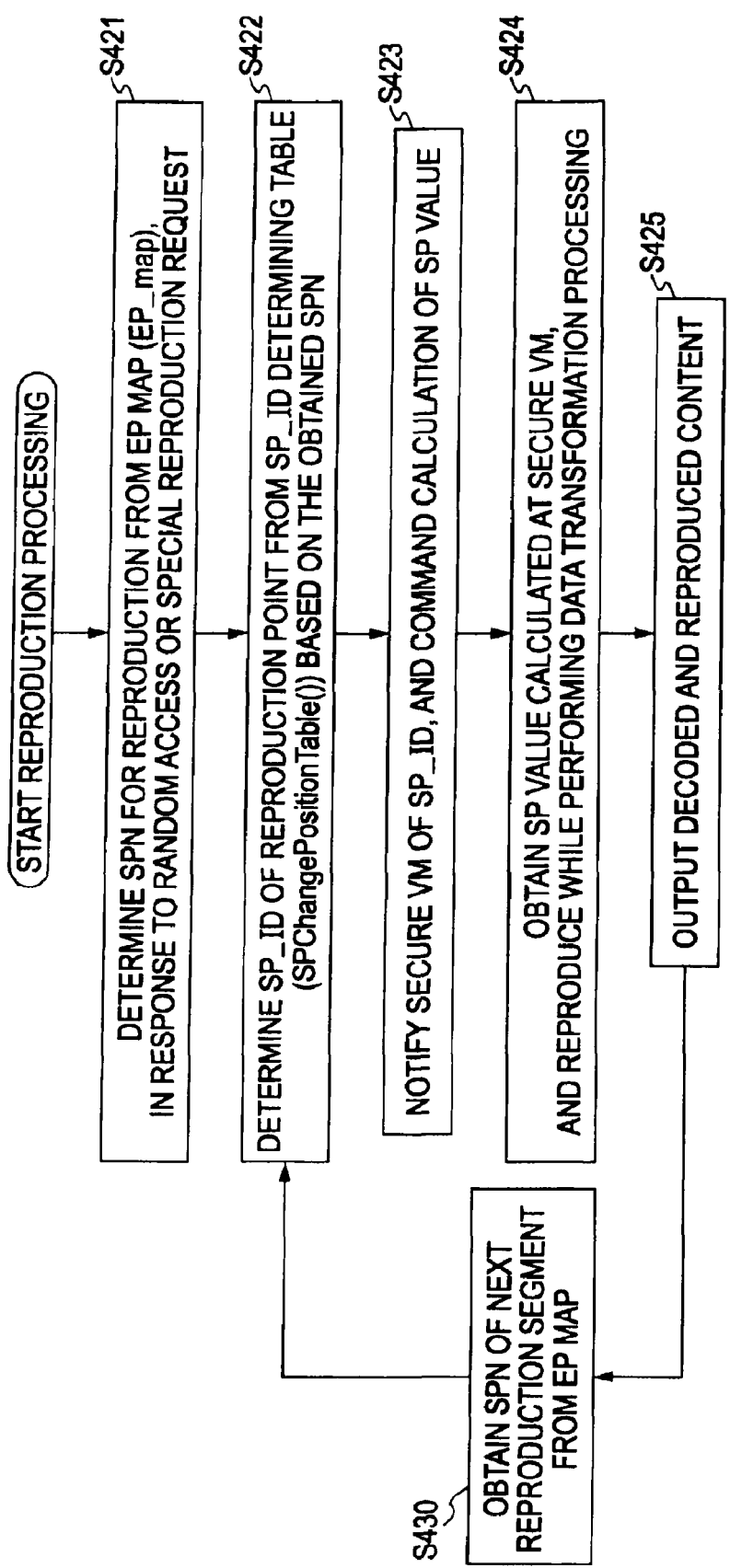
FIG. 24 is a diagram illustrating a flowchart describing a content reproducing sequence for special reproduction in a case of applying the processing example 1 for obtaining an SP identifier (SP_ID) corresponding to a segment.

Next, the processing sequence in the case of performing special reproduction processing, such as random access, will be described with reference to FIG. 24. Note that the processing shown in FIG. 24 only illustrates the processing sequence following the title initialization processing. That is to say, this shows processing following completion of the processing steps S401 through S403 in the processing flowchart shown in FIG. 23.

First, in step S421, the reproduction (player) application obtains an EP map from clip information, in response to a special reproduction process request such as random access, and obtains the source packet number (SPN) value corresponding to the reproduction starting point from the obtained EP map.

Next, in step S422, the secret parameter ID (SP ID) at the starting point is determined from the SP_ID determining table (SPChangePositionTable( )) based on the SPN obtained from the EP map. This processing is processing described with reference to FIG. 18.

Next, in step S423, the obtained secret parameter ID (SP_ID) is notified to the secure VM, and the secret parameter (SP) calculation request is output. This processing is equivalent to the processing in step S13 described with reference to FIG. 10.

Next, in step S424, the reproduction (player) application obtains the secret parameter (SP) value corresponding to the segment calculated by the secure VM, executes restoration of the fix-up table block based on the secret parameter (SP), obtains the fix-up entries stored in the restored fix-up table block, performs data transformation processing for replacing data within the segment of the content with the transformation data, based on the transformation data recorded in the fix-up entry and the recorded position thereof, and in step S425, performs decoding and reducing processing.

Further, in the case of going to the next segment, in step S430, the SPN of the next reproduction segment is obtained from the EP map, and the processing from step S422 on is executed. That is to say, based on the SPN obtained from the EP map, the SP_ID corresponding to the segment is obtained from the SP_ID determining table (SPChangePosition Table( )), and the obtained SP_ID is notified to the secure VM, the SP value corresponding to the segment is obtained, the fix-up table block is restored based on the obtained SP value, fix-up entries are obtained from the restored fix-up table block, transformation data and recording position are extracted from the fix-up entry, and data transformation processing, wherein data in the segment of the content is replaced with transformation data, is performed, for each segment.

As described above, the present processing example is configured such that the reproduction (player) application for executing content reproduction first obtains, from an EP map recorded in clip information serving as content reproduction section information, an SPN (source packet number) corresponding to the segment of the content data to be reproduced, and subsequently searches the secret parameter ID determining table based on the obtained SPN (source packet number), obtains an SP identifier (SP_ID) set corresponding to the obtained SPN (source packet number), notifies the secure VM of the obtained SP identifier (SP_ID), and executes a secret parameter calculation request (INTRP), so secret parameters (SP) sequentially corresponding to each of the segments can be correctly received from the secure VM, and content reproduction can be performed while performing accurate data transformation.

(6.2) Processing Example 2 for Obtaining SP Identifier (SP_ID) Corresponding to Segment The processing example 2 for obtaining an SP identifier (SP_ID) corresponding to the segment will be described. In the present processing example, the secret parameter ID determining table is of a configuration storing correlation data between secret parameter IDs (SP_ID) and EP map registration table identification information (EP map registration table ID).

The reproduction (player) application which is to execute content reproduction first obtains an EP map from clip information corresponding to the content data to be reproduced, and based on the EP map registration table identification information (EP map registration table ID) corresponding to the EP map, obtains an SP identifier (SP_ID) set corresponding to the EP map registration table ID from the secret parameter ID determining table.

The reproduction (player) application notifies the secure VM of the SP identifier (SP_ID) obtained from the secret parameter ID determining table, and executes a secret parameter calculation request (INTRP).

Figure 25:
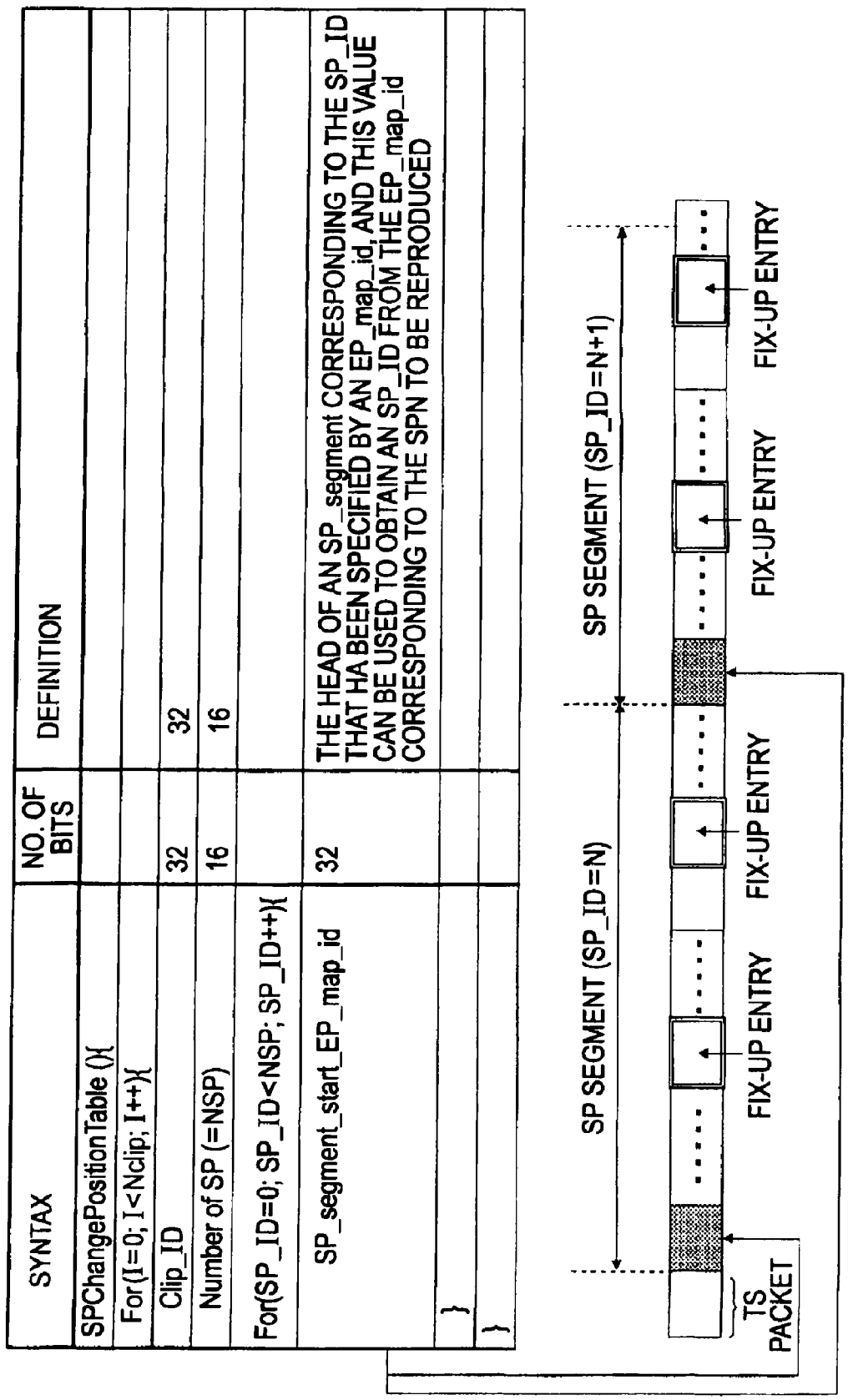
FIG. 25 is a diagram describing a configuration example of the SP_ID determining table in a processing example 2.

The following is a detailed description of the present processing example, with reference to the drawings. FIG. 25 is a diagram illustrating a data configuration example of the SP_ID determining table [SPChangePositionTable] applied in the present processing example. In the present processing example, the configuration of the fix-up table is the same as the configuration shown in FIG. 19, as with the earlier-described processing example 1. Only the data configuration of the SP_ID determining table [SPChangePositionTable] is different from the processing example 1.

The SP_ID determining table shown in FIG. 25 stores correlation data between the EP map registration table IDs and secret parameter IDs (SP_ID). Specifically, this stores correlation data between the EP map registration table ID of an EP map including information of the head packet of the segment (SP_segment) which is the content configuration data, and secret parameter ID (SP_ID). The SP_ID determining table includes the following data.

Clip ID: clip ID
Number of SP (=NSP): number of segments (SP_segment)
    SP_segment_start_EP_map_id: specifies the EP map registration table ID (EP_map_id) at the head of the segment (SP_segment) corresponding to the SP_ID, and the SP_ID can be obtained from the EP map registration table ID (EP_map_id) corresponding to the source packet number (SPN) to be reproduced, using this value.

The reproduction application can obtain the registration table ID of the EP map including the head source packet of the segment (SP_segment) corresponding to the SP_ID, and obtain the SP_ID corresponding to the segment from the SP_ID determining table shown in FIG. 25, based on the EP map registration table ID.

Figure 26:
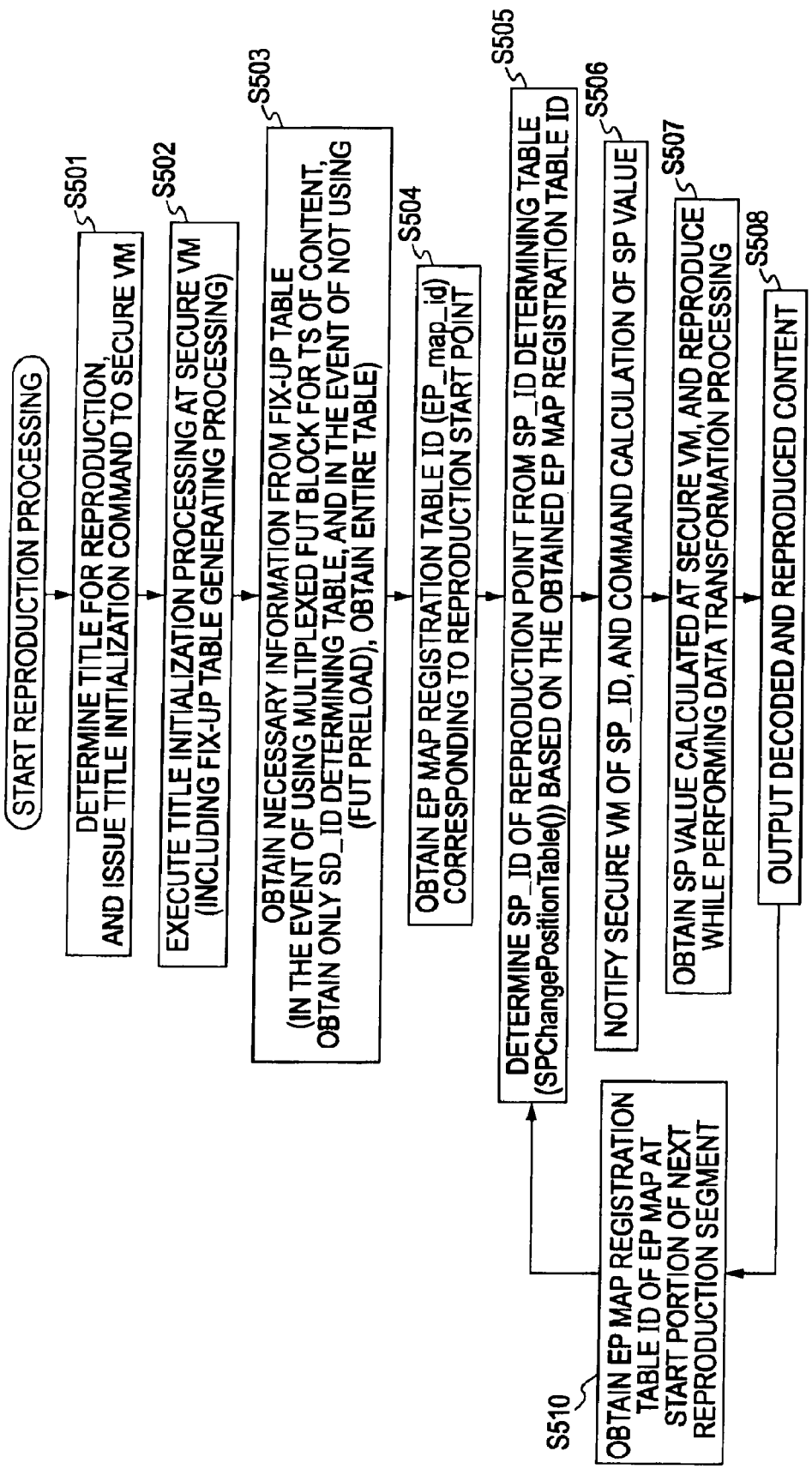
FIG. 26 is a diagram illustrating a flowchart describing a content reproducing sequence in a case of applying the processing example 2 for obtaining an SP identifier (SP_ID) corresponding to a segment.

Description will be made regarding the content reproduction processing sequence involving data replacement with transformation data by obtaining a different secret parameter (SP) for each segment by applying the SP_ID determining table shown in FIG. 25, with reference to the flowchart in FIG. 26.

First, in step S501, the reproduction (player) application determines the title to be reproduced, and issues a title initialization command to the secure VM. In step S502, the secure VM executes the title initialization processing, and executes generation processing of the fix-up table (FixUpTable) corresponding to the title. This is the processing described early with reference to FIGS. 10 and 11, and corresponds to the processing in step S12 in the sequence diagram shown in FIG. 10.

In step S503, the reproduction (player) application obtains information that is necessary, from the fix-up table (FixUpTable). This is the processing described earlier with reference to FIG. 11, and is executed as processing for copying necessary information from the fix-up table stored in the memory region of the secure VM to a memory region which the reproduction (player) application can use.

In the case of a reproduction (player) application which performs data transformation by extracting fix-up entries from an FUT block multiplexed on the TS (transport stream) of the content, i.e., in the case of a reproduction (player) application which executes the processing described early with reference to FIG. 8, only the secret parameter (SP) ID determining table is copied to its own memory region. On the other hand, in the case of a reproduction (player) application which does not use the FUT block multiplexed on the content TS (transport stream) but rather uses transformation data recorded in the fix-up table block within the fix-up table file, i.e., a reproduction (player) application (FUT-preload type player) which performs the processing described earlier with reference to FIG. 9, the entire fix-up table is copied to its own memory region.

Next, in step S504, the reproduction (player) application obtains clip information corresponding to the title, determines the EP map contained in the clip information, and obtains the value of the EP map registration table ID as registration table identification information of the EP map that has been determined.

Next, in step S505, the secret parameter ID (SP_ID) of the starting point is determined from the SP_ID determining table (SPChangePositionTable( )), based on the EP map registration table ID. THE SP_ID determining table shown in FIG. 25 which stores the correlation data between the secret parameter ID (SP_ID) and the registration table identification information of the EP map (EP map registration table ID) is used.

Next, in step S506, the secure VM is notified of the obtained secret parameter ID (SP_ID), and a secret parameter (SP) value calculation request is output. This processing is equivalent to the processing in step S13 described with reference to FIG. 10.

Next, in step S507, the reproduction (player) application obtains the secret parameter (SP) value corresponding to the segment calculated by the secure VM, executes restoration of the fix-up table block based on the secret parameter (SP), obtains fix-up entries stored in the restored fix-up table block, performs data transformation processing for replacing data within the segment of the content with the transformation data, based on the transformation data recorded in the fix-up entry and the recording position thereof, and in step S508, decoding and reproducing processing is executed.

Further, in the case of going to the next segment, in step S510, the EP map registration table ID of the EP map including information of the first packet in the next reproduction segment is obtained, and the processing from step S505 on is executed. That is to say, based on the obtained EP map registration table ID, the SP_ID correlated to the EP map registration table ID is obtained from the SP_ID determining table (SPChangePositionTable( )), and the obtained SP_ID is notified to the secure VM, the SP value corresponding to the segment is obtained, the fix-up table block is restored based on the obtained SP value, fix-up entries are obtained from the restored fix-up table block, transformation data and recording position are extracted from the fix-up entry, and data transformation processing, wherein data in the segment of the content is replaced with transformation data, is performed, for each segment.

According to this processing, processing is performed which applies a different secret parameter (SP) for each segment.

Figure 27:
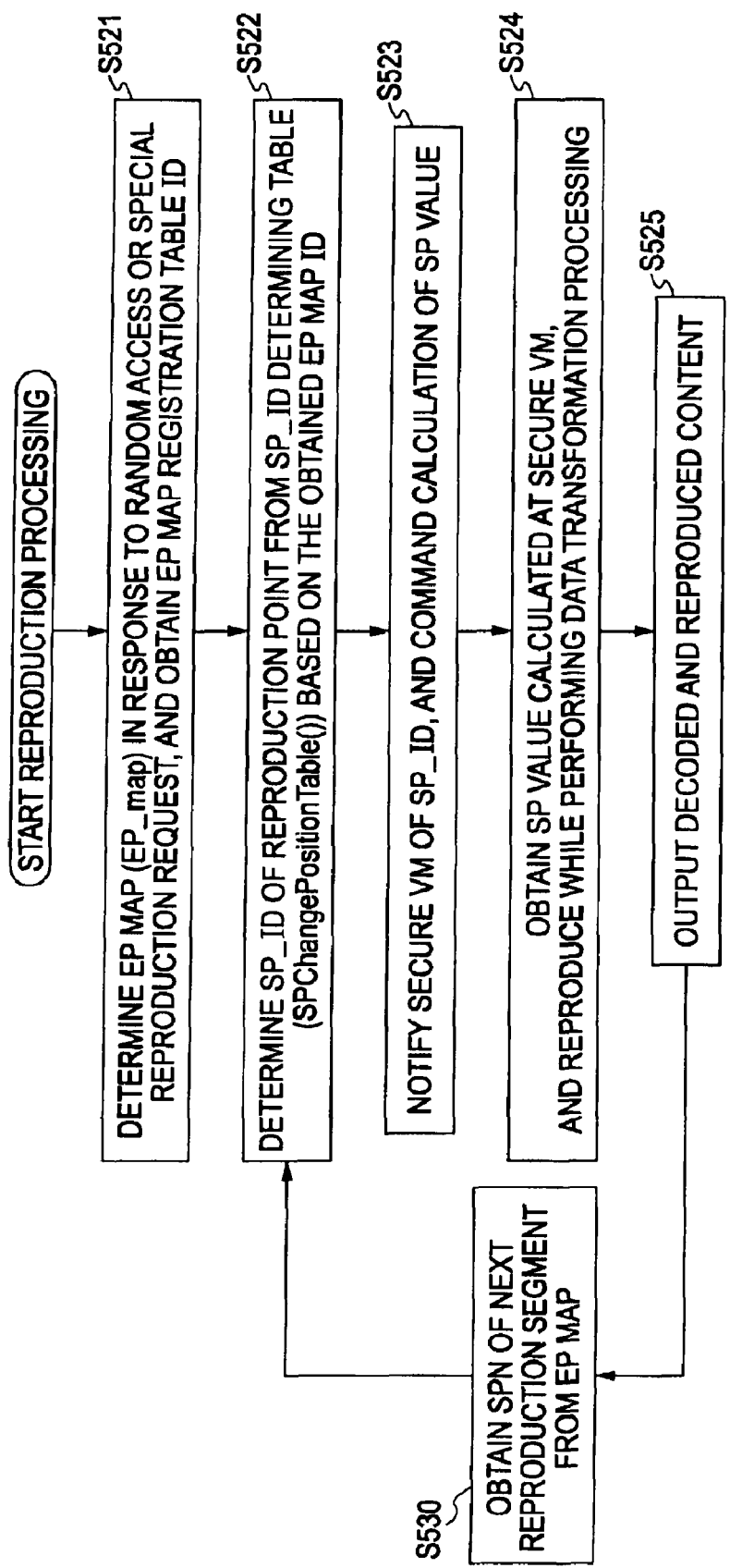
FIG. 27 is a diagram illustrating a flowchart describing a content reproducing sequence for special reproduction in a case of applying the processing example 2 for obtaining an SP identifier (SP_ID) corresponding to a segment.

Next, the processing sequence in the case of performing special reproduction processing, such as random access, will be described with reference to FIG. 27. Note that the processing shown in FIG. 27 only illustrates the processing sequence following the title initialization processing. That is to say, this shows processing following completion of the processing step S501 through S503 in the processing flowchart shown in FIG. 26.

First, in step S521, the reproduction (player) application determines the EP map used by clip information, in response to a special reproduction process request such as random access, and obtains the registration table identifier value of the determined EP map (EP map registration table ID).

Next, in step S522, the secret parameter ID (SP_ID) at the starting point corresponding to the EP map registration table ID is determined from the SP_ID determining table (SPChangePositionTable( )) based on the obtained EP map registration table ID.

Next, in step S523, the obtained secret parameter ID (SP_ID) is notified to the secure VM, and the secret parameter (SP) calculation request is output. This processing is equivalent to the processing in step S13 described with reference to FIG. 10.

Next, in step S524, the reproduction (player) application obtains the secret parameter (SP) value corresponding to the segment calculated by the secure VM, executes restoration of the fix-up table block based on the secret parameter (SP), obtains the fix-up entries stored in the restored fix-up table block, performs data transformation processing for replacing data within the segment of the content with the transformation data, based on the transformation data recorded in the fix-up entry and the recorded position thereof, and in step S525, performs decoding and reproducing processing.

Further, in the case of going to the next segment, in step S530, the EP map registration table ID of the EP map including information of the first packet of the next reproduction segment is obtained, and the processing from step S522 on is executed. That is to say, based on the obtained EP map registration table ID, the SP_ID correlated with the EP map registration table ID is obtained from the SP_ID determining table (SPChangePositionTable( )), the obtained SP_ID is notified to the secure VM, the SP value corresponding to the segment is obtained, the fix-up table block is restored based on the obtained SP value, fix-up entries are obtained from the restored fix-up table block, transformation data and recording position are extracted from the fix-up entry, and data transformation processing, wherein data in the segment of the content is replaced with transformation data, is performed, for each segment.

As described above, the present processing example is configured such that the reproduction (player) application for executing content reproduction first determines an EP map storing packet information corresponding to the start position of a segment of content data to be reproduced, from an EP map recorded in clip information serving as content reproduction section information, searches the secret parameter ID determining table based on the registration table identifier of the EP map (EP map registration table ID), obtains an SP identifier (SP_ID) set corresponding to the EP map registration table ID, notifies the secure VM of the obtained SP identifier (SP_ID), and executes a secret parameter calculation request (INTRP), so secret parameters (SP) sequentially corresponding to each of the segment can be correctly received from the secure VM, and content reproduction can be performed while performing accurate data transformation.

(6.3) Processing Example 3 for Obtaining SP Identifier (SP_ID) Corresponding to Segment Next, the processing example 3 for obtaining an SP identifier (SP_ID) corresponding to the segment will be described. In the present processing example, segments to be set for the content are sectioned based on the number of EP map registration tables set down beforehand. That is to say, a content section region having an entry point indicating the reproduction start position equivalent to N EP map registration tables is one segment. N is an integer of 1 or more.

The reproduction (player) application which is to execute content reproduction obtains an EP map from clip information corresponding to the content data to be reproduced, and based on the EP map, sequentially obtains and reproduces TS packets configuring the content. As described earlier with reference to FIG. 15, an EP map is set for each GOP, with the reproduction (player application) performing the processing of obtaining EP maps in the clip information and extracting and reproducing reproduction packets.

With this present processing example, the reproduction (player) application applies the EP map registration table ID corresponding to the EP map used, to calculate the secret parameter ID (SP_ID). Or, the reproduction (player) application counts the number of EP map registration tables used, and determines that a segment switchover will occur each time the number (N) of EP map registration tables making up a segment (corresponding to the N number of EP map registration tables) is reached, and accordingly performs processing for switching over the secret parameter (SP) to be applied for restoration of the fix-up table block.

Each time the number (n) of EP map registration tables making up a segment (corresponding to the n number of EP map registration tables) is reached, of the reproduction (player) application and notifies the secure VM of the incremented SP identifier (SP_ID) sequentially, and executes a secret parameter calculation request (INTRP).

The present processing example will be described in detail now with reference to the figures. FIG. 28 shows (a) the content configuration, and (b) EP map configuration data, applied in the present processing example. As shown in the (a) content configuration, the content is sectioned into GOPs, and information relating to I-pictures in each of the GOPs is recorded in respective EP map registration tables. As shown in the (b) EP map configuration data in FIG. 28, multiple EP map registration tables are recorded in the EP map, with an SPN (source packet number) which is address information regarding the I-picture registered in each EP map registration table, and PTS (presentation time stamp) being recorded in a correlated matter.

Thus, an EP map has a data configuration of multiple EP map registration tables being stored in a single file. The tables registered in the EP map have table numbers, these being identified as EP map registration table IDs.

With the present processing example, a segment is set as a data region of N EP map registration tables. The example shown in FIG. 28 is a setting wherein N=5, so that five EP map registration tables are set as one segment. In the contents shown in FIG. 28A, GOP 0 through GOP 4, the EP map registration tables 0 through an EP map registration table 4, are sectioned as one segment, and the following GOP 5 through GOP 9, i.e., EP map registration table 5 through EP map registration table 9, are sectioned as one segment. In the same way, 5 GOPs (=5 EP map registration tables) are set as one segment.

In this case, as shown in FIG. 28B, the identifier (SP_ID) of the secret parameter applied to the segment corresponding to the EP map registration tables 0 through 4, is set to [0], and subsequently,
EP map registration tables 5 through 9: SP_ID=1,
EP map registration tables 10 through 14: SP_ID=2,
EP map registration tables 14 through 19: SP_ID=3,
and this way, the secret parameter identifier (SP_ID) is incremented by 1 every 5 EP map registration tables.

The reproduction (player) application which reproduces the content applies the EP map registration table ID corresponding to the EP map registration table to be used, and calculates the secret parameter ID (SP_ID). The secret parameter ID (SP_ID) is determined by extracting an integer portion of 0 or greater, calculated by the following expression.

$$SP\_ID = (EP\text{ map registration table ID})/N$$

In the above Expression, n is equivalent to the number of EP map registration tables within one segment, in the example in FIG. 28, this is calculated as
EP map registration tables 0 through 4: SP_ID=0,
EP map registration tables 5 through 9: SP_ID=1,
EP map registration tables 10 through 14: SP_ID=2,
and so on.

Or, an arrangement may be made wherein, instead of applying the above Expression, the reproduction (player) application counts the number of the EP map registration tables to be used, determines that segment switchover will occur each time the EP map registration table number (N) making up the segment (corresponding to N EP map registration tables), and performs processing for switching over the secret parameter (SP) applied for restoration of the fix-up table block.

With the setting example shown in FIG. 28, N=5, so determination is made that the segment switchover will occur every five EP map registration tables, so that SP_ID is incremented by one every five EP maps, the SP_ID is determined, the determined SP_ID is output to the secure VM, and the secret parameter corresponding to the segment is obtained. It goes without saying that the segments can be determined at an integral unit other than N=5, but it is desirable for a unit of multiple EP map registration table entry points to be determined, with consideration for the processing time of the reproduction device.

With the present processing example, different SP_IDs for each segment can be obtained based on the above Expression or an EP map registration table count, so there is no need to use a source packet number or secret parameter ID determining table for obtaining a secret parameter ID based on the EP map registration table ID, as with the earlier-described processing examples 1 and 2.

In the case of applying the present processing example, the content reproduction processing sequence involving obtaining of secret parameters (SP) different for each segment, and data replacement with transformation data, will be described with reference to the flowchart shown in FIG. 29.

First, in step S601, the reproduction (player) application determines the title to be reproduced, and issues a title initialization command to the secure VM. In step S602, the secure VM executes the title initialization processing, and executes generation processing of the fix-up table (FixUpTable) corresponding to the title. This is the processing described early with reference to FIGS. 10 and 11, and corresponds to the processing in step S12 in the sequence diagram shown in FIG. 10.

In step S603, the reproduction (player) application obtains information that is necessary, from the fix-up table (FixUpTable). This is the processing described earlier with reference to FIG. 11, and is executed as processing for copying necessary information from the fix-up table stored in the memory region of the secure VM to a memory region which the reproduction (player) application can use.

In the case of a reproduction (player) application which performs data transformation by extracting fix-up entries FUT block multiplexed on the TS (transport stream) of the content, i.e., in the case of a reproduction (player) application which executes the processing described early with reference to FIG. 8, only the secret parameter (SP) ID determining table is copied to its own memory region. On the other hand, in the case of a reproduction (player) application which does not use the FUT block multiplexed on the content TS (transport stream) but rather uses transformation data recorded in the fix-up table block within the fix-up table file, i.e., a reproduction (player) application (FUT-preset type player) which performs the processing described earlier with reference to FIG. 9, the entire fix-up table is copied to its own memory region.

Next, in step S604, the reproduction (player) application obtains clip information corresponding to the title, determines the EP map contained in the clip information, and obtains the value of the EP map registration table ID as registration table identification information of the EP map that has been determined.

Next, in step S605, the SP_ID is calculated based on the EP map registration table ID. For example, with the number of EP map registration tables included in one segment as N, SP_ID is calculated by $$SP\_ID = (EP \text{ map registration table ID})/N$$

Next, in step S606, the secure VM is notified of the obtained secret parameter ID (SP_ID), and a secret parameter (SP) value calculation request is output. This processing is equivalent to the processing in step S13 described with reference to FIG. 10.

Next, in step S607, the reproduction (player) application obtains the secret parameter (SP) value corresponding to the segment calculated by the secure VM, executes restoration of the fix-up table block based on the secret parameter (SP), obtains fix-up entries stored in the restored fix-up table block, performs data transformation processing for replacing data within the segment of the content with the transformation data, based on the transformation data recorded in the fix-up entry and the recording position thereof, and in step S608, decoding and reproducing processing is executed.

Further, in the case of going to the next segment, in step S610, the EP map registration table ID of the EP map including information of the first packet in the next reproduction segment is obtained, and the processing from step S605 on is executed. That is to say, the SP_ID is calculated based on the obtained EP map registration table ID, the obtained SP_ID is notified to the secure VM, the SP value corresponding to the segment is obtained, the fix-up table block is restored based on the obtained SP value, fix-up entries are obtained from the restored fix-up table block, transformation data and recording position are extracted from the fix-up entry, and data transformation processing, wherein data in the segment of the content is replaced with transformation data, is performed, for each segment.

According to this processing, processing is performed which applies a different secret parameter (SP) for each segment. Note that an arrangement may be made wherein the number of EP map registration tables are counted to obtain the SP_ID, rather than obtaining the SP_ID based on the expression applying the EP map registration table ID, as described earlier.

Next, the processing sequence in the case of performing special reproduction processing, such as random access, will be described with reference to FIG. 30. Note that the processing shown in FIG. 30 only illustrates the processing sequence following the title initialization processing. That is to say, this shows processing following completion of the processing steps S601 through S603 in the processing flowchart shown in FIG. 29.

First, in step S621, the reproduction (player) application determines the EP map registration table used by clip information, in response to a special reproduction process request such as random access, and obtains the value of the EP map registration table identifier (EP map registration table ID).

Next, in step S622, based on the obtained EP map registration table ID, SP_ID is calculated by the expression $$SP\_ID = (EP \text{ map registration table ID})/N.$$

Next, in step S623, the obtained secret parameter ID (SP_ID) is notified to the secure VM, and the secret parameter (SP) calculation request is output. This processing is equivalent to the processing in step S13 described with reference to FIG. 10.

Next, in step S624, the reproduction (player) application obtains the secret parameter (SP) value corresponding to the segment calculated by the secure VM, executes restoration of the fix-up table block based on the secret parameter (SP), obtains the fix-up entries stored in the restored fix-up table block, performs data transformation processing for replacing data within the segment of the content with the transformation data, based on the transformation data recorded in the fix-up entry and the recorded position thereof, and in step S625, performs decoding and reducing processing.

Further, in the case of going to the next segment, in step S630, the EP map registration table ID of the EP map including information of the first packet of the next reproduction segment is obtained, and the processing from step S622 on is executed. That is to say, the SP_ID is calculated based on the obtained EP map registration table ID, the calculated SP_ID is notified to the secure VM, the SP value corresponding to the segment is obtained, the fix-up table block is restored based on the obtained SP value, fix-up entries are obtained from the restored fix-up table block, transformation data and recording position are extracted from the fix-up entry, and data transformation processing, wherein data in the segment of the content is replaced with transformation data, is performed, for each segment. Note that an arrangement may be made with this example as well wherein the number of EP map registration tables are counted to obtain the SP_ID, rather than applying the expression.

As described above, the present processing example is configured such that the reproduction (player) application for executing content reproduction first determines EP map registration tables corresponding to content data to be reproduced, from an EP map recorded in clip information serving as content reproduction section information, obtains the secret parameter ID (SP_ID) based on the EP map registration table identifier (EP map registration table ID), by applying an expression or by counting the number of EP map registration tables, notifies the secure VM of the obtained SP identifier (SP_ID), and executes a secret parameter calculation request (INTRP), thereby obtaining the SP identifier (SP-ID) without applying a special parameter ID determining table, so secret parameters (SP) corresponding to each of the segment can be correctly received from the secure VM, and content reproduction can be performed while performing accurate data transformation.

7. Configuration of Information Processing Device

Next, the hardware configuration example of an information processing device which executes the processing of the above-described in reproduction (player) application and secure VM will be described with reference to FIG. 31. An information processing device 800 has the CPU 809 which executes data processing following various types of program including OS, content reproduction and recording application programs, and programs for mutual authentication processing, processing and accompanying the reproduction of contents, e.g., the above-described data transformation processing, and so forth, ROM 808 serving as a storage area for programs, parameters, etc., memory 810, and input/output I/F 802 for input/output of digital signals, an input/output I/F 804 having an A/D, D/A converter 805 for input/output of analog signals, an MPEG CODEC 803 for executing encoding and decoding processing of MPEG data, TS-PS processing unit 806 for executing the TS (Transport stream)-PS (Program Stream) processing, encryption processing unit 807 for executing the various types of encryption processing, such as mutual authentication decryption processing of encrypted content, and so forth, a recording medium 812 such as a hard disk, and a drive 811 for driving the recording medium 812 and performing input/output of data recording/reproducing signals, with each block being connected to a bus 801.

The information processing device (host) 800 is connected with the drive by connecting bus such as a ATAPI-BUS, for example. Fix-up tables, content, and so forth, are input/output via the digital signal input/output I/F 802. Encryption processing and decryption processing is performed by the encryption processing unit 807, applying AES algorithms, or the like, for example.

Note that programs for executing content reproduction or recording processing are kept inside the ROM 808 for example, and the memory 810 is used while executing the programs as necessary, for work area for keeping the parameters and data.

The ROM 808 or recording medium 812 stores, for example, the public key of an Administration Center, a secret key for a host, a public key certificate for the host, and further, a drive CRL serving as a revocation list, and so forth.

At the time of reproducing or external output of content, data transformation processing programs obtained from the information recording medium is applied to execute processing following the various processing sequences described earlier in the processing example, such as decryption of encrypted contents, restoration of fix-up tables, writing of transformation data based on data stored in fix-up tables, and so forth.

8. Information Recording Media Manufacturing Device and Information Recording Medium An information recording media manufacturing device and the information recording medium will be described. That is to say, description will be made regarding the manufacturing device of the information recording medium applied to the above-described content reproduction processing, the method thereof, and information recording medium.

The information recording media manufacturing device is, for example, a device for manufacturing the information recording medium 100 storing the recorded data described with reference to FIG. 1 earlier.

The information recording medium manufacturing device includes: a data processing unit for generating content including broken data different from proper content configuration data, and a fix-up table including a parameter identifier determining table storing fix-up table body data stored by subjecting transformation data for replacement with the broken data to computation or encryption processing with a parameter set corresponding to a segment which is a sectioned region of content, and a parameter identifier which is identification information of the parameter; and a data recording unit for recording content including the broken data, and the fix-up table, in an information recording medium.

One example of a parameter identifier determining table generated by the data processing unit in the configuration of one embodiment of the information recording medium manufacturing device may be a table correlating parameter identifiers with packet numbers of packets at the head position of segments of content configuration data, as described earlier with reference to FIG. 20.

Or, another example of a parameter identifier determining table generated by the data processing unit in the configuration of one embodiment of the information recording medium manufacturing device may be a table correlating parameter identifiers with EP map registration table IDs serving as registration table identifiers for an EP map including information of packets at the head position of segments of content configuration data, as described earlier with reference to FIG. 25.

The information recording medium generated by such a manufacturing device is, as described earlier with reference to FIG. 1 and other drawings, an information recording medium having as stored data:

(a) content including broken data different from proper content configuration data; and (b) a fix-up table including a parameter identifier determining table storing fix-up table body data stored by subjecting transformation data for replacement with the broken data to computation or encryption processing with a parameter set corresponding to a segment which is a sectioned region of content, and a parameter identifier which is identification information of the parameter.

In one embodiment, a fix-up table recorded in the information recording medium is a table correlating parameter identifiers with packet numbers of packets at the head position of segments of content configuration data, as described earlier with reference to FIG. 20. This is a table correlating parameter identifiers with EP map registration table IDs serving as registration table identifiers for an EP map including information of packets at the head position of segments of content configuration data, as described earlier with reference to FIG. 25.

The present invention has been described in detail so far with reference to specific embodiments. However, it is self-evident that one skilled in the art can make modifications and substitutions to the embodiments without departing from the essence of the present invention. That is to say, the present invention has been disclosed in exemplary form, and should not be interpreted restrictively. The judgment of the essence of the present invention should be made with reference to the Claims section.

Note that the series of processing described in the Specification can be carried out by hardware, software, or a combination of both. In the case of executing the processing with software, a program recording the processing sequence can either be installed in the memory within a computer that has built-in dedicated hardware and executed, or the program can be installed in a general-purpose computer capable of executing various types of processing.

For example, the program may be recorded in a hard disk or ROM (Read Only Memory) serving as recording media beforehand. Or, this may be temporarily or permanently stored (recorded) in removable media such as a flexible disk, CD-ROM (Compact Disc Read Only Memory), MO (Magneto optical) disk, DVD (Digital Versatile Disc), magnetic disk, semiconductor memory, etc. Such removable recording media can be provided as so-called packaged software.

Note that besides installing the program from removable recording media such as described above to the computer, the program may be wirelessly transferred to the computer from the download site, or transferred to the computer over cable networks such as a LAN (Local Area Network) or the Internet, with a computer receiving the program transferred in such a way, so as to be installed in a built-in recording medium such as a hard disk or the like.

Also, the various types of processing described in the Specification are not restricted to execution in the time-sequence described, and may be executed in parallel or independently, depending on the processing capabilities of the device executing the processing. Also note that system as used in the present Specification is a logical collection of multiple devices, and is not restricted to the devices of each configuration being within a single housing.

What is claimed is:

1. An information processing device for executing content reproduction processing, comprising:
   a processor that executes data transformation processing that replaces a part of configuration data of input content to be reproduced with transformation data, and executes processing for reproducing the reproduction content;
   a parameter generating unit that provides said processor with a parameter to be applied in said data transformation processing, wherein
   said processor outputs a parameter calculation request accompanied by said parameter identifier to said parameter generating unit,
   said parameter generating unit provides said processor with a parameter corresponding to a segment, said transformation data being registered in a fix-up table including proper content data, and
   said processor applies the parameter to the fix-up table data, and executes restoration processing of data including the transformation data applied as replacement data as to the configuration data of said segment,
   said fix-up table includes the transformation data registered to correspond to replacement data at a predetermined region within the reproduction content,
   said processor executes processing for obtaining an EP map registration table ID which is a registration table identifier of an EP map included in clip information which is content reproduction section information, and calculates a parameter identifier corresponding to said segment, based on said EP map registration table ID,
   said fix-up table includes a type indicator identifying whether the transformation data is used for replacing the part of configuration data of the input content or for embedding identification information of a reproduction device or a reproduction application, and
   said processor executes the data transformation processing based on the type indicator.

2. An information processing device for executing content reproduction processing, comprising:
   a processor that executes data transformation processing that replaces a part of configuration data of input content to be reproduced with transformation data, and executes processing for reproducing the reproduction content;
   a parameter generating unit that provides said processor with a parameter to be applied in said data transformation processing, wherein
   said processor outputs a parameter calculation request accompanied by said parameter identifier to said parameter generating unit, and
   said parameter generating unit provides said processor with a parameter corresponding to a segment, said transformation data being registered in a fix-up table and including proper content data,
   said processor applies the parameter to the fix-up table data, and executes restoration processing of data including the transformation data applied as replacement data as to the configuration data of said segment,
   said fix-up table includes the transformation data registered to correspond to replacement data at a predetermined region within the reproduction content,
   said processor executes processing for calculating a parameter identifier corresponding to said segment based on said EP map registration table ID according to the following expression:

$(SP\_ID) = (EP\_map\_ID)/N$ wherein where SP: ID: parameter identifier;
   EP_map_ID: EP map registration table ID; and
   N: the number of EP map registration tables set corresponding to one segment,
   said fix-up table includes a type indicator identifying whether the transformation data is used for replacing the part of configuration data of the input content or for embedding identification information of a reproduction device or a reproduction application, and
   said processor executes the data transformation processing based on the type indicator.

* * * * *